US009478095B2

(12) United States Patent
Walker et al.

(10) Patent No.: US 9,478,095 B2
(45) Date of Patent: Oct. 25, 2016

(54) METHODS AND SYSTEMS FOR DETERMINING AND SELLING WAGERING GAME OUTCOMES TO BE VIEWED REMOTELY

(75) Inventors: Jay S. Walker, Ridgefield, CT (US); Robert C. Tedesco, Fairfield, CT (US); James A. Jorasch, New York, NY (US); Jose A. Suarez, Fairfield, CT (US)

(73) Assignee: IGT, Las Vegas, NV (US)

( * ) Notice: Subject to any disclaimer, the term of this patent is extended or adjusted under 35 U.S.C. 154(b) by 2352 days.

(21) Appl. No.: 11/354,438

(22) Filed: Feb. 15, 2006

(65) Prior Publication Data

US 2006/0111172 A1 May 25, 2006

Related U.S. Application Data

(60) Provisional application No. 60/652,930, filed on Feb. 15, 2005, provisional application No. 60/666,393, filed on Mar. 29, 2005, provisional application No. 60/685,604, filed on May 27, 2005.

(51) Int. Cl.
*A63F 13/00* (2014.01)
*G07F 17/32* (2006.01)

(52) U.S. Cl.
CPC ........... *G07F 17/32* (2013.01); *G07F 17/3244* (2013.01); *G07F 17/3251* (2013.01)

(58) Field of Classification Search
CPC ............................ G07F 17/32; G07F 17/3244
USPC ............................. 463/16–20, 25, 29, 40–42
See application file for complete search history.

(56) References Cited

U.S. PATENT DOCUMENTS 5,569,082 A * 10/1996 Kaye ........................ G07F 17/32 273/139
5,768,382 A 6/1998 Schneier et al.
5,830,067 A 11/1998 Graves et al.
5,908,354 A 6/1999 Okuniewicz
6,007,426 A 12/1999 Kelly et al.
6,012,983 A 1/2000 Walker et al.
6,077,163 A 6/2000 Walker et al.
6,142,872 A 11/2000 Walker et al.
6,146,276 A 11/2000 Okuniewicz
6,183,361 B1 * 2/2001 Cummings ............. G07F 17/32 273/269
6,290,603 B1 * 9/2001 Luciano, Jr. ........ G07F 17/3244 463/25
6,508,709 B1 1/2003 Karmarkar
6,634,942 B2 10/2003 Walker et al.
6,840,860 B1 1/2005 Okuniewicz (Continued)

*Primary Examiner* — Omkar Deodhar
*Assistant Examiner* — Eric M Thomas
(74) *Attorney, Agent, or Firm* — Neal, Gerber & Eisenberg LLP

(57) ABSTRACT

In accordance with some embodiments, a plurality of outcomes are generated and used to create a video presentation of representative outcomes. The video presentation is recorded onto a tangible medium (e.g., DVD or CD-ROM) or otherwise provided to a player (e.g., a player may access the video presentation online). This allows a player to purchase a video presentation of (e.g., predetermined) outcomes in a jurisdiction in which gambling is legal yet view the presentation at the player's convenience (e.g., from any jurisdiction and at any time). A player who purchases such a video presentation may subsequently redeem it for a redemption value associated therewith. In some embodiments, the player may request such outcomes by presenting and/or selecting a session object and/or by interfacing with a tangible medium recording or production device (e.g., on a casino floor).

43 Claims, 33 Drawing Sheets

(56) References Cited

U.S. PATENT DOCUMENTS

| | | | | |
|---|---|---|---|---|
| 6,863,608 | B1 | 3/2005 | LeMay et al. | |
| 6,884,170 | B2 | 4/2005 | Rowe | |
| 7,140,964 | B2 | 11/2006 | Walker et al. | |
| 7,188,186 | B1 | 3/2007 | Meyer et al. | |
| 7,233,922 | B2 | 6/2007 | Asher et al. | |
| 7,322,887 | B2 | 1/2008 | Belger et al. | |
| 2001/0044337 | A1* | 11/2001 | Rowe et al. | 463/29 |
| 2002/0045475 | A1* | 4/2002 | Glavich et al. | 463/20 |
| 2002/0090986 | A1 | 7/2002 | Cote et al. | |
| 2002/0103027 | A1* | 8/2002 | Rowe et al. | 463/39 |
| 2002/0169018 | A1 | 11/2002 | Schneier et al. | |
| 2002/0187834 | A1* | 12/2002 | Rowe et al. | 463/42 |
| 2003/0100357 | A1 | 5/2003 | Walker et al. | |
| 2003/0171149 | A1* | 9/2003 | Rothschild | 463/42 |
| 2003/0177347 | A1 | 9/2003 | Schneier et al. | |
| 2004/0053675 | A1* | 3/2004 | Nguyen et al. | 463/20 |
| 2004/0147308 | A1 | 7/2004 | Walker et al. | |
| 2004/0210507 | A1 | 10/2004 | Asher et al. | |
| 2005/0164779 | A1 | 7/2005 | Okuniewicz | |
| 2005/0181854 | A1 | 8/2005 | Moshal | |
| 2005/0250567 | A1 | 11/2005 | Kane et al. | |
| 2005/0250568 | A1 | 11/2005 | Kane et al. | |
| 2005/0250569 | A1 | 11/2005 | Kane et al. | |
| 2005/0250571 | A1 | 11/2005 | Kane et al. | |
| 2005/0250572 | A1 | 11/2005 | Kane et al. | |
| 2005/0250573 | A1 | 11/2005 | Kane et al. | |
| 2005/0250574 | A1 | 11/2005 | Kane et al. | |
| 2005/0250575 | A1 | 11/2005 | Kane et al. | |
| 2005/0250576 | A1 | 11/2005 | Kane et al. | |
| 2006/0014579 | A1 | 1/2006 | Kane et al. | |
| 2006/0025197 | A1 | 2/2006 | Kane et al. | |
| 2006/0025213 | A1 | 2/2006 | Kane et al. | |
| 2006/0030388 | A1 | 2/2006 | Kane et al. | |
| 2006/0046835 | A1 | 3/2006 | Walker et al. | |
| 2006/0068876 | A1 | 3/2006 | Kane et al. | |
| 2006/0082056 | A1 | 4/2006 | Kane et al. | |
| 2006/0148562 | A1 | 7/2006 | Walker et al. | |
| 2006/0154719 | A1 | 7/2006 | Okuniewicz | |
| 2006/0154720 | A1 | 7/2006 | Okuniewicz | |
| 2006/0154721 | A1 | 7/2006 | Okuniewicz | |
| 2006/0166725 | A1 | 7/2006 | Saffari et al. | |
| 2006/0172794 | A1 | 8/2006 | Walker et al. | |
| 2006/0172799 | A1 | 8/2006 | Kane et al. | |
| 2006/0211471 | A1 | 9/2006 | Walker et al. | |

* cited by examiner

700

| SESSION IDENTIFIER: 01927 705 | | |
|---|---|---|
| WAGER AMOUNT: $.25/GAME PLAY 710 | GAME: BIG TEXAS OIL HUNT 715 | SESSION DURATION: 1,000 GAME PLAYS 720 |
| PRICE: $20.00 725 | FINAL SESSION BALANCE: $63.25 730 | |

| | GAME PLAY NUMBER 735 | WAGER 740 | INDICIA 745 | INDICIA IDENTIFIER 750 | PAYOUT 755 |
|---|---|---|---|---|---|
| R700-1 | 1 | $0.25 | NONWINNING COMBINATION | O-000001 | 0 |
| R700-2 | 2 | $0.25 | NONWINNING COMBINATION | O-000001 | 0 |
| R700-3 | 3 | $0.25 | CHERRY/CHERRY/CHERRY | O-000007 | 20 |
| R700-4 | 4 | $0.25 | NONWINNING COMBINATION | O-000001 | 0 |
| R700-5 | 5 | $0.25 | NONWINNING COMBINATION | O-000001 | 0 |
| R700-6 | 6 | $0.25 | NONWINNING COMBINATION | O-000001 | 0 |
| R700-7 | 7 | $0.25 | ANY/ANY/CHERRY | O-000003 | 2 |
| R700-8 | 8 | $0.25 | NONWINNING COMBINATION | O-000001 | 0 |
| R700-9 | 9 | $0.25 | ORANGE/ORANGE/BAR | O-000009 | 10 |

FIG. 7

800

| | GAMING DEVICE IDENTIFIER 805 | GAMING DEVICE TYPE IDENTIFIER 810 | DEVICE STATUS 815 | AVAILABLE GAME(S) 820 |
|---|---|---|---|---|
| R800-1 → | GD-000001 | DT-000001 | IN USE | BIG TEXAS OIL HUNT |
| R800-2 → | GD-000002 | DT-000001 | NOT IN USE | DOUBLE TROUBLE, SANDS OF TIME |
| R800-3 → | GD-000003 | DT-000001 | IN USE | DOUBLE TROUBLE |
| | ⋮ | | | ⋮ |
| R800-N → | GD-N | DT-N | NOT IN USE | SANDS OF TIME, LOVE MATCH |

FIG. 8

900

| | SESSION IDENTIFIER 905 | GAMING DEVICE IDENTIFIER 910 | GAME TYPE 915 | WAGER PER GAME PLAY 920 | ACTIVE PAY COMBOS 925 | NUMBER OF GAME PLAYS REMAINING 930 | TIME REMAINING 935 |
|---|---|---|---|---|---|---|---|
| R900-1 | S-102001 | GD-000054 | 3-REEL (5 PAYLINE) | $0.25 | ALL | 15 | N/A |
| R900-2 | S-704034 | GD-000054 | 5-REEL (1 PAYLINE) | $0.25 | BAR-BAR-BAR | 10 | N/A |
| R900-3 | S-102002 | ANY | DRAW POKER | $0.25 | ALL EXCEPT ROYAL FLUSH | N/A | 5 MINS. |
| R900-4 | S-102103 | GD-000001, GD-000999 | BLACKJACK | N/A | N/A | 2 | N/A |

FIG. 9

1000

| | DISC IDENTIFIER 1005 | PAYOUT 1010 | PRICE 1015 | DATE SOLD 1015 | ACTIVATION CODE 1020 | PLAYER IDENTIFIER 1025 | STATUS 1030 |
|---|---|---|---|---|---|---|---|
| R1000-1 | D-1003210-87912487 | $15.00 | $20.00 | 1/6/06 12:22 PM | XY90-ZF42-9962-0651 | N/A | PURCHASED |
| R1000-2 | D-1003210-87912487 | $18.00 | $20.00 | 1/6/06 12:38 PM | Z410-9124-BC21-EG3X | P-10421087 | PURCHASED |
| R1000-3 | D-891266-101421011 | $0.00 | $25.00 | 1/6/06 12:40 PM | BB12-4XQ2-GF33-47WY | P-71032109 | PURCHASED |
| R1000-4 | D-001247-891333415 | $72.50 | $25.00 | 1/6/06 12:56 PM | XXF9-417B-GAB3-DY06 | P-71032100 | REDEEMED |
| R1000-4 | D-771043-213412879 | $72.50 | $20.00 | - | - | - | AVAILABLE |

FIG. 10

1100A

| | GAME: G-10421 "BIG TEXAS OIL HUNT" 1105A | | | |
|---|---|---|---|---|
| | GAME TYPE FILE: M-9148712 1110A | GAME BRAND FILE: M-4170892 1115A | CASINO BRAND FILE: M-9148766 1120A | |
| | OUTCOME IDENTIFIER 1125A | OUTCOME 1130A | MEDIA FILE 1135A | DURATION 1135A |
| R1100A-1 → | O-000001 | NONWINNING COMBINATION | M-000001 | 4 SEC. |
| R1100A-2 → | O-000002 | CHERRY/ANY/ANY | M-000002 | 4 SEC. |
| R1100A-3 → | O-000003 | ANY/ANY/CHERRY | M-000003 | 4 SEC. |
| R1100A-4 → | O-000004 | CHERRY/CHERRY/ANY | M-000004 | 4 SEC. |
| R1100A-5 → | O-000005 | ANY/CHERRY/CHERRY | M-000005 | 4 SEC. |
| R1100A-6 → | O-000006 | CHERRY/ANY/CHERRY | M-000006 | 4 SEC. |
| R1100A-7 → | O-000007 | CHERRY/CHERRY/CHERRY | M-000007 | 4 SEC. |
| R1100A-8 → | O-000008 | BAR/ORANGE/ORANGE | M-000008 | 4 SEC. |
| R1100A-9 → | O-000009 | ORANGE/ORANGE/BAR | M-000009 | 6 SEC. |

FIG. 11A

1100B

| | GAME: G-70418 "SANDS OF GOLD" 1105B | | |
|---|---|---|---|
| | GAME TYPE FILE: M-9148712 1110B | GAME BRAND FILE: M-4170892 1115B | CASINO BRAND FILE: M-9148766 1120B |
| | PAYOUT 1125B | MEDIA FILE 1130B | DURATION 1135B |
| R1100B-1 → | 0 | M-000001, M-000002,... | 4 SEC. |
| R1100B-2 → | 1 | M-000109, M-000110,... | 4 SEC. |
| R1100B-3 → | 2 | M-000123, M-000124,... | 4 SEC. |
| R1100B-4 → | 3 | N/A | 4 SEC. |
| R1100B-5 → | 4 | M-000135 | 4 SEC. |
| R1100B-6 → | 5 | M-000136, M-000137,... | 4 SEC. |
| R1100B-7 → | 6 | M-000152, M-000153,... | 4 SEC. |
| R1100B-8 → | 7 | N/A | 4 SEC. |
| R1100B-9 → | 8 | M-000158, M-000159 | 4 SEC. |
| | ⋮ | ⋮ | ⋮ |
| R1100B-N → | N | M-000NNN | 6 SEC. |

FIG. 11B

1200

| SESSION IDENTIFIER: GC-01927 1205 | | | |
|---|---|---|---|
| | MEDIA FILE ORDER 1210 | MEDIA FILE 1215 | MEDIA FILE DESCRIPTION 1220 |
| R1200-1 → | 1 | M-000001 | INTRO SCREEN |
| R1200-2 → | 2 | M-000001 | GAME BRAND |
| R1200-3 → | 3 | M-000007 | CASINO |
| R1200-4 → | 4 | M-000008 | OUTCOME |
| R1200-5 → | 5 | M-000004 | OUTCOME |
| R1200-6 → | 6 | M-000005 | OUTCOME |
| R1200-7 → | 7 | M-000003 | CONGRATULATIONS MESSAGE |
| R1200-8 → | 8 | M-000002 | OUTCOME |
| R1200-9 → | 9 | M-000009 | ADVERTISEMENT A123 |
| | ⋮ | ⋮ | ⋮ |

FIG. 12

1300

| | ORDER NO. 1305 | CUSTOMER IDENTIFIER 1310 | DISC IDENTIFIER 1315 | GAME BRAND 1320 | CASINO 1325 | DENOMINATION 1330 |
|---|---|---|---|---|---|---|
| R1300-1 | 099-4170-3218-22 | 099 | D-100321089912487 | SANDS OF TIME | STALLION CASINO | NICKEL |
| R1300-2 | 099-4170-3218-23 | 099 | D-100321087912488 | SANDS OF TIME | STALLION CASINO | PENNY |
| R1300-3 | 085-3210-4710-01 | 085 | D-100321087912489 | BIG TEXAS OIL HUNT | FRENCH RIVIERA CASINO | QUARTER |

FIG. 13A 1300 (CONT.)

| | WAGER PER PLAY 1335 | PAYOUT SCHEDULE IDENTIFIER 1340 | NUMBER OF GAME PLAYS 1345 | STARTING CREDIT METER BALANCE 1350 | END CREDIT METER BALANCE 1355 | SESSION IDENTIFIER 1360 |
|---|---|---|---|---|---|---|
| R1300-1 | $0.25 | PS-104 | 500 | $20.00 | $15.00 | S-789104 |
| R1300-2 | $0.25 | PS-104 | 500 | $25.00 | $37.50 | S-009142 |
| R1300-3 | $1.00 | PS-333 | 1,000 | $40.00 | $37.25 | S-412069 |

FIG. 13B 1300 (CONT.)

| | ORDER SUBMISSION TIME 1365 | PRODUCTION START TIME 1370 | PRODUCTION STEP 1 TIME 1375 | PRODUCTION STEP N TIME 1380 | PRODUCTION COMPLETED TIME 1385 | SHIPPED TIME 1390 |
|---|---|---|---|---|---|---|
| R1300-1 | 12/28/05 4:18 PM | 12/29/05 1:23 AM | 12/29/05 2:06 AM | 12/29/05 3:59 AM | 12/29/05 4:01 AM | 1/4/06 12:22 PM |
| R1300-2 | 12/28/05 4:18 PM | 12/29/05 1:25 AM | 12/29/05 1:58 AM | 12/29/05 3:09 AM | 12/29/05 3:14 AM | 1/4/06 12:22 PM |
| R1300-3 | 12/29/05 1:25 PM | 12/30/05 2:39 PM | 12/30/05 3:18 PM | 12/30/05 5:30 PM | 12/30/05 5:36 PM | 1/4/06 12:22 PM |

FIG. 13C

1400

| | GAME IDENTIFIER: 91468 1405 | NUMBER OF GAME PLAYS: 500 1410 | | WAGER PER GAME PLAY: $0.50 1415 |
|---|---|---|---|---|
| | FINAL CREDIT METER BALANCE 1420 | FIRST SET OF OUTCOMES 1425 | SECOND SET OF OUTCOMES 1430 | NTH SET OF OUTCOMES 1435 |
| R1400-1 | $0.00 | O-000001, O-000002,... | O-658741, O-489014,... | O-211442, O-366255,... |
| R1400-2 | $0.25 | O-000009, O-0000010,... | O-254719, O-1597532,... | O-473251, O-476325,... |
| R1400-3 | $0.50 | O-000123, O-000124,... | O-456721, O-351246,... | O-998753, O-999122,... |
| R1400-4 | $0.75 | N/A | N/A | N/A |
| R1400-5 | $1.00 | O-000135 | O-578931 | S-823541 |
| R1400-6 | $1.25 | O-000136, O-000137,... | O-617528, O-614759,... | O-136547, O-258978,... |
| R1400-7 | $1.50 | O-000152, O-000153,... | O-641573, O-741369,... | O-647138, O-582193,... |
| R1400-8 | $1.75 | N/A | N/A | N/A |
| R1400-9 | $2.00 | O-000158, O-000159 | O-963147, O-456713 | O-973146, O-753159 |
| | ⋮ | ⋮ | ⋮ | ⋮ |
| R1400-N | $8,000.00 | O-00NNNN | – | – |

FIG. 14

1500

| | RANDOM NUMBER (RANGE) 1505 | OUTCOME IDENTIFIER 1510 |
|---|---|---|
| R1500-1 → | 1-8570 | O-000001 |
| R1500-2 → | 8571-9250 | O-000002 |
| R1500-3 → | 9251-9930 | O-000003 |
| R1500-4 → | 9931-10130 | O-000004 |
| R1500-5 → | 10131-10330 | O-000005 |
| R1500-6 → | 10331-10398 | O-000006 |
| R1500-7 → | 10399-10418 | O-000007 |
| R1500-8 → | 10419-10460 | O-000008 |
| R1500-9 → | 10461-10466 | O-000009 |
| R1500-10 → | 10467-10508 | O-000010 |
| R1500-11 → | 10509-10528 | O-000011 |
| R1500-12 → | 10529-10533 | O-000012 |
| R1500-13 → | 10534-10583 | O-000013 |
| R1500-14 → | 10584-10587 | O-000014 |
| R1500-15 → | 10588-10607 | O-000015 |
| R1500-16 → | 10608-10627 | O-000016 |
| R1500-17 → | 10628-10647 | O-000017 |
| R1500-18 → | 10648 | O-000018 |

FIG. 15

1600

| | OUTCOME IDENTIFIER 1605 | OUTCOME 1610 | PAYOUT 1615 |
|---|---|---|---|
| R1600-1 → | O-000001 | NONWINNING COMBINATION | 0 |
| R1600-2 → | O-000002 | CHERRY/ANY/ANY | 2 |
| R1600-3 → | O-000003 | ANY/ANY/CHERRY | 2 |
| R1600-4 → | O-000004 | CHERRY/CHERRY/ANY | 5 |
| R1600-5 → | O-000005 | ANY/CHERRY/CHERRY | 5 |
| R1600-6 → | O-000006 | CHERRY/ANY/CHERRY | 5 |
| R1600-7 → | O-000007 | CHERRY/CHERRY/CHERRY | 20 |
| R1600-8 → | O-000008 | BAR/ORANGE/ORANGE | 10 |
| R1600-9 → | O-000009 | ORANGE/ORANGE/BAR | 10 |
| R1600-10 → | O-000010 | ORANGE/ORANGE/ORANGE | 20 |
| R1600-11 → | O-000011 | BAR/PLUM/PLUM | 14 |
| R1600-12 → | O-000012 | PLUM/PLUM/BAR | 14 |
| R1600-13 → | O-000013 | PLUM/PLUM/PLUM | 20 |
| R1600-14 → | O-000014 | BAR/BELL/BELL | 18 |
| R1600-15 → | O-000015 | BELL/BELL/BAR | 18 |
| R1600-16 → | O-000016 | BELL/BELL/BELL | 20 |
| R1600-17 → | O-000017 | BAR/BAR/BAR | 50 |
| R1600-18 → | O-000018 | 7/7/7 | 100 |

FIG. 16

FIG. 24
2405
CASHOUT TICKET
CASINO XYZ
CASHOUT TICKET
INSERT THIS SIDE UP
INSERT THIS SIDE UP
CONTRACT # GC-01927
BALANCE AFTER 1,000 SPINS: $20.75
VIDEO TICKET
2410
CASINO XYZ
VIDEO TICKET
CONTRACT # GC-01927
2415
GAME RESULTS TICKET
CASINO XYZ
RESULTS TICKET 1
CONTRACT # GC-01927
01 LE-LE-CH +10 XX LE-LE-CH +10 XX LE-LE-CH +10 XX BR-LE-BL +0 XX BR-LE-BL +0
02 BR-LE-BL +0 XX BR-LE-BL +0 XX BR-LE-BL +0 XX BR-LE-BL +0 XX BR-LE-BL +0
03 LE-LE-CH +10 XX LE-LE-CH +10 XX BR-LE-BL +0 XX LE-LE-CH +10 XX LE-LE-CH +10
04 BR-LE-BL +0 XX BR-LE-BL +0 XX BR-LE-BL +0 XX BR-LE-BL +0 XX BR-LE-BL +0
XX LE-LE-CH +10 XX BR-LE-BL +0 XX BR-LE-BL +0 XX BR-LE-BL +0 XX BR-LE-BL +0
XX BR-LE-BL +0 XX BR-LE-BL +0 XX BR-LE-BL +0 XX BR-LE-BL +0 XX BR-LE-BL +0
XX BR-LE-BL +0 XX BR-LE-BL +0 XX LE-LE-CH +10 XX BR-LE-BL +0 XX BR-LE-BL +0
XX BR-LE-BL +0 XX LE-LE-CH +10 XX LE-LE-CH +10 XX LE-LE-CH +10 XX LE-LE-CH +10
XX BR-LE-BL +0 XX BR-LE-BL +0 XX BR-LE-BL +0 XX BR-LE-BL +0 XX BR-LE-BL +0
XX BR-LE-BL +0 XX LE-LE-CH +10 XX BR-LE-BL +0 XX BR-LE-BL +0 50 BR-LE-BL +0

2600

GAMING DEVICE IDENTIFIER: GD-104672 2605

DATA TYPE: PAYOUTS (CONSECUTIVE) 2610

2615

0, 2, 0, 0, 1, 0, 2, 0, 1, 4, 0, 0, 0, 1, 0, 1, 0, 0, 0, 0,1, 0, 1, 0, 2, 1, 2, 0, 0, 2, 1, 0, 1, 0, 0, 0, 1, 0, 0, 0, 3, 1, 0, 1, 1; 1, 0, 0, 2, 0, 3,
0, 6, 1, 1, 0, 0, 1, 4, 0, 0, 2, 0, 0, 0, 0, 9, 3, 0, 0, 0, 0, 0, 3, 0, 3, 2, 1, 0, 0, 0, 1, 1, 0, 0, 2, 1, 1, 0, 2, 1, 1, 0, 1, 2, 0, 2, 2, 0, 0, 0, 0, 1,
3, 0, 0, 9, 1, 0, 1, 1, 3, 1, 0, 0, 50, 0, 0, 1, 9, 1, 0, 2, 2, 1, 1, 0, 0, 0, 0, 1, 0, 800, 0, 1, 3, 1, 0, 0, 0, 1, 1, 0, 0, 3, 0, 0, 2, 3, 1, 3, 0, 2,
4, 2, 0, 0, 1, 0, 1, 0, 1, 2, 3, 1, 0, 0, 1, 2, 0, 0, 0, 2, 0, 0, 2, 1, 0, 1, 1, 2, 1, 0, 0, 0, 0, 0, 0, 9, 2, 3, 3, 3, 1, 1, 0, 0, 0, 0, 0, 2, 0, 0, 3, 2,
0, 1, 0, 0, 2, 1, 0, 0, 1, 2, 1, 1, 1, 1, 1, 0, 9, 1, 1, 0, 2, 0, 0, 0, 0, 1, 0, 0, 0, 0, 0, 0, 0, 2, 3, 0, 3, 4, 0, 1, 0, 0, 1, 0, 0, 2, 0, 0, 0, 0, 0, 0,
1, 0, 0, 0, 0, 2, 0, 1, 6, 2, 0, 0, 0, 1, 25, 0, 0, 1, 1, 3, 0, 0, 1, 1, 0, 1, 1, 2, 0, 2, 0, 0, 0, 0, 0, 2, 0, 2, 1, 0, 1, 0, 0, 1, 4, 0, 0, 2, 1, 0, 0,
1, 2, 2, 6, 1, 0, 0, 3, 0, 2, 0, 0, 1, 0, 0, 1, 1, 0, 1, 0, 9, 3, 2, 1, 0, 0, 0, 6, 2, 0, 0, 0, 0, 0, 0, 1, 0, 6, 1, 3, 4, 0, 0, 6, 0, 0, 1, 0, 0, 1, 1, 0,
3, 0, 9, 1, 2, 2, 0, 1, 0, 0, 0, 3, 3, 0, 0, 0, 1, 0, 3, 0, 2, 1, 2, 0, 2, 0, 1, 0, 0, 0, 0, 3, 2, 2, 2, 0, 0, 0, 0, 0, 0, 0, 0, 0, 0, 1, 0, 3, 9, 0, 0, 2,
0, 0, 0, 0, 0, 0, 0, 0, 2, 0, 1, 2, 0, 3, 4, 2, 0, 0, 0, 0, 0, 0, 0, 1, 0, 0, 2, 2, 0, 50, 2, 2, 1, 1, 1, 3, 0, 3, 2, 1, 0, 0, 0, 0, 2, 1, 0, 1, 0, 0, 0,
1, 0, 0, 0, 1, 1, 0, 4, 2, 0, 1, 0, 3, 3, 2, 3, 0, 2, 0, 1, 0, 3, 3, 0, 0, 0, 0, 0, 0, 0, 1, 0, 0, 0, 0, 0, 1, 3, 2, 0, 0, 0, 0, 9, 0, 1, 0, 4, 0, 1, 0, 1,
1, 0, 6, 0, 3, 0, 0, 2, 3, 0, 0, 0, 0, 0, 0, 4, 1, 0, 0, 0, 0, 1, 2, 3, 0, 3, 0, 0, 0, 0, 3, 1, 0, 0, 0, 0, 2, 0, 0, 0, 0, 0, 0, 2, 1, 0, 2, 1, 2, 3, 3,...

FIG. 26

METHODS AND SYSTEMS FOR DETERMINING AND SELLING WAGERING GAME OUTCOMES TO BE VIEWED REMOTELY

CROSS-REFERENCE TO RELATED APPLICATIONS

The present application claims benefit and priority under 35 U.S.C. §119(e) to (1) U.S. Provisional Patent Application Ser. No. 60/652,930, filed Feb. 15, 2005 and entitled SYSTEMS, METHODS AND APPARATUS FOR REMOTELY VIEWING GAMING RESULTS; (2) U.S. Provisional Patent Application Ser. No. 60/666,393, filed on Mar. 29, 2005 and entitled METHODS, SYSTEMS AND APPARATUS FOR PROVIDING GAMBLING RESULTS THAT MAY BE VIEWED REMOTELY; and (3) U.S. Provisional Patent Application Ser. No. 60/685,604, filed May 27, 2005 and entitled METHODS, SYSTEMS AND APPARATUS FOR PROVIDING GAMBLING RESULTS THAT MAY BE VIEWED REMOTELY, the entirety of each of these applications being hereby incorporated by reference herein for all purposes.

The present application is also related to co-pending U.S. patent application Ser. No. 11/333,683, filed on Jan. 17, 2006 in the name of Walker et al. and entitled METHODS AND SYSTEMS FOR DETERMINING AND SELLING WAGERING GAME OUTCOMES TO BE VIEWED REMOTELY

BRIEF DESCRIPTION OF THE DRAWINGS

Various embodiments are described herein with reference to the accompanying drawings. In the drawings, like reference numerals generally indicate identical and/or functionally similar elements. The leftmost digit(s) of a reference numeral typically identifies the figure in which the reference numeral first appears. The drawings and accompanying descriptions presented herein indicate some exemplary arrangements for stored representations of information. A number of other arrangements may be employed in addition to or instead of the tables shown. Similarly, the illustrated entries represent exemplary information, but the number and content of these entries may be different from those illustrated herein. A brief description of the drawings follows.

FIG. 7 is a table illustrating an exemplary record of an example session database in accordance with some embodiments.

FIG. 8 is a table illustrating an exemplary GD database in accordance with some embodiments.

FIG. 9 is a table illustrating an exemplary active sessions database in accordance with some embodiments.

FIG. 10 is a table illustrating an exemplary available DVD database in accordance with some embodiments.

FIG. 11A is a table illustrating an exemplary record of an example media files database in accordance with some embodiments.

FIG. 11B is a table illustrating an exemplary record of another example media files database in accordance with some embodiments.

FIG. 12 is a table illustrating an exemplary record of an example session media files database in accordance with some embodiments.

FIG. 13A, FIG. 13B, and FIG. 13C are tables illustrating an exemplary embodiment of a DVD production queue database in accordance with some embodiments.

FIG. 14 is an exemplary record of an example outcome sets database in accordance with some embodiments.

FIG. 15 is an example of a probability database in accordance with some embodiments.

FIG. 16 is an example of a payout database in accordance with some embodiments.

FIG. 26 is an example record of a database that may store an indication of payouts determined during a session that may be output in accordance with some embodiments.

DETAILED DESCRIPTION

I. Introduction

Figure 1:
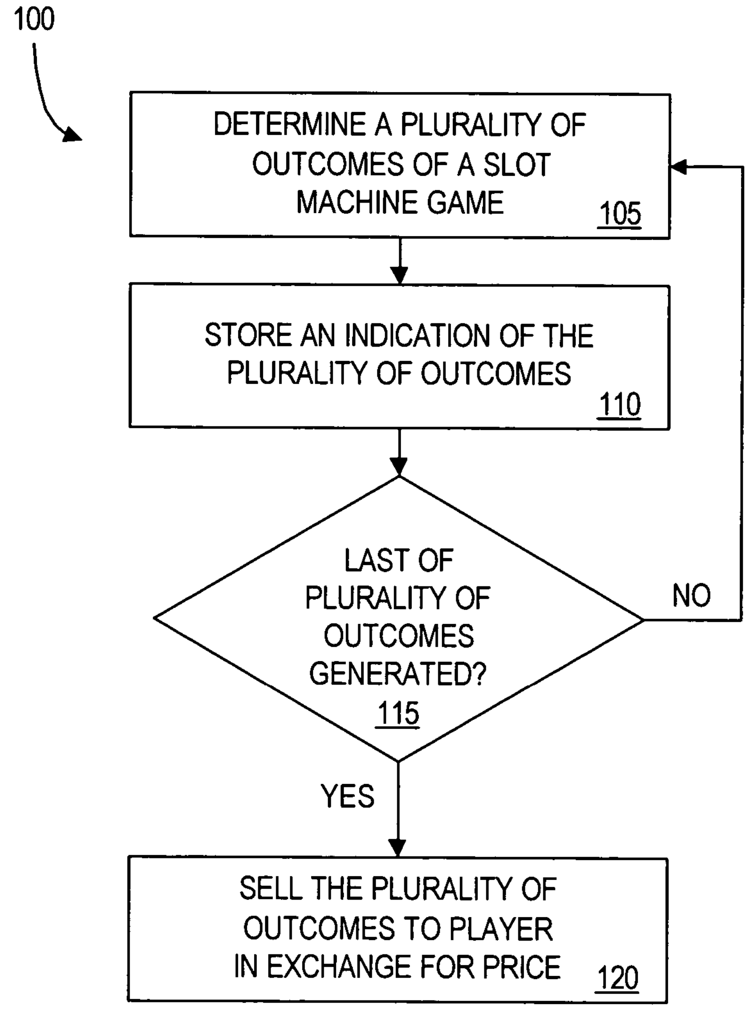
FIG. 1 is a flowchart of an exemplary process according to some embodiments.

In accordance with one or more embodiments, a method, system, and/or article of manufacture provides for receiving, from a player, a session object comprising an indication of a parameter (such as a pre-defined parameter and/or a parameter at least partially defined by the player). The session object may generally comprise at least one of a packaging medium (such as a Digital Video Disc (DVD)

and/or Compact Disc (CD) jewel case and/or sleeve), a card medium (e.g., a form), a ticket medium (e.g., a cashless gaming ticket), and/or a token medium. In some embodiments, the session object may be selected, by the player, from a display (e.g., a display maintained and/or created by a casino and/or third-party) comprising a plurality of available session objects. Some embodiments may further provide for the determining of a plurality of outcomes of a wagering game (e.g., a session) and/or storing an indication of the plurality of outcomes. In some embodiments, the determining may be based on the parameter indicated by the session object. The method, system, and/or article of manufacture may further provide for selling, after a last one of the plurality of outcomes is generated, the plurality of outcomes to the player (e.g., in exchange for a price or other value). The plurality of outcomes may be provided to the player, for example, by being recorded on a tangible medium (e.g., a DVD), the tangible medium being provided to the player. In some embodiments, the plurality of outcomes may be provided to the player by being stored on a server device and providing the player access to the server device (e.g., such that the player may access the outcomes via the Internet and/or another network).

An outcome, as the term is used herein, unless indicated otherwise, refers to a result of a game play, which may be indicated by a payout (i.e., a prize or benefit to be provided as a result of the game play) and/or one or more indicia representative of the result. For example, an outcome may comprise a set of indicia (or payout corresponding thereto) that may be displayed along a payline of a reeled slot machine. In another example, an outcome may comprise a roulette number that is a result of a roulette spin. In some embodiments, more than one set of indicia may represent the same result or outcome.

In one embodiment, an outcome may be represented via indicia of a media file. A media file may comprise graphical and/or audio data. The graphical data may comprise a still and/or animated image of one or more indicia. In some embodiments, more than one media file may correspond to a particular outcome or result. For example, more than one media file may correspond to an outcome that results in zero credits being added to a credit meter balance.

A game, wagering game, and/or slot machine game, as the terms are used herein, unless indicated otherwise, comprises a wagering activity conducted in accordance with a particular set of rules via which a prize or benefit may be won in exchange for consideration.

A game play, as the term is used herein, unless indicated otherwise, refers to a single instance or round of a game. A game play may result in a single outcome (e.g., a set of indicia and corresponding payout, if any).

A type of game, as the term is used herein unless indicated otherwise, refers to a category of games that share one or more characteristics.

In accordance with one or more embodiments, a method provides for causing a plurality of actual outcomes to be generated on a gaming device operable to facilitate a wagering game and determining data indicative of the plurality of actual outcomes. The method further provides for determining, based on the data, a plurality of representations (e.g., images and/or other video and/or audio), each representation representing an outcome to be stored on a tangible medium, each representation thereby comprising a representative outcome. The method further provides for causing the plurality of representative outcomes be stored on a tangible medium and making the tangible medium available for sale.

An actual outcome, as the term is used herein unless indicated otherwise, is an outcome directly determined by a gaming device (GD). For example, an actual outcome may comprise a random number determined by a random number generator of a GD, a particular set of indicia that corresponds to the random number based on a probability table used by the GD and/or a payout that corresponds to the random number.

A representative outcome, as the term is used herein, unless indicated otherwise, is an indication of an actual outcome, the representation being determined based on the actual outcome and, in some embodiments, by a device other than a GD. For example, an assembly system (AS) may determine, based on a random number determined by a GD, a media file to represent the actual outcome determined by the GD. The media file may comprise a graphical representation of a set of indicia and this set of indicia may be a representative outcome corresponding to the actual outcome determined by the GD.

It should be understood that, for a particular set of outcomes (e.g., associated with a game play and/or session), the set of actual outcomes may correspond to the same sum of payouts as does the corresponding set of representative outcomes.

In some embodiments, the outcome in a set of actual outcomes that corresponds to a set of representative outcomes may (i) differ in number; (ii) differ in order (i.e., the actual outcomes may have been generated in a first order while the representative outcomes may be presented in a second order); and/or (iii) differ in indicia or form of indicia.

A session, as the term is used herein, unless indicated otherwise, is a plurality of game plays conducted for the purpose of determining a plurality of outcomes to be sold to a player. For example, a session may refer to a plurality of game plays executed by a GD, based on which plurality of game plays (e.g., representative outcomes and/or actual outcomes) a video representation of outcomes is created and recorded onto a DVD and/or other tangible medium, or based on which plurality of game plays the video presentation is otherwise made available to a player. A session may be completed over a plurality of distinct time periods (e.g., some of the outcomes comprising the session may be generated at a first date and/or time while more of the outcomes comprising the session may be generated at a second date and/or time). Further, a session may be executed on more than one GD (e.g., simultaneously or in parallel fashion and/or at various times). A session may be deemed to be completed once an end event defining the end of the session has occurred (e.g., a predefined number of outcomes is generated, outcomes are generated for a predefined period of time, and/or a credit meter balance reaches a predefined value). In some embodiments, a session may be deemed to be completed once one of a plurality of possible end events occurs, whichever end event occurs first.

It should be noted that although the term DVD is used herein to refer to a tangible medium on which an indication of a plurality of outcomes may be recorded and which tangible medium may be sold (or otherwise provided) to a player, this term is used for purposes of brevity only and should not be taken in a limiting fashion. All references to DVD likewise include any other form of tangible medium that may be or become appropriate and/or practicable for recording an indication of outcomes (e.g., a video presentation) for subsequent remote viewing by a player. For example, paper (e.g., a flip-through book), a CD-ROM, a VHS tape, flash memory, a memory stick, a digital video tape, an MP3 file, or any other tangible medium for recording information may be used. Further, practicable variations of such media are contemplated (e.g., DVD-R, CD-R, and/or CD-RW). It should be understood that the use of the term DVD is a reference to any and all such tangible mediums that are or become known and/or practicable.

In accordance with one or more embodiments, a method provides for receiving, from a player, a request for a payout corresponding to a plurality of outcomes previously sold to the player, wherein the payout is a function of a sum of payouts of the plurality of outcomes, and wherein the plurality of outcomes had been sold to the player as a package without providing to the player an indication of the payout. A payout corresponding to a DVD that is a function of a sum of payouts of the plurality of outcomes or an aggregate of the payouts may be, in some embodiments, the "redemption value" of the DVD or other medium via which session information is remotely viewable. The method further provides for verifying a legitimate purchase of the plurality of outcomes by the player, verifying the payout and providing the payout to the player. In some embodiments, the method may further provide for storing an indication of the payout having been provided to the player and/or verifying that the payout has not previously been provided to the player. According to some embodiments, the plurality of outcomes may be provided to the player without receiving payment from the player (e.g., as a gift and/or promotion). In such embodiments, the redemption value may comprise a difference between the sum of payouts for the plurality of outcomes and a fee (e.g., a redemption fee) for having provided the plurality of outcomes to the player. In other words, the "value" of the tangible medium and/or outcomes may be deducted or debited from the payout amount associated with the outcomes.

The term "redemption value" is used herein to refer to a monetary amount or prize that a player may redeem a purchased DVD for. This term refers, unless indicated otherwise, to a value that is a function of a sum of payouts (which may be a single payout in some instances), the payouts being the payouts corresponding to the outcomes represented on the DVD. The value may be, for example, a function of (i) the starting credit meter balance at the beginning of the session executed to determine the outcomes represented on the DVD, (ii) a sum of wagers posted for the game plays comprising the session; and (iii) the payouts won as a result of game plays comprising the session. For example, assuming a session is executed with a starting balance of five dollars ($5.00), twenty (20) game plays are executed during the session at a wager of twenty-five cents (25¢) per game play, and three (3) of these game plays result in a payout greater than zero (the first payout being four dollars ($4.00), the second payout being twelve dollars ($12.00) and the third payout being three dollars ($3.00)), the ending credit meter balance at the end of the session is nineteen dollars ($19.00). Thus, in some embodiments the redemption value of the DVD may be the ending credit meter balance, which is nineteen dollars ($19.00) in the above example. In other words, a player who purchases this DVD for twenty dollars ($20.00) may redeem the DVD for nineteen dollars ($19.00). In embodiments where the player does not pay the twenty dollars ($20.00) up-front (e.g., upon receiving the outcomes), the twenty dollars ($20.00) and/or some other "fee" amount may simply be deducted from the nineteen-dollar ($19.00) ending credit meter balance to determine how much money should be provided to the player upon redemption. In the example described above, the player would not receive any money (e.g., a redemption value of negative one dollar (−$1.00)).

In accordance with one or more embodiments, a method provides for selling a plurality of outcomes as a package, wherein the plurality of outcomes is based on at least one random number result generated by a GD operable to facilitate a wagering game, and wherein the selling occurs after the at least one result has been generated and prior to a payout for any outcome of the plurality of outcomes having been provided to a player.

In accordance with some embodiments, provided are apparatus, systems and methods for enabling casino patrons to view gambling results remotely. In one or more embodiments, a player may purchase a session of game plays from a casino. Using a GD located within the casino, for example, the session may be executed on the player's behalf according to parameters of the session (e.g., number of game plays, wager per game play, payout combinations active, game, and/or gaming device or type of gaming device). In some embodiments, a slot machine may be configured to rapidly generate a plurality of outcomes on the player's behalf. In some embodiments, files representing the generated outcomes may then be stored on media (e.g., a CD-ROM and/or DVD). The player may then remotely view the previously generated outcomes at a later time (e.g., using one or more devices such as home computers, televisions, DVD players, Personal Digital Assistant (PDA) devices, cellular phones, and so on), so as to experience wins and losses associated with the session.

Some embodiments will now be described with reference to the various figures provided herein.

Referring initially to FIG. 1, illustrated therein is a flowchart of an exemplary process 100 that may be performed in accordance with one or more embodiments. It should be noted that, as is true for all processes described herein, process 100 may, in some embodiments, be performed by a variety of devices and/or persons. For example, one or more of the steps described may be performed by a GD (described in detail with reference to FIG. 6), one or more of the steps may be performed by a casino server (CS; described in detail with reference to FIG. 4), one or more of the steps may be performed by an AS (described in detail with reference to FIG. 5), one or more steps may be performed by another device (e.g., a casino personnel device (CPD), a Point-of-Sale (POS) device, and/or another device) and/or one or more of the steps may be performed by a person (e.g., a casino attendant or player). Further, the steps may be performed in an order different from that described. Further still, additional or different steps may be included and some steps may be omitted or modified, as appropriate and/or practicable.

Figure 27:
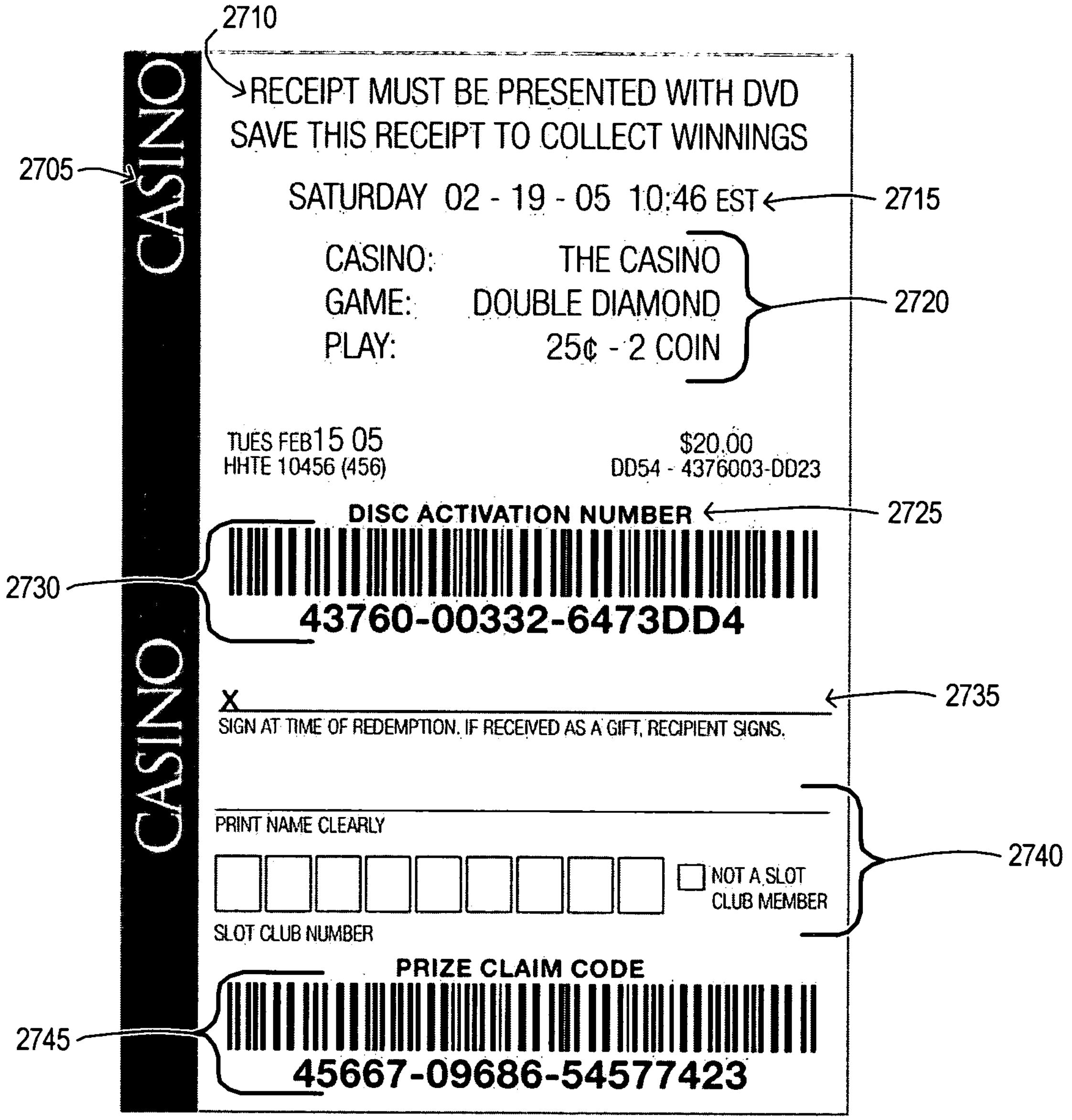
FIG. 27 is an example of a receipt that may be output upon a purchase of a DVD, in accordance with some embodiments.
Figure 28A:
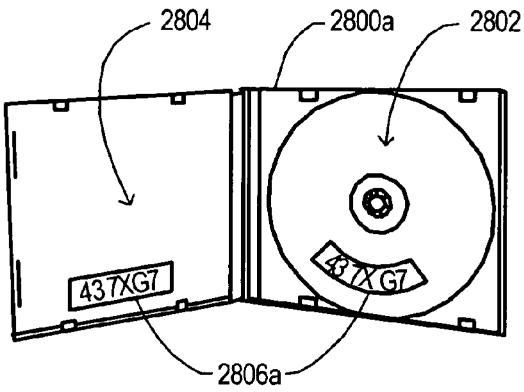
FIG. 28A, FIG. 28B, FIG. 28C, and FIG. 28D are examples of various session objects in accordance with some embodiments.
Figure 28B:
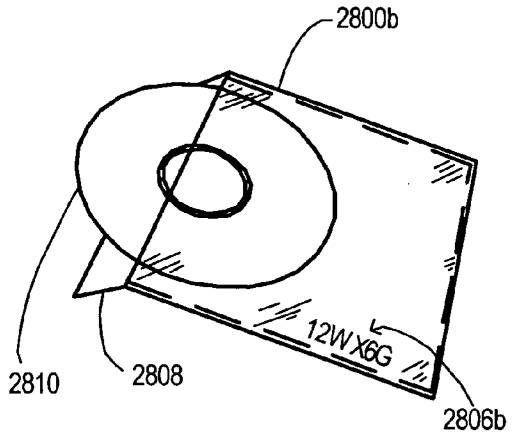
Figure 28C:
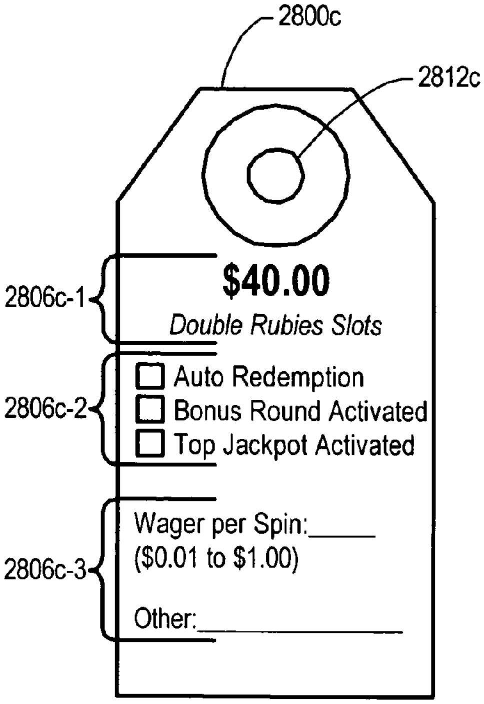

In step 105, a plurality of outcomes of a slot machine game is determined. Determining the plurality of outcomes may comprise, for example, determining a plurality of actual outcomes. For example, if step 105 is being performed by a GD, determining a plurality of outcomes may comprise generating a plurality of random numbers, each random number comprising an outcome. If step 105 is being performed by another device (e.g., the CS 305 and/or the AS 310, both described below with respect to FIG. 3), step 105 may comprise determining an indication of a plurality of actual outcomes generated by a GD. For example, such an indication may be received via an electronic transmission from a device (e.g., a GD may transmit such an indication to a CS and/or AS via a network connection). In some embodiments, such an indication may be received via a session object. (The session object may comprise, for example, a session results ticket (e.g., as depicted in FIG. 27), a packaging medium and/or card, ticket, or token medium (e.g., as depicted in FIG. 28A, FIG. 28B, FIG. 28C, and/or FIG. 28D), a packaging insert or flyer (e.g., as depicted in FIG. 29), and/or any other practicable form and/or type of object that may include, for example, a bar code and/or other encoded information readable by a CS and/or AS, for determining the indication.

An indication of the plurality of outcome may comprise, for example, one or more of the following information:

(i) a sum of payouts won as a result of the plurality of outcomes;

(ii) an ending credit meter balance at the end of a session comprising the plurality of outcomes;

(iii) a set of indicia representative of one of the plurality of outcomes (e.g., a result of a roulette spin, a plurality of symbols representing a hand of video poker, a plurality of symbols that may be displayed along a payline of a reeled slot machine, etc.);

(iv) a game for which the plurality of outcomes is determined;

(v) a sum of wagers posted for the plurality of outcomes;

(vi) a price of the session;

(vii) a beginning credit meter balance at the beginning of a session comprising the plurality of outcomes;

(viii) a player associated with the plurality of outcomes (e.g., in embodiments in which a player requests a session prior to it being executed);

(ix) a casino attendant associated with the plurality of outcomes (e.g., the casino attendant who authorizes, supervises and/or executes the session comprising the plurality of outcomes);

(x) a unique identifier of a session comprising the plurality of outcomes (e.g., such that information regarding the plurality of outcomes may be determined by accessing an appropriate database based on the unique identifier);

(xi) a unique identifier corresponding to an outcome of the plurality of outcomes;

(xii) an identifier of a media file corresponding to an outcome of the plurality of outcomes;

(xiii) a time and/or date at which an outcome of the plurality of outcomes is generated;

(xiv) a gaming device on which the plurality of outcomes is generated;

(xv) a type of gaming device on which the plurality of outcomes is generated;

(xvi) an activation ID used to determine sale of a session; and (xvii) a redemption ID used to determine redemption of a session.

In some embodiments, determining a plurality of outcomes may comprise determining a plurality of representative outcomes. For example, if step 105 is being performed by an AS, determining a plurality of outcome may comprise determining an indication of a plurality of outcomes (e.g., the payouts corresponding to each outcome of the plurality of outcomes, a sum of payouts corresponding to the plurality of outcomes, or any other of the information listed above) and selecting representative outcomes to represent a plurality of actual outcomes generated by a GD.

It should be understood that in some embodiments a plurality of outcomes are generated (e.g., a session of game plays is executed to determine a plurality of outcomes to be recorded on a DVD) prior to any player expressing any interest in purchasing the plurality of outcomes. For example, an entity (e.g., casino, GD manufacturer and/or other entity) may create (or cause to be created) DVDs, each DVD having recorded therein a video representation of a plurality of outcomes, and place the created DVDs on a casino floor for purchase by players. In some embodiments, session objects corresponding to one or more of these pre-created DVDs may also or alternatively be displayed and/or provided to players, such that a player may select a session object to indicate a desire to obtain a corresponding DVD (e.g., containing stored outcomes and/or representations thereof).

In some embodiments, a player may purchase, request or otherwise agree to a session (e.g., the player may request or order a DVD of outcomes to be created on behalf of the player and/or provide or select a session object indicative of a DVD of outcomes—either a pre-recorded DVD or one to be made on-demand for the player). In such embodiments, methods for providing gaming contracts and/or flat rate gaming sessions may be applied to embodiments described herein. Many such methods are described in commonly-owned, co-pending U.S. Provisional Application No. 60/627,670, filed Nov. 12, 2004, entitled "GAMING DEVICE OFFERING A FLAT RATE PLAY SESSION AND METHODS THEREOF"; U.S. Provisional Application No. 60/600,211, filed Aug. 10, 2004, entitled "SYSTEMS, METHODS AND APPARATUS FOR ADMINISTERING GAMING CONTRACTS"; U.S. application Ser. No. 10/636,520, filed Aug. 7, 2003, entitled "SYSTEM AND METHOD FOR COMMUNICATING GAME SESSION INFORMATION"; U.S. application Ser. No. 10/635,986, filed Aug. 7, 2003, entitled "SYSTEM AND METHOD FOR REMOTE AUTOMATED PLAY OF GAMING DEVICES"; U.S. patent application Ser. No. 10/001,089, filed Nov. 2, 2001, entitled "GAME MACHINE FOR A FLAT RATE PLAY SESSION AND METHOD OF OPERATING SAME"; and U.S. Pat. No. 6,077,163, filed Jun. 23, 1997, entitled "GAMING DEVICE FOR A FLAT RATE PLAY SESSION AND METHOD OF OPERATING SAME"; the gaming contract and flat rate play gaming session concepts and descriptions of each of which being hereby incorporated by reference herein.

For example, a player may request a session by (i) actuating an input device of a gaming device, kiosk or other device described herein (e.g., the player actuates an icon of a touch-sensitive display screen advertising "Purchase a DVD" or other similar text), (ii) indicating such a desire verbally to a casino representative (e.g., in person or over the phone), (iii) filling out and submitting forms or other paperwork, (iv) selecting a session object (such as from a display of available session objects), and so on.

In some embodiments, a session may comprise a remote session, wherein a player needn't be present to execute one or more game plays associated with the session (e.g., a player purchases one thousand (1,000) spins of a slot machine for a flat price of fifteen dollars ($15)). For example, after receiving a request to execute such a remote session, a casino attendant may execute (or cause to be executed) the session on the player's behalf using a GD on casino premises. The player may then remotely view data associated with the session (e.g., representative outcomes determined based on the results of the session) at a later time without necessarily gambling outside of casino premises (e.g., the player simply views results which have already been generated in a legal jurisdiction). Those familiar with the current legal framework concerning gambling in the Unites States will appreciate the advantages of such a system (e.g., for one, it allows players to place legal slot machine bets and watch the results from home).

Irrespective of whether a session is executed on behalf of a player after the player requests the session or whether the session is executed prior to any player expressing an interest in the session (e.g., pre-recorded sessions), several parameters and values thereof may be associated with (e.g., define) a session. For example, a session may be defined by one or more parameters, including but not limited to (i) a price (e.g., how much the player pays in exchange for gaining access to the plurality of outcomes determined as a result of a session (e.g., how much a player pays for a DVD on which a video representation of the outcomes is recorded));

(ii) a session duration, which may be defined, for example, in time, number of game plays (e.g., the session ends after two hours or the session ends after one thousand (1,000) game plays) or another ending event (e.g., the session ends when the credit meter balance reaches zero or another predetermined value);

(iii) an average, minimum, maximum or specified wager amount per game play (e.g., a session parameter specifies that twenty-five cents (25¢) will be wagered per game play);

(iv) one or more gaming devices on which game play may occur (e.g., any video slot machine, any video poker machine except “Crazy Triple Joker Poker,” any “Big Texas Oil” machine, the “Big Texas Oil” machine in “Room Z” numbered “GD-BTO-0012”, and so on);

(v) active pay combinations and/or a payout schedule to be used during the execution of game plays comprising the session (e.g., a session parameter specifies that an outcome of “BAR-BAR-BAR” pays fifteen hundred (1,500) coins, and so on);

(vi) a date and/or a time (e.g., of day) during which the session may be executed (e.g., between 6 and 10 a.m. on Jan. 1, 2006);

(vii) a refund rate or amount payable to a player (e.g., the player will receive a refund of fifty percent (50%) of net losses incurred due to the session);

(viii) a manner in which game play or the game results thereof will be made available to players (e.g., the casino will provide a DVD comprising video renderings of outcomes generated previously by a gaming device on the casino floor; the casino will enable the player to play one or more gaming devices on the casino floor in person, such that the player may be present when game play occurs; the casino will provide a code which a player may later use online to access video renderings of outcomes previously generated by a gaming device on the casino floor; etc.); and (ix) other stipulations related to game play (e.g., a number of paylines of a slot machine game that should be bet on, a strategy for holding/discarding cards in a poker game, wager per payline, etc.).

In embodiments in which a session is executed on behalf of a particular player, a player may select, purchase or otherwise agree to such parameters when requesting a session (e.g., the player uses an input device of a GD to select certain parameters, the player selects certain parameters by checking off appropriately labeled boxes of a session object such as a paper form, the player verbally instructs a casino attendant that he agrees to certain parameters, and so on). It should be noted that, as described in the above-referenced commonly owned patents and patent applications, the parameters a player selects may have an affect on the session price (e.g., generally, more game plays, higher wager amounts and more active pay combinations may require higher session prices).

In this manner, a player may request that a session characterized by certain parameters be executed. For example, a player may provide a session price of fifteen dollars ($15), and in turn, a casino may agree to provide one thousand (1,000) game plays of a particular GD at a wager amount of twenty-five cents (25¢) per game play. Further, a manner in which game play or game results may be provided may be stipulated (e.g., the casino will provide a DVD comprising a video presentation of outcomes generated by a GD on the casino floor). In some embodiments, additional parameters may define a session and may be set by a player, casino and/or other entity. For example, a time during which game play may occur may be stipulated (e.g., game play will be generated on the player's behalf at any time deemed appropriate by the casino before Thursday night). Still further, a time/date when game results may be provided to a player may be stipulated (e.g., the player agrees to allow one to two (1-2) weeks for the delivery of a DVD comprising a video presentation of outcomes generated by a GD on the casino floor). Accordingly, a system may receive a request to execute a session, such as a remote session, wherein a GD may be configured to execute a plurality of game plays on the player's behalf while the player is not present, with the results of said game plays being provided to a player in a manner such that the player may view the results remotely.

It should be noted that, in some embodiments, when requesting that a session be executed, a player may provide various contact information (e.g., postal address, phone number, e-mail address, and so on), such that players may be provided with the results of the session via the contact information (e.g., a code my be e-mailed to the e-mail address, the code for accessing the results online or a DVD may be mailed to the postal address, etc.).

In embodiments in which a session is executed prior to any player expressing an interest in the session (e.g., embodiments in which DVDs of sessions are massively produced and made available for purchase), an entity such as a casino, GD manufacturer and/or other entity may define the parameters and values thereof defining a session. For example, such an entity may program a GD to execute one thousand (1000) sessions being defined by a set of particular parameters (and values thereof). One or more of these parameters may then be indicated on and/or by a session object displayed to the player, and the player may select a session object corresponding to a pre-recorded DVD that was created using parameters (and/or parameter values) desirable to the player.

In some embodiments, step 105 (or another or additional step) may comprise storing an indication of parameters defining a session in association with the session (e.g., in association with a unique session identifier in a record of an appropriate database). In one or more embodiments, a unique session identifier (e.g., numeric or alphanumeric identification code) may be associated with each session that is executed or that is scheduled for execution. In some embodiments, such information may be stored electronically. For example, various parameters and values thereof may be stored in a record of a database, each record defining a session executed, available for execution and/or scheduled to be executed. It should be noted that such a database may be stored in a variety of locations, including but not limited to within a GD and/or CS. Alternately or additionally, a physical, non-electronic record of such session parameters may be kept. For example, if a player has filled out a paper form indicating various session parameters, the form may be filed away or saved such that it may later be used when executing the session. The indications of the session parameters may also or alternatively be printed and/or otherwise indicated on a session object such as a DVD jewel case, such that the jewel case becomes indicative of a particular one and/or type of pre-recorded session DVD. In another example, both a physical and an electronic record may be kept (e.g., a casino attendant may enter desired session parameters and values thereof using a computing device such that they are recorded in a database, then use a software application of the computing device to print a physical piece of paper (such as a packaging object insert or a label) indicating the desired parameters and values thereof).

In summary, irrespective of whether a session is prompted by a request from a player or is part of a mass production process, step 105 comprises determining a plurality of outcomes comprising the session. The step may comprise one or more subroutines, such as a subroutine for (i) determining one or more parameters (and values thereof) defining a session comprising the plurality of outcomes; (ii) generating the plurality of outcomes; (iii) determining an indication of the plurality of outcomes (which may comprise determining an indication of a plurality of actual outcomes and/or determining an indication of a plurality of representative outcomes); (iv) decoding or interpreting the indication to determine a plurality of representative outcomes; and/or (v) selecting a plurality of media files, each media file corresponding to an outcome of the plurality of outcomes.

It should be noted that when reference is made to an "outcome" herein, such reference may refer to an actual outcome and/or a representative outcome. In step 110, an indication of the plurality of outcomes is stored. Storing an indication of the outcomes may comprise, for example, one or more of (i) storing an indication of the outcomes in a memory (e.g., a mass storage device) of a device such as a GD, CS or AS; (ii) recording (or causing to be recorded) an indication of the plurality of outcomes on a DVD; and/or (iii) printing (or causing to be printed and/or otherwise marking or causing to be marked) an indication of the plurality of outcomes on a session object (e.g., a session results ticket, a token, a packaging object, a form, and/or a card). It should be understood that an indication of a plurality of outcomes may comprise any and all of the information described with respect to step 105.

For example, storing an indication of outcomes may comprise a GD transmitting an indication of the plurality of outcomes to a CS, and the CS in turn transmitting the indication (or another indication based on the indication received from the GD) to an AS. Step 110 may further comprise the AS creating a video representation of the plurality of outcomes (e.g., by selecting a plurality of media files, each media file corresponding to one of the plurality of outcomes) and recording the media files onto a DVD (and/or other tangible medium).

In one embodiment, storing an indication of the plurality of outcomes may comprise storing a representative outcome for each of the plurality of outcomes. In one embodiment, storing an indication of the plurality of outcomes may comprise recording a plurality of media files onto a DVD, each media file corresponding to one outcome of the plurality of outcomes or, alternatively, combining the plurality of media files into a single media file and storing that to the DVD. In one embodiment, storing an indication of the plurality of outcomes may comprise storing an indication of each outcome of the plurality of outcomes.

In one embodiment, storing an indication of the plurality of outcomes may comprise populating a record of an appropriate database (e.g., with an indication of each outcome of the plurality of outcomes) for subsequent creation of a video presentation of the plurality of outcomes. For example, a first program of a device may receive an indication of the plurality of outcomes and determine particular representative outcomes (e.g., particular payouts and the order thereof, particular media files and the order thereof, and/or particular sets of indicia, each set corresponding to an outcome of the plurality of outcomes). This first program may cause the determined information to be stored in a database. A second program may then create a video representation of the outcomes. A third program may then cause the video presentation to be recorded onto a DVD. Of course, a single program may be used or the first, second and/or third program may be combined in any manner practicable and desirable. Further, the first, second and/or third program may each be performed by different devices or the same device, and the devices may or may not be geographically proximate to each other, depending on what is practicable and/or desirable.

In one or more embodiments, step 110 may comprise storing a result of a session (e.g., an indication of outcomes determined for the session) in an electronic manner. For example, as described, data associated with a session may be stored electronically in a session database (e.g., a session database 425, an example record of which is illustrated in FIG. 7). In some embodiments, session data may be stored on a smart card (e.g., a smart card inserted into a reader device in communication with a GD) or another portable storage medium.

Storage and/or transmission of an indication of the plurality of outcomes may occur at any time. For example, some indication of the plurality of outcomes may be stored and/or transmitted prior to the execution of a session corresponding to the plurality of outcomes (e.g., an indication of the session identifier and/or parameters of the session may be stored in a record of a database upon the session being scheduled and/or ordered). In another example, some indication of the plurality of outcomes may be stored and/or transmitted during or after the execution of a session (e.g., game play results are individually stored as they are generated; game play results are stored in Random-Access Memory (RAM) while they are being generated, then written to Read-Only Memory (ROM) and erased from RAM; and so on). Thus, step 110 may comprise transmitting and/or storing an indication of a plurality of outcomes electronically to a memory.

It should be appreciated that such data may be stored electronically in a variety of formats. For example, as depicted by FIG. 7, various data may be stored as records of a database entry associated with a session identifier. For example, in one embodiment, a database may store text indicating any or all of a wager amount, outcome, outcome identifier and payout amount associated with a particular game play number (e.g., the first game play of a session is game play "1"). In some embodiments, an indication of a plurality of outcomes or other data associated with a session may be stored electronically in an encoded fashion. For example, a bit function representing an outcome may be stored in a database (e.g., "BAR-LEMON-CHERRY" is stored as "0129-2938-3847", each four-digit sequence representing a particular symbol).

In some embodiments, storing an indication of the plurality of outcomes may comprise accessing a media file database (e.g., an example embodiment of which is depicted in FIGS. 11A and 11B, respectively) to determine a media file (e.g., a media file associated with a result of a game play), and then storing an indication of a game play number along with an associated media file.

Alternately or additionally, storing an indication of the plurality of outcomes may comprise outputting the indication in some physical, non-electronic fashion. For example, in some embodiments, a GD may actuate a printer device to print a bar code encoding the indication of the plurality of outcomes (e.g., an indication of a session result). For example, a GD may print upon a conventionally sized Ticket-In-Ticket-Out (TITO) cashless gaming ticket (e.g., a session object) a high-density barcode encoding an indication of the plurality of outcomes associated with an executed session. For example, text, numerals or other symbols stored within a session database (e.g., a series of outcome identifiers) may be encoded such that they are represented graphically by a barcode such as a high-density barcode. Various methods of encoding such text and/or numerals graphically using a high-density barcode are contemplated. In further embodiments, encoding an indication of the plurality of outcomes as a printed barcode may comprise accessing a media file database (e.g., see FIG. 12A) to determine a media file associated with an outcome, and then encoding a game play number along with an associated media file or indication of an associated media filed (e.g., an identifier that uniquely identifies a media file).

Accordingly, in various embodiments, storing an indication of the plurality of outcomes may comprise outputting and/or storing the indication in an electronic and/or physical fashion. As described, in some embodiments, a session may have been executed without interaction from a user (e.g., agent), as an electronic signal instructing a GD to execute a session defined by certain parameters and values thereof may be sent by a separate device. Accordingly, in some embodiments, a person (e.g., a casino attendant or player) may approach a GD and access or attain an indication of the plurality of outcomes corresponding to the session. For example, a casino attendant may be dispatched to collect a cashout ticket, video ticket and/or session results ticket from a GD. In another embodiment, a casino attendant may be dispatched with a smart card or other portable memory device (e.g., a CPD). The casino attendant may insert the smart card into a reader device of a GD, and the indication of the plurality of outcomes may be transferred or copied from a memory of the GD to a memory of the smart card or other portable memory device. For example, in one embodiment, an indication of the plurality of outcomes may be stored temporarily in GD memory until it is retrieved by a casino attendant or player (and, e.g., transferred to a smart card) and/or transmitted to another device.

In step 115, it is determined whether the last of the plurality of outcomes have been generated. In some embodiments, a session is not considered to be completed (and thus the results of the session not ready for sale or other provision to a player) until the last of the outcomes comprising the session have been generated. Accordingly, it may be determined whether the last of the outcomes have been generated. For example, a parameter of a session defining the duration of the session may be determined (e.g., a number of outcomes) and compared to the data comprising the indication of the plurality of outcomes. If the data indicates that the number of outcomes defined by the parameter is the same as the number of outcomes indicated by the indication, it may be determined that the last of the plurality of outcomes has been generated. In another example (e.g., one in which step 115 is being performed by a GD), determining whether the last of the plurality of outcomes have been generated may comprise determining whether the session has been completed by determining whether an end event defined by a parameter of the session has occurred (e.g., determining an elapsed time since a beginning of the session).

In some embodiments an indication of a plurality of outcomes may not be received by a particular device performing step 115 unless and/or until the last of a plurality of outcomes has been generated. In such embodiments, step 115 may be superfluous. Alternatively, an affirmative determination to step 115 may be determined if it is determined that the indication of the outcomes has been received.

In one embodiment, step 115 may further comprise determining whether the last of representative outcomes corresponding to actual outcomes of a session have been determined. For example, if step 115 is being performed by a device creating a video representation of the outcomes or selecting media files for the plurality of outcomes, each media file comprising a representative outcome, step 115 may comprise determining whether the last of the representative outcomes has been determined (e.g., whether a representative outcome for each of a plurality of actual outcomes comprising a session has been determined).

If it is determined that the last of the plurality of outcomes has not been generated (e.g., the session comprising the plurality of outcomes is not yet complete), the process returns to step 105, in which the remainder of the plurality of outcomes (or more of the plurality of outcomes) are determined. Otherwise, the process 100 continues to step 120.

In step 120, the plurality of outcomes is sold to a player in exchange for a price. Of course, it should be understood that in some embodiments the plurality of outcomes may be provided to a player without receiving a price therefore. For example, the plurality of outcomes may be provided as a reward (e.g., for loyalty to a casino or certain desirable play behavior), gift, and/or incentive. Further, it should be understood that the price received in exchange for the plurality of outcomes may be a monetary amount (e.g., U.S. dollars) or may be in another form of consideration. For example, a player may agree to perform an activity or engage in a behavior in exchange for the plurality of outcomes. For example, a player may answer survey or marketing questions and/or commit to returning to a casino within a predetermined time frame.

Selling the plurality of outcomes to a player in exchange for a price may comprise, for example, selling a DVD to the player, the DVD having recorded thereon a video representation of the plurality of outcomes. Additional detail on such an embodiment is provided below. In another example, selling the plurality of outcomes to a player may comprise providing access to the player to the plurality of outcomes in another manner. For example, a code may be provided to the player, the code being associated with an indication (e.g., a video presentation) of the plurality of outcomes as it is stored on a server device (e.g., a server device operable to facilitate a Web site). The player may enter the code (e.g., online) and thus gain access to the indication of the outcomes. Additional detail on such an embodiment is provided below.

In some embodiments, selling the plurality of outcomes to a player may comprise providing an indication of the plurality of outcomes to a player who has previously ordered or requested that the plurality of outcomes be generated, and may have already paid for the outcomes. In such embodiments, selling the plurality of outcomes to the player may comprise communicating (e.g., transmitting) an indication of the outcomes (or an indication of an availability of the outcomes) to the player. For example, a DVD may be mailed to the player or a code or other information (e.g., an executable file that displays representative outcomes when opened or run) may be e-mailed to the player.

In one embodiment, selling the plurality of outcomes to a player may occur at a POS of a casino. For example, a player may request to purchase a DVD of outcomes at the POS. The sale of the DVD may involve various procedures for ensuring the security and legitimate sale of the DVD. Such procedures are described in detail herein (e.g. particularly with respect to FIG. 25).

As described, in one embodiment selling a plurality of outcomes to a player may comprise providing the player access to a video presentation representing the outcomes, such that the player may view game results from a location that is remote from a casino (though the results themselves may have been generated within a casino). In some embodiments, player contact information received when a player purchases a session or video presentation based on the session (e.g., address, phone number, e-mail address) may be used in providing the player access to the video presentation.

In some embodiments, providing the player access to a video presentation may comprise storing or transmitting the video presentation electronically such that it may be accessed or viewed by the player. For example, in one embodiment, providing (and, e.g., creating) a video presentation may comprise storing various media files on a server that may be accessible by purchasers via computing devices such as personal home computers (of course, other computing devices, such as PDA devices, cellular phones, and so on are contemplated). Accordingly, providing access to a video presentation may comprise allowing a player to access such stored files. For example, in one embodiment, a player may be provided with a code that may be entered (e.g., using a form of a Web page) to gain access to such a video presentation. Such a code may comprise a session identifier. For example, after being given a code, the player may visit a Web page and enter the code. If the code is valid (e.g., as determined by a server, the session has been executed and the code has been legitimately provided to the player and is associated with the session), the player may then use a Web interface (e.g., a virtual slot machine created using Macromedia Flash or a similar program) to view the stored video presentation associated with the purchased session. For example, the player may press a "spin" button of such a virtual slot machine, and upon doing so, a server may be operable to (i) determine a game play number (e.g., if it is the first time the player has pressed the spin button, the game play number is "1," and so on), (ii) access a database or other memory structure based on the session identifier so as to determine one or more media files in association with the game play number, and (iii) output the appropriate media files via the Web interface.

In other embodiments, as already described, a video presentation may be transmitted electronically to a player, such as via electronic mail (e.g., an executable software application is mailed electronically to players such that they may open the application and view outcomes comprising a purchased session) or video broadcasting.

In some embodiments, as also described, a video presentation of a plurality of outcomes comprising a session may be output via tangible media such as a DVD or CD-ROM. Accordingly, in some embodiments, such tangible media may be provided, shipped or mailed to a purchaser of a session. For example, the tangible media may be handed to the player upon the player purchasing the session, may be mailed to a mailing address indicated by a player, may be stored in a centrally-accessible database or in written form, etc.

Figure 2:
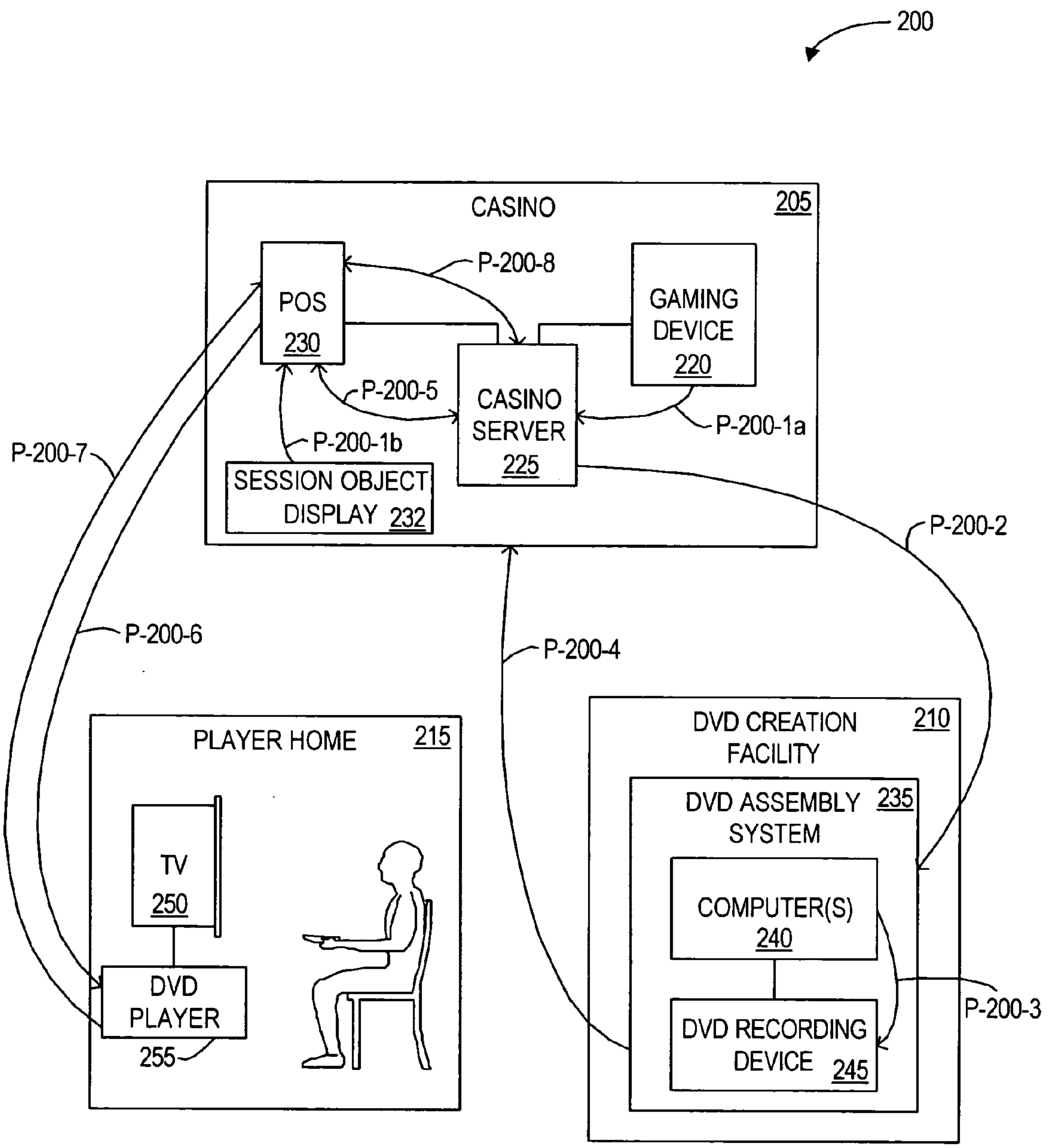
FIG. 2 is a block diagram of an exemplary “life cycle” of a Digital Video Disc (DVD) according to some embodiments.

It should be understood that the various steps of process 100 may occur at different locations. For example, a plurality of outcomes may be generated at a casino and transmitted to a DVD assembly facility that is remote from the casino. The DVD assembly facility may then create a DVD having recorded therein a video representation of the plurality of outcomes. Various processes for how such a DVD may be created are described in detail herein. The DVDs assembled at such a DVD assembly facility may then be transported to another location (e.g., to a casino, to be made available for sale to players or directly to a player's home if the player has previously ordered a DVD). FIG. 2, described below, illustrates the various processes and locations that may be involved in some embodiments.

Referring now to FIG. 2, illustrated therein is a block diagram of an exemplary "life cycle" 200 of a DVD (and/or other tangible medium comprising a plurality of outcomes) according to some embodiments. The life cycle 200 illustrates the various entities and processes that may be involved in accordance with some embodiments. It should be noted that each of the processes described briefly with respect to FIG. 2 is described in detail elsewhere herein. FIG. 2 is provided herein to illustrate some possible implementations of various embodiments.

As illustrated in FIG. 2, in accordance with some embodiments three (3) distinct locations may be involved in providing a DVD of outcomes to a player. The first location is a casino 205, at which a player may purchase and/or redeem a DVD. The second location is a DVD creation facility 210, at which a DVD of outcomes may be created based on outcomes determined by a GD. The third location is a player's home 215 and/or other location remote from the casino 205, at which location a player may view the DVD of outcomes. While three (3) distinct locations are depicted in FIG. 2 and generally described in conjunction herewith, it should be understood that fewer or more locations may be involved in the life cycle 200. In some embodiments for example, the DVD creation facility 210 (and/or components thereof) may be located in the casino 205. The DVD creation facility 210 may comprise, for example, components that reside on a casino floor, such as next to and/or coupled to a slot machine and/or other GD, and/or that reside elsewhere in the casino 205 (such as in a secure back-room, behind a customer service counter, etc.). Similarly, although the player may view the outcomes stored on the DVD remotely from the player's home 215, the player may also or alternatively view the outcomes in the casino 205 (e.g., in a room of a hotel operated by and/or associated with the casino, in a casino restaurant, and/or while watching a show or sitting by a pool of the casino) and/or elsewhere (e.g., while walking down the Las Vegas strip or the Atlantic City Boardwalk, while in a taxi, and/or while on an airplane).

The casino 205 may, according to some embodiments, include a CS 225 that facilitates the sale and redemption of DVDs of outcomes. The CS 225 is generally in communication with a GD 220 at which outcomes are created, based on which outcomes a video presentation of outcomes for the DVD will be created. The CS 225 is also in communication with a POS 230, at which a player may purchase a DVD of outcomes. In some embodiments, the casino 205 may also or alternatively comprise a session object display 232. Players may select session objects provided by the casino 205 via the session object display 232, for example, to indicate one or more parameters that are desired with respect to the outcomes to be purchased. According to some embodiments, the session object display 232 may comprise any form, type, and/or configuration of display, presentation, offering, and/or other system, device, and/or object operable to facilitate the provision and/or sale of DVDs (and/or other tangible mediums) to players. Examples of such session object displays 232 may include, but are not limited to, shelves, racks, peg-board displays, slat-wall displays, pegs and/or dowels or other hanging devices, boxes, pads (e.g., a pad of cards, forms, and/or tickets), and/or containers.

The DVD creation facility 210 generally includes a DVD AS 235. The DVD AS 235 is generally comprised of a computer 240 and a DVD recording device 245. The DVD creation facility 210 and the components thereof 235, 240, 245 may generally be operable to create, "burn", stamp, and/or record DVDs and/or other tangible mediums such that a plurality of gaming outcomes may be provided to a player. As described herein, in some embodiments these DVDs may be created prior to an indication of a specific player's interest (e.g., pre-recorded DVDs), while in other embodiments the DVDs may be created after receiving a player indication (e.g., on-demand DVD creation).

The player home 215 may generally include a TV 250 in communication with a DVD player 255. It should be understood, of course, that if a tangible medium other than a DVD is used to provide a video and/or other presentation of outcomes to a player, the player home 215 may include devices appropriate for reading and/or outputting the video and/or other presentation to a player (e.g., if the outcomes are stored on a CD-ROM, the player home may include a Personal Computer (PC) operable to read and/or a display device operable to output the information recorded on the CD-ROM; neither of which are specifically shown in FIG. 2).

In some embodiments, a player's obtainment of a DVD of outcomes may begin with a process P-200-1*a*. According to some embodiments, the process P-200-1*a* may initiate when the GD 220 generates a plurality of outcomes for a session and communicates (e.g., transmits) an indication of the plurality of outcomes to CS 225. In an alternate embodiment, GD 220 may communicate an indication of the plurality of outcomes directly to AS 235 (e.g., in lieu of or in addition to communicating the indication to CS 225). It should be noted that, as described, a player may have requested the plurality of outcomes and/or session prior to the outcomes being generated and/or transmitted at P-200-1*a*. In such embodiments, a player's obtainment of a DVD of outcomes may alternatively initiate when the player approaches the POS 230 to request the plurality of outcomes (and, e.g., provides the desired parameters and values thereof for the session comprising the plurality of outcomes, e.g., by selecting, providing, and/or indicating a session object).

The player may, for example, select a session object such as a DVD jewel case and/or a card or form from the session object display 232 comprising a plurality of available session objects. Examples of some possible forms and/or configurations of session objects are depicted in FIG. 28A, FIG. 28B, FIG. 28C, and/or FIG. 28C herein. In some embodiments, such session objects may comprise an indication of one or more parameters associated with pre-stored and/or desired sets of outcomes. In some embodiments, the indication of the parameter may comprise an indication of a pre-defined parameter (e.g., a parameter and/or parameter value defined by an entity other than the player, and then simply selected by the player, such as a pre-printed indication of a number of game plays), a parameter at least partially defined by the player (such as a form indicating a parameter of a wager amount per game play, wherein the player fills in one cent (1¢) to define the value of the parameter), and/or a value associated therewith. The player may, in accordance with step P-200-1*b*, for example, provide an indication of the selected session object via the POS 30. In some embodiments, the indication may also or alternatively be provided to the CS 225, to the GD 220, and/or to one or more other objects, devices, and/or entities, such as a casino employee (not shown). According to some embodiments, such an indication may initiate a determination of the outcomes (and/or type or nature of outcomes) desired by the player. The outcomes may be at least partially identified by the parameter, for example, and may either be retrieved from storage (e.g., in the case of pre-recorded DVDs) or created for the player (e.g., DVDs created on-demand). In the case that a DVD is created "on-demand" for the player, the life cycle 200 may continue to process P-200-1*a*, as introduced above, and then continue as follows.

Once the GD 220 (or another device since, as described herein, any reference to a particular device performing a particular function is not meant to be limiting since the function may be performed by another device, as is or becomes desirable and/or practicable) transmits an indication of the plurality of outcomes, which will be referred to as session result data at least for purposes of FIG. 2, the CS 225 communicates the session result data to DVD AS 235. For example, the CS 225 may electronically communicate the session result data in an encrypted fashion to CS 225. The session result data may include, for example, an indication of one or more of (i) a game for which the plurality of outcomes are generated; (ii) a price of the session; (iii) a beginning credit meter balance for the session; (iv) an ending credit meter balance for the session; (iv) a number of game plays included in the session; (v) a wager per game play; (vi) a sum of payouts obtained for the session; (vi) particular outcomes (e.g., sets of indicia and/or payouts) obtained during the session; (vii) a strategy employed during the session (e.g., if any decision-making is required during a game play); and/or (viii) a session identifier. In some embodiments, the session result data may then be transmitted and/or provided to the DVD creation facility 210, the DVD AS 235, and/or the computer 240 thereof, at P-200-2. In some embodiments, session data may include an indication of a time (e.g., date and/or time of day) at which one or more outcomes of a session were generated, determined, transmitted and/or stored.

The computer 240 may then, according to some embodiments, create a video presentation based on the received session result data. For example, the computer 240 may select or create appropriate media files (e.g., video clips, each video clip corresponding to a particular representative outcome to be included in the video presentation) based on the received session result data. The computer 240 may also determine an order in which the media files are to be put together in the video presentation. Such an order may be determined, for example, based on an order in which outcomes are generated by GD 220 (which order may be included in the session result data received). In another example, the order may be determined based on another desired characteristic. For example, it may be desirable to represent the outcomes such that the majority of outcomes corresponding to large payouts occur towards the end of the video presentation or such that payouts that correspond to payouts greater than zero are substantially evenly interspersed among outcomes that correspond to payouts of zero credits. It should be understood that a video presentation created in accordance with some embodiments may include data other than the mere representation of outcomes obtained as a result of a session. For example, inserted pauses to mimic a time at which a player would normally pull a slot machine handle or otherwise initiate the next game play may be interspersed between each video clip representing an outcome, to approximate the experience a player may have while playing a GD on a casino floor. This additional data may be, in some embodiments, additional video data, or in other embodiments, navigation data such as DVD pause commands. In another example, audio and/or video of messages may also be included (e.g., congratulatory messages appear upon an outcome corresponding to a large payout being displayed).

Once the computer 240 creates a video presentation (e.g., selects the media files to be included in the video presentation and the order thereof), the computer 240 may, in process P-200-3, direct the DVD recording device to record the video presentation onto a DVD (and/or other tangible medium). The DVD recording device 245, for example, records (e.g., stamps) the video presentation onto a DVD.

Once the DVD is created (which, in some embodiments, may include storing the DVD in a jewel case, including marketing materials with the DVD, labeling the DVD with unique identifiers (e.g., in the form of barcodes) as appropriate, and/or wrapping the DVD in secure packaging), the DVD may be transported from the DVD creation facility 210 to the casino 205 (and/or to the CS 225) in process P-200-4. For example, a shipment of DVDs created in accordance with the above processes may be shipped to the casino. In some embodiments, data indicative of the DVDs created and/or being shipped may be communicated to the casino 205. For example, an indication of a unique DVD identifier that corresponds to a unique session identifier of a session based on which the DVD was created may be communicated. Such information may be communicated electronically and/or via printed form (e.g., as documents included in the shipment). In some embodiments, the created DVD may already be located in the casino 205, such as in embodiments where the DVD creation facility 210 resides in the casino 205 (such as on the casino floor, etc.). In such embodiments, the transporting of the DVD may occur entirely and/or substantially entirely within the casino 205 (and/or between or amongst various casino properties and/or buildings or facilities). In the case that a player requests a DVD at a customer service counter, for example, the DVD may simply be transported from a storage rack (not shown) and/or from the DVD creation facility 210 via a casino employee, conveyor belt, mechanical and/or robotic arm, chute, vacuum device, etc.

Once the DVD arrives at the casino 205, it is made available for purchase to players (in pre-recorded DVD embodiments). For example, the DVD may be placed on the session object display 232, comprising a display of DVDs and/or jewel cases on a floor of the casino 205 (e.g., next to a GD 220 that is operable to facilitate a game based on which the outcomes of the DVD were generated), behind a counter of the casino 205, in a hotel room associated with the casino 205, etc. According to some embodiments, many pre-recorded DVDs may be stored on one or more racks, shelves, in one or more cabinets or containers, and/or on or in other devices (none of which are explicitly shown in FIG. 2, but which may comprise and/or be similar to the session object display 232), such that such DVDs may be retrieved and/or provided to players upon request (such as upon the receipt and/or indication of a session object corresponding to one or more of the pre-recorded DVDs). Information regarding the DVD is generally stored in CS 225. For example, a unique DVD identifier (which may also be included on the DVD and/or DVD packaging) may be stored in a database (such as the available DVDs database 445 from FIG. 4), along with other information associated with the DVD (e.g., a redemption value of the DVD and a status of the DVD (e.g., whether it has yet been sold and/or redeemed)). In some embodiments, such as "on-demand" DVD creation embodiments, once the DVD is created and/or transported to the casino 205, the DVD may be provided and/or sold to the player that has requested the DVD creation.

A player who desires to purchase the DVD may then request to purchase the DVD at POS 230 (e.g., if the player has not already done so at P-200-1*b*). For example, a player may select the DVD from a display (such as the session object display 232) on a casino floor and bring it to POS 230. In another example, the DVD may be available at a merchant associated with the casino and POS 230 and the player may select the DVD from a shelf of the merchant and present it for purchase at POS 230. In yet another example, the DVD may be located behind an employee counter of a POS 230 and the player may request to purchase the DVD by informing a casino attendant (such as by providing an indication of a session object located on the session display 232 to the attendant, and/or by simply requesting a DVD and/or type of DVD from behind the counter), who selects the DVD from behind the counter for the player (e.g., based on the indication of the parameter associated with the selected session object, and/or based on other indications provided by the player—such as verbal, written, and/or menu-actuated indications). The purchase of the DVD is facilitated in process P-200-5, in which process the POS 230 communicates with CS 225 to verify that the DVD has not previously been purchased and is available for sale. The process P-200-5 may include other steps for ensuring that the DVD is sold in a secure manner, as described in detail herein. For example, an identifier of the player may be received and/or an activation code for the DVD may be received from CS 225. Once the player provides the appropriate price for the DVD, the player is provided with the receipt and DVD and the purchase is complete. In some embodiments, however, the DVD may be provided to the player for other and/or no consideration. The player may be required to perform (or not perform) an act, for example, and/or may be given or awarded the DVD as a promotion, incentive, gift, and/or other benefit. In such embodiments, the "sale" may be considered to be complete upon performance (or verification of non-performance) of the act and/or simply upon the providing of the DVD to the player. According to some embodiments, the "sale" may not be considered to be complete until the player redeems the DVD, as described below.

The player may then take the DVD home 215 in process P-200-6 and view the video presentation of outcomes at the player's leisure (e.g., utilizing the TV 250, DVD player 255, and/or other appropriate device). The player may subsequently return to the casino and request a payment of the redemption value of the DVD, in process P-200-7. For example, the player may visit POS 230 in order to redeem the DVD. In some embodiments, if the ending credit meter balance of a session, which the DVD redemption value is generally a function of, is greater than zero, the player may obtain the redemption value by returning to the casino with the DVD and receipt.

According to some embodiments, the amount tendered to the player in exchange for the DVD may be greater than or less than the redemption value of the DVD. In the case that the player obtained the DVD as a promotion and/or otherwise provided no payment upfront, for example, the amount tendered to the player may be equal to the difference between the redemption value and an amount charged for obtaining the DVD. In some embodiments, the amount charged as a "fee" for obtaining the DVD may be equivalent to the amount that the player would have otherwise had to pay upfront to receive the DVD (e.g., a purchase price and/or wager amount). In some embodiments, the post-obtainment "fee" (e.g., the "redemption fee") may be greater than an upfront fee to make up for the fact that, by not paying for the obtainment of the DVD, the player can never loose any money on the DVD (e.g., even with a negative ending credit balance, the player simply does not "redeem" the DVD, and thus experiences no net loss, since no payment has ever been made). While in contrast, an upfront payment causes the player to realize an immediate "loss" (equivalent to the purchase amount), with the ending credit balance (e.g., redemption value) being capable of either reducing the player's "loss" (in the case of a redemption value equal to or less than the purchase amount) or erasing the player's "loss" (in the case of a redemption value greater than the purchase price), upon redemption.

Upon receiving a request to collect a redemption value of a DVD at a POS 230, a process P-200-8 is performed for verifying and authorizing the provision of the redemption value to the player. For example, a legitimate purchase by the player of the DVD may be verified. Additionally, it may be verified that the redemption value has not previously been collected. An example redemption process for redeeming a redemption value of a DVD is described in detail herein with respect to FIG. 23.

Of course, it should be understood that a player need not view the video presentation in order to collect the DVD redemption value. As described herein, in some embodiments a player may be allowed to collect the redemption value of a purchased DVD without ever opening the DVD and/or without ever viewing the video presentation of the DVD. Further, it should be noted that, in some embodiments, a player need not return to the casino in order to collect the DVD redemption value. As is described herein, in some embodiments the DVD redemption value may be provided to the player who purchased the DVD after a predetermined period of time from the purchase of the DVD passes (e.g., one month after the DVD is purchased, a check for the redemption value is mailed to the player if the player has not yet collected the redemption value). In some embodiments, a player may request to collect the redemption value of a DVD without being required to visit the casino (e.g. a player may call or e-mail the casino or send in his DVD and receipt therefore via postal mail in order to collect the redemption value).

In some embodiments, as described herein, a player may be provided with a benefit for returning to a casino after purchasing a DVD even if the DVD redemption value is zero and/or the credit meter balance associated with the session based on which the DVD was created is zero. For example, a player may be provided with free game plays, comp points, discounts, and/or other prizes.

II. Systems

Figure 3:
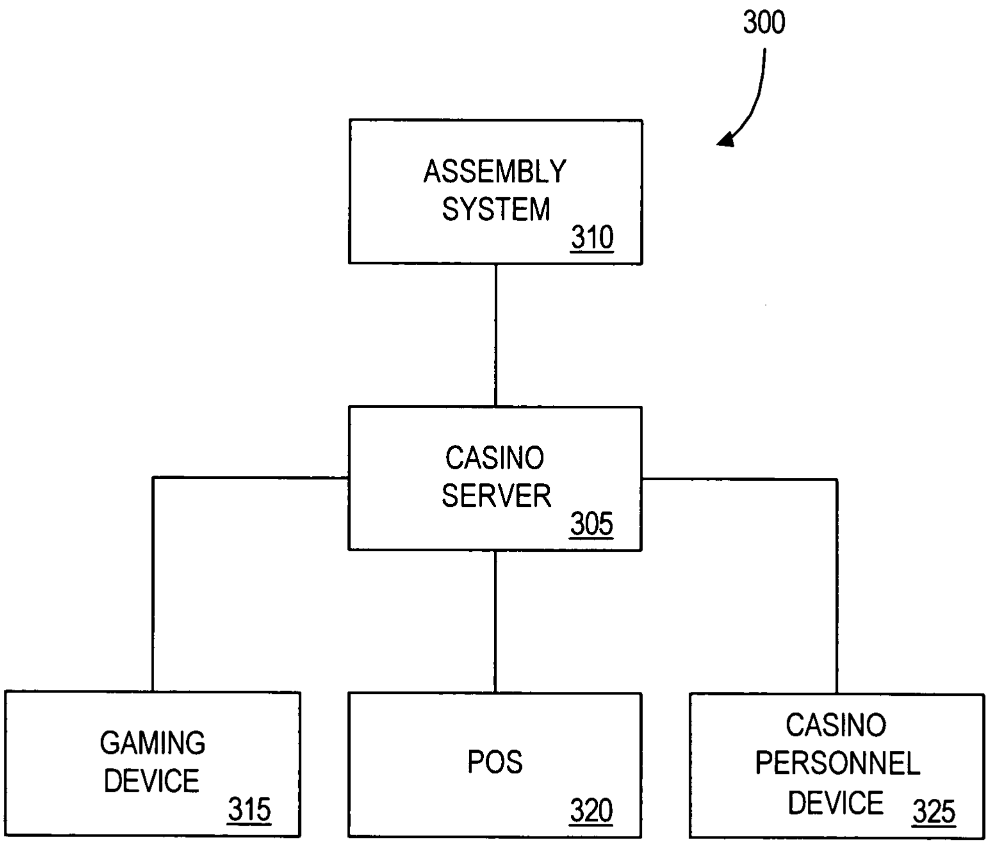
FIG. 3 is a block diagram of an exemplary system in accordance with some embodiments.

Referring now to FIG. 3, illustrated therein is a block diagram of an embodiment of an exemplary system 300 that may be utilized to implement one or more embodiments described herein. The system 300 generally comprises a CS 305. An example embodiment of the CS 305 is described in detail herein with respect to FIG. 4.

The CS 305 is generally operable to communicate with an AS 310. The AS 310 may be operable, for example, to assemble or otherwise create or facilitate DVDs or other tangible media storing outcomes in accordance with embodiments described herein. An example embodiment of the AS 310 is described herein with respect to FIG. 5. In one embodiment, the AS 310 may be located in a location remote from a casino in which the CS 305 is located. In other embodiments, the AS 310 may be located in the same location as the CS 305. In one embodiment, some or all of the functions described herein as being performed by the AS 310 may instead or in addition be performed by the CS 305 and/or another device. In some embodiments the CS 305 and the AS 310 are operated by the same entity, irrespective of whether they are each located in the same location or remote locations (e.g., a casino may operate both). In other embodiments, the CS 305 is operated by a first entity (e.g., a casino) while the AS 310 is operated by a second entity (e.g., a manufacturer of gaming devices).

The CS 305 is further operable to communicate with a GD 315. The GD 315 may be operable, for example, to generate a plurality of outcomes in accordance with embodiments described herein. The GD 315 may comprise, in one embodiment, the GD 315 on a casino floor that is also operable to be used by a player in a conventional manner. In other embodiments, the GD 315 may comprise a modified GD (MGD) that is described in detail herein with respect to FIG. 6. Although only a single GD is shown, any number of GDs 315 may be used. An example embodiment of a GD 315 is described herein with respect to FIG. 6.

The CS 305 is generally further operable to communicate with a POS 320. Although only a single POS is shown, any number of POSs 320 may be used. The CS 305 is further operable to communicate with a CPD 325. A CPD may be used, for example, by an employee of a casino to facilitate one or more embodiments described herein. Although only a single CPD 325 is shown, any number may be used.

In some embodiments, various casino locations (e.g., change booths, customer service counters, kiosks, shops, restaurants, etc.) may utilize POS terminals to facilitate various processes described herein. For example, in some embodiments, a player may purchase a DVD containing a plurality of outcomes previously generated by the GS 315 and/or via the POS 320. In another example, a player may request at the POS 320 that a plurality of outcomes be generated in accordance with one or more parameters (predefined parameters and/or player-defined parameters) specified by the player and stored on a DVD to be provided to the player. Thus, in some embodiments, a POS 320 may be utilized to (i) receive from a player a request to purchase a DVD of outcomes (such as by receiving an indication of a session object from the player); (ii) verify and/or authorize the sale of the DVD; (iii) accept payment in exchange for the DVD; and/or (iv) provide a payout corresponding to the DVD upon a player's authorized redemption of the DVD. In some embodiments, the POS 320 may be operable to communicate with the CS 305 to authorize the sale and/or redemption of a DVD. In some embodiments, the POS 320 may be configured to read from and/or write to one or more databases described herein (e.g., an available DVDs database). In some embodiments, the POS 320 may comprise various hardware and/or software described herein with respect to other devices (e.g., a keyboard, processor, display, etc.). In some embodiments, the POS 320 may be operable to communicate with a device in addition to the CS 305. For example, the POS 320 may be operable to communicate with an inventory/reservation system (e.g., a computer terminal at a theatre communicates with an inventory database to determine a number of unsold seats for a certain event; not explicitly shown in FIG. 3). In some embodiments, the CS 305 may function as an inventory/reservation system.

In some embodiments, various casino employees may be equipped with or otherwise utilize one or more CPDs 325.

The CPD 325 may comprise, for example, a PDA or other computing device (e.g., a personal computer terminal). The CPD 325 may comprise various input devices (e.g., a keypad, a touch-sensitive display screen, a card reader, an infrared bar code scanner, etc.), various output devices (e.g., an LCD screen), a processor, a memory and/or a communications port, as described herein with respect to other devices. In some embodiments, the CPD 325 may be operable to communicate with the GD 315, the CS 305, another server, a kiosk, a peripheral device, the AS 310 and/or an inventory/reservation system of a casino-maintained property (e.g., a hotel). Thus, the CPD 325 may be configurable to, among other things, (i) read from and/or write to one or more databases, (ii) assist in payments made to players (e.g., a representative "scans" a receipt for a purchased DVD and determines a value associated with the receipt, and if the receipt is valid, provides payment equal to the value), (iii) assist in payment made by players (e.g., a casino representative may receive a payment from a player for purchasing a DVD as described herein and obtain an activation code for the DVD to provide to the player); (iv) cause the GD 315 to generate a plurality of outcomes for storage on a DVD in accordance with embodiments described herein; and/or (v) execute or assist in the execution of various other processes described herein. In one or more embodiments, the CPD 325 may be operable to read data from and/or write data to one or more of the databases described herein. A memory of the CPD 325 may store, according to some embodiments, a program for executing processes described herein, or portions thereof.

The CS 305 may communicate with any and all of the AS 310, the GD 315, the POS 320, and/or the CPD 325, directly or indirectly, via a wired or wireless medium such as the Internet, LAN, WAN or Ethernet, Token Ring, or via any appropriate communications means or combination of communications means. For example, in one embodiment communication among any and all of the devices of system 300 may occur over the Internet through a Web site maintained by one or more computers, on a remote server, and/or over an on-line data network including commercial on-line service providers, bulletin board systems and the like. In yet other embodiments, communication among any of the devices of the system 300 may occur over RF, cable TV, satellite links and the like.

It should be noted that the lines connecting the various devices of system 300 do not imply that the devices are operable to communicate via a particular network. For example, the AS 310 may not be located on a network that the CS 305, the GD 310, the POS 320, and/or the CPD 325 are located on.

Further, any and all of the CS 305, the AS 310, the GD 315, the POS 320, and/or the CPD 325 may comprise a computing device (or one or more computing devices), such as those based on the Intel® Pentium® processor.

In some embodiments, communication among some or all of the devices of the system 300 may occur over a network. Some, but not all, possible communication networks that may comprise the system 300 include: a LAN, a WAN, the Internet, a telephone line, a cable line, a radio channel, an optical communications line, and a satellite communications link. For example, the GD 315 may communicate with the CS 305 over a LAN while the CS 305 may communicate with the AS 310 over a WAN or via a cable line.

Possible communications protocols that may be part of the system 300 include: Ethernet (or IEEE 802.3), SAP, ATP, Bluetooth™, and TCP/IP. Communication may be encrypted to ensure privacy and prevent fraud in any of a variety of ways well known in the art.

A variety of communications protocols may be part of the system 300 or another system operable to facilitate the embodiments described herein, including but not limited to: Ethernet (or IEEE 802.3), SAP, SAS™, SuperSAS™, ATP, Bluetooth™, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, content management, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

In some embodiments, the CS 305 may not be necessary and/or preferred. For example, one or more embodiments may be practiced on a stand-alone GD 315 (e.g., one operable to output a DVD of outcomes, and/or one associated with a device operable to output a DVD of outcomes) and/or on a GD 315 operable to communicate with the AS 310 directly. In such embodiments, any functions described as performed by the CS 305 or data described as stored on the CS 305 may instead be performed by or stored on one or more GDs 315 and/or the AS 310.

It should be understood that referring to the CS 305 as a "casino" server is not meant to imply that a casino controls, or exclusively controls, this device or all functions thereof. For example, in one embodiment the CS 305 is a device operated by an entity other than a casino (e.g., an entity that also operates the AS 310 or controls some functions of the AS 310). The CS 305 may, for example, be any device operable to facilitate the creation of a DVD that stores a plurality of outcomes in accordance with embodiments described herein.

In one embodiment, the CS 305 may in turn be in communication with another electronic device that is distinct from the GD 315 and/or the AS 310, which electronic device may be operable to (i) direct the CS 305 to perform certain functions and/or (ii) read data from and/or write data to the CS 305. For example, the CS 305 may comprise a slot server or Data Collection Unit (DCU) that controls and/or communicates with a bank of slot machines, which slot server or DCU is in turn in communication with a casino server that is in communication with a plurality of such slot servers or DCUs.

In another embodiment, the CS 305 may be operable to communicate with the GD 315 via another electronic device (e.g., a DCU), such as a server computer operable to communicate with a plurality of slot machines. For example, in one embodiment, the CS 305 may be operable to communicate with a plurality of computing devices, each computing device operable to communicate with a respective plurality of gaming devices.

It should be noted that, in some embodiments, one or more of the devices described with respect to the system 300 may be combined (or the functions described with respect to may be combined as being performed by) a single device. For example, the CS 305 and the AS 310 may comprise the same device or a single device may perform the functions described herein as being performed by the two devices as embodying two distinct devices. In another example, the GD 315 may comprise the CS 305 and/or the AS 310 and may, in some embodiments, perform some or all of the functions described herein as being performed by the CS 305 and/or the AS 310, and vice versa.

Figure 4:
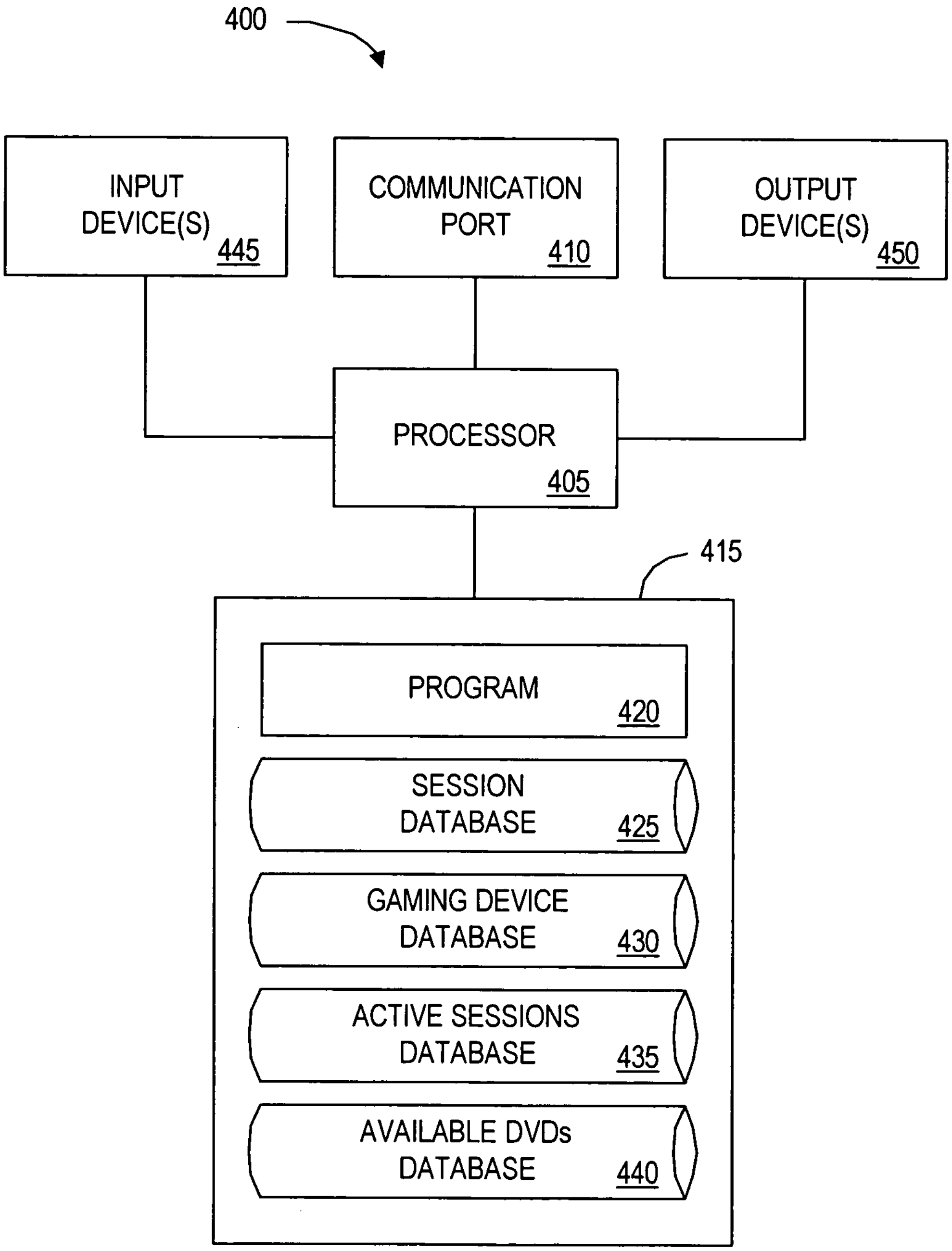
FIG. 4 is a block diagram of an exemplary casino server (CS) in accordance with some embodiments.

Referring now to FIG. 4, illustrated therein is a block diagram of an exemplary embodiment of a CS 400 (e.g., the CS 305 of FIG. 3). The CS 400 may be implemented as a system controller, a dedicated hardware circuit, an appropriately programmed general-purpose computer, or any other equivalent electronic, mechanical or electro-mechanical device. The CS 400 may comprise, for example, one or more server computers operable to communicate with one or more client devices, such as one or more GDs, an AS, one or more kiosks, one or more POSs, one or more peripheral devices, and/or one or more CPDs. The CS 400 may be operative to manage the system 300 of FIG. 3 or at least to facilitate some functions or procedures described herein.

In operation, the CS 400 may function under the control of a casino, another merchant, an entity that may also control use of a GD (such as the GD 315 of FIG. 3), and/or a GD manufacturer. For example, the CS 400 may be a slot server in a casino. In some embodiments, the CS 400 and a slot server may be different devices. In some embodiments, the CS 400 may comprise a plurality of computers operating together. In some embodiments, the CS 400 and a GD may be the same device.

The CS 400 generally comprises a processor 405, such as one or more Intel® Pentium® processors. The processor 405 is in communication with a communication port 410 (e.g., for communicating with one or more other devices, such as one or more GDs 315 and/or the AS 310, of FIG. 3) and a memory 415. The memory 415 may comprise an appropriate combination of magnetic, optical and/or semiconductor memory, and may include, for example, RAM, ROM, a compact disc and/or a hard disk. The processor 405 and the memory 415 may each be, for example: (i) located entirely within a single computer or other device; or (ii) connected to each other by a remote communication medium, such as a serial port cable, telephone line or radio frequency transceiver. In one embodiment, the CS 400 may comprise one or more devices that are connected to a remote server computer for maintaining databases.

The memory 415 stores a program 420 for controlling the processor 405. The processor 405 performs instructions of the program 420, and thereby operates in accordance with at least some of the methods described in detail herein. The program 420 may be stored in a compressed, uncompiled and/or encrypted format. The program 420 furthermore includes program elements that may be necessary, such as an operating system, a database management system and "device drivers" for allowing the processor 405 to interface with computer peripheral devices. Appropriate program elements are known to those skilled in the art, and need not be described in detail herein. The program 420 may include computer program code that allows the CS 400 to employ the communication port 410 to communicate with a GD (e.g., GD 600, described below with respect to FIG. 6) and/or an AS (e.g., AS 500, described below with respect to FIG. 5) in order to, for example:

1. track gambling or other activity performed at the GD;
2. instruct a GD to generate a plurality of outcomes in accordance with one or more parameters;
3. receive an indication of a plurality of outcomes generated by a GD;
4. transmit an indication of a plurality of outcomes generate by a GD to an AS;
5. receive an indication of a DVD of outcomes that is available for sale;
6. receive a request from a player to create a DVD of outcomes;
7. instruct a gaming device to perform one or more functions (e.g., output a message to a player, interrupt play, etc.);
8. authorize a sale of a DVD to a player;
9. authorize a redemption of a DVD by a player; and/or
10. determine an activity status of a GD;

According to some embodiments, the CS 400 may be operable to perform some of the processes (or portions thereof) described herein. For example, the CS 400 may be operable to perform at least a portion of (i) process 100 (described with respect to FIG. 1, above), (ii) process 1900 (described with respect to FIG. 19, below); (iii) process 2500 (described with respect to FIG. 25, below); (iv) process 2600 (described with respect to FIG. 26, below); and/or any other process described herein.

According to an embodiment, the instructions of the program 420 may be read into a main memory from another computer-readable medium, such from a ROM to RAM. Execution of sequences of the instructions in program 420 causes processor 405 to perform the process steps described herein. In alternate embodiments, hard-wired circuitry may be used in place of, or in combination with, software instructions for implementation of the processes of the present invention. Thus, embodiments described herein are not limited to any specific combination of hardware and software.

The memory 415 may generally store: (i) a session database 425; (ii) a gaming device database 430; (iii) an active sessions database 435; and (iv) an available DVDs database 440. Each of the databases 425 through 440 is described in more detail below (with reference to FIG. 7, FIG. 8, FIG. 9, and FIG. 10, respectively).

In some embodiments (e.g., in an embodiment in which CS 400 manages downloadable games playable on one or more GDs), the memory 415 may store additional databases. Examples of such additional databases include, but are not limited to, (i) a game database that stores information regarding one or more games playable on and/or downloadable to one or more GDs, and (ii) a scheduling and/or configuration database useful for determining which games are to be made available on which GDs at what times. In other embodiments, some or all of these functions may be handled by a device distinct from CS 400.

Similarly, in one embodiment CS 400 may be operable to configure a GD (and/or another device, such as a kiosk, POS, CDP, etc.) remotely, update software stored on a GD and/or to download software or software components to a GD. For example, CS 400 may be operable to apply a hot fix to software stored on a GD, modify a payout and/or probability table stored on a GD and/or transmit a new version of software and/or a software component to a GD. The CS 400 may be programmed to perform any or all of the above functions based on, for example, an occurrence of an event (e.g., a scheduled event), receiving an indication from a qualified casino employee and/or other person (e.g., a regulator) and/or receiving a request from a player. In other embodiments, some or all of these functions may be handled by a device distinct from the CS 400.

Although the databases 425 through 440 are described as being stored in a memory of CS 400, in other embodiments some or all of these databases may be partially or wholly stored, in lieu of or in addition to being stored in a memory of CS 400, in a memory of one or more other devices. Such one or more other devices may comprise, for example, one or more peripheral devices, one or more GDs, an AS, a slot server (if different from the CS 400), another device, or a combination thereof. Further, some or all of the data described as being stored in the memory 415 may be partially or wholly stored (in addition to or in lieu of being stored in the memory 415) in a memory of one or more other devices. Such one or more other devices may comprise, for example, one or more peripheral devices, one or more GDs, an AS, a slot server (if different from the CS 400), another device, or a combination thereof.

The processor 405 is also operable to communicate with or more input devices 445. An input device may comprise any device operable to facilitate input to the CS 400 (e.g., input by a person, such as a keyboard or mouse). An input device, as the term is used herein, may be any device, element or component (or combination thereof) that is capable of receiving an input (e.g., from a player or another device). An input device may communicate with or be part of another device (e.g. an AS, a GD, etc.). Some examples of input devices include: a bar-code scanner, a magnetic stripe reader, a computer keyboard or keypad, a button (e.g., mechanical, electromechanical or “soft”, as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port, and a weight scale. For example, in one embodiment an authorized person may use an input device 450 to program or re-program the CS 400 to perform a function and/or to write data to one of the databases stored in memory 415.

The processor 405 is further operable to communicate with one or more output devices 450. An output device may comprise any device operable to output information from the CS 400. An output device, as the term is used herein, may be any device, element or component (or combination thereof) that is capable of outputting an output (e.g., to a person or another device). Examples of an output device include, but are not limited to, a display (e.g., in the form of a touch screen), an audio speaker, an infra-red transmitter, a radio transmitter, an electric motor, a printer, a coupon or product dispenser, an infra-red port, a Braille computer monitor, and a coin or bill dispenser.

In some embodiments, the CS 400 may comprise components capable of facilitating both input and output functions (i.e., input/output devices). In one example, a touch-sensitive display screen comprises an input/output device (e.g., the device outputs graphics and receives selections from an authorized person).

Figure 5:
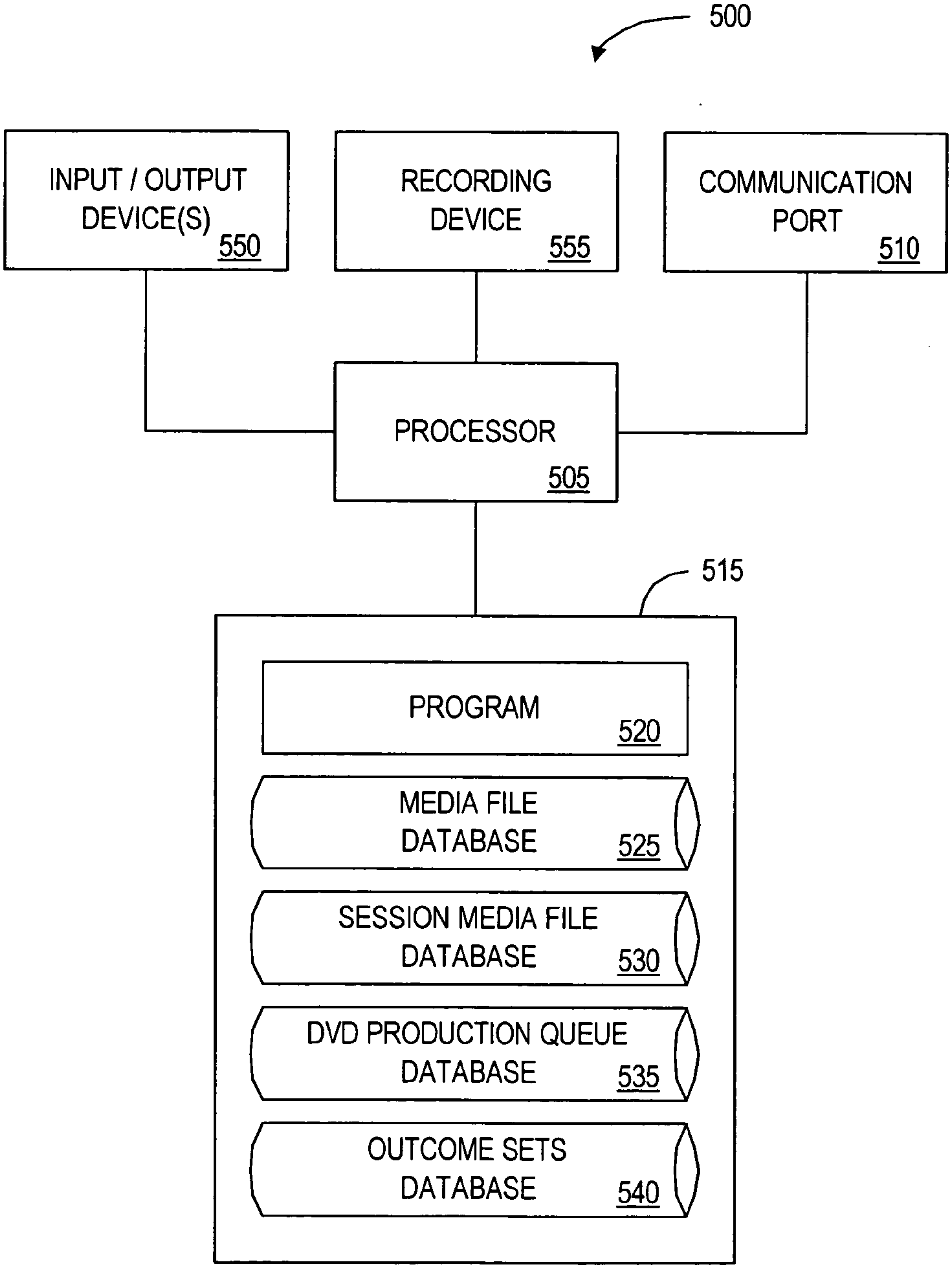
FIG. 5 is a block diagram of an exemplary assembly system (AS) in accordance with some embodiments.

Referring now to FIG. 5, illustrated therein is a block diagram of an example embodiment 500 of an AS (e.g., the AS 310 of FIG. 3). Embodiment 500 is referred to as the AS 500 herein. The AS 500 may be implemented as a system controller, a dedicated hardware circuit, an appropriately programmed general-purpose computer, or any other equivalent electronic, mechanical or electromechanical device. The AS 500 may comprise, for example, a one or more computer and one or more DVD recording devices operating together. The AS 500 may be an example of the AS 235 (FIG. 2) and/or the AS 310 (FIG. 3).

The AS 500 may be operable, for example, to receive session result data (e.g., an indication of a plurality of outcomes generated for a session) and to create a video representation based on this data. It should be understood that a video presentation may include both video and audio elements. The AS 500 may further be operable to cause a DVD recording device to record (e.g., stamp) the video presentation onto a DVD. Of course, if the video presentation is being stored on a tangible medium other than a DVD (e.g., a CD-ROM), the AS may be in operable to cause a recording device to record the video presentation on the appropriate tangible medium (e.g., to cause a CD-ROM recording device to record the video presentation onto a CD-ROM). In some embodiments, as described, an indication of outcomes may be made available to a player from a server device on which the indication is stored. For example, a video presentation of outcomes may be streamed to a player via a computer in communication with the server. In such embodiments, the AS 500 may be operable to facilitate the output of the video presentation in an appropriate manner.

The AS 500 comprises a processor 505. The processor 505 is in communication with a communication port 510 and a memory 515. The memory 515 may comprise an appropriate combination of magnetic, optical and/or semiconductor memory, and may include, for example, RAM, ROM, a compact disc and/or a hard disk. The memory 515 may comprise or include any type of computer-readable medium. The processor 505 and the memory 515 may each be, for example: (i) located entirely within a single computer or other device; or (ii) connected to each other by a remote communication medium, such as a serial port cable, telephone line or radio frequency transceiver. In one embodiment, the AS 500 may comprise one or more devices that are connected to a remote server computer for maintaining databases.

The memory 515 stores a program 520 for controlling the processor 505. The processor 505 performs instructions of the program 520, and thereby operates in accordance with at least some embodiments, and particularly in accordance with the methods described in detail herein.

The program 520 may include computer program code that allows the AS 500 to employ the communication port 510 to communicate with another device (e.g., the CS 305 of FIG. 3) in order to, for example:

(i) receive an indication of a plurality of outcomes generated by a GD (e.g., receive session result data for one or more sessions);

(ii) communicate information about a DVD that has been created by the AS 500; and/or (iii) receive information regarding the creation of a video presentation (e.g., receive media files, instructions regarding how media files are to be assembled into a video presentation, etc.).

The memory 515 may also store one or more databases. For example, memory 515 stores (i) a media file database 525; (ii) a session media file database 530; (iii) a DVD production queue database 535; and (iv) an outcome sets database 540. Of course, other databases may be stored in memory 515.

In one or more embodiments, as described, data may be stored in a memory of another device (e.g., a database of the CS 305 of FIG. 3 and/or a database of another device). In one or more embodiments, the AS 500 may be operable to access the data thereof or have information associated with the data stored therein downloaded or otherwise made available to the AS 500 as necessary and/or appropriate. For example, the AS 500 may access a memory of another device to determine one or more parameters for generating a plurality of outcomes in accordance with one or more embodiments (e.g., how many outcomes were generated for a particular session). In some embodiments, the AS 500 may be operable to write data to a memory of another device.

Note that, although the databases 525, 530, 535 and 540 are described as being stored in the AS 500, in other embodiments some or all of these databases and/or data thereof may be partially or wholly stored (in addition to or in lieu of being stored in the memory 515) in another device. Such other device may comprise, for example, the CS 305, the POS 320, and/or the CPD 325 (all from FIG. 3), another device and/or a combination thereof.

As described, the processor 505 is operable to communicate with a communication port 510. The communication port 510 may be utilized, for example, to transmit information to (or receive information from) another device, such as the CS 305, the GD 315, the CPD 325, the POS 320, another device, or a combination thereof.

The processor 505 is also operable to communicate with one or more input devices, output devices and/or input/output devices 550. The input device(s) of the AS 500 may comprise any or all of the input devices described herein. Similarly, the output device(s) and/or input/output device(s) of the AS 500 may include any and all of such devices described herein.

The processor 505 is further operable to communicate with one or more recording devices 555. A recording device 555 may comprise any device operable to (i) record a video presentation onto a DVD or onto another tangible medium, (ii) transfer data or information to a DVD or other tangible medium, and/or (iii) facilitate disc image transfer, as appropriate and practicable. For example, if a video presentation is stamped onto a DVD, the recording device 555 may comprise a DVD stamping device. In another embodiment, DVD-R or DVD+R burners may use relatively high-powered lasers to darken inks inside a recordable DVD media to simulate the pits of traditional mass-produced DVDs. Examples of such technologies are readily available, such as DVD recorders from Plextor™ or Panasonic™. In some of these embodiments, the DVD recording device may have multiple recording devices and a robotic mechanism for disc movement into and out of the drives. Examples of this technology include Rimage's Protoge Plus™, or Microtech's™ product lines. In one embodiment, the AS 500 may comprise a computer device in communication with a barcode scanning device (i.e., input device), such as the PowerScan® SR/HD made by PSC Products™ of Eugene, Oreg.

An operator of the AS 500 may access session result data by scanning a barcode of a video ticket (such as one depicted in FIG. 24, described below. Such a barcode may encode, for example, a session identifier, an indication of a plurality of outcomes generated for the session identified by the session identifiers (e.g., a series of outcome identifiers) and one or more associated GD identifiers).

As described, the AS 500 may store one or more programs for creating a video presentation to be recorded onto a DVD, based on the received session result data. In some embodiments, the AS 500 may be operable to receive session result data associated with a session without communicating via an electronic network with a casino. Rather, the AS 500 may be operable to receive session result data via barcoded tickets, other printed documents or via other tangible media having session result data stored thereon.

In some embodiments, the AS 500 may be part of the same electronic network as the CS 305, the GD 315, the CPD 325, and/or the POS 320 of FIG. 3, or be otherwise operable to communicate electronically with one or more of these devices and receive session result data in electronic form from one or more of these devices.

In some embodiments, the AS 500 may access session result data by accessing a database storing the session result data (e.g., a session database 425). For example, in some embodiments, the AS 500 may access a session database maintained on the CS 305 to determine if there are any executed sessions for which DVDs have not yet been created (e.g., a record of a session database may indicate whether or not a DVD has yet been created for a particular session). In another embodiment, a device (e.g., the CS 305, the CPD 325 and/or the GD 315 of FIG. 3 may send a signal transmitting session result data and/or transmitting an indication that session result data should be accessed or is available. Accordingly, the AS 500 may then access or receive the session result data In one embodiment, the AS 500 may access session result data by accessing a smart card or other tangible medium (e.g., memory stick, flash memory, floppy disc, printed ticket, CD-ROM, DVD, etc.) with session result data stored thereon. For example, the AS 500 may comprise a card reader device, such that when a card bearing session result data is inserted, session result data may be accessed. Such data may then be used to create a video presentation recorded onto a DVD or otherwise provided to a player.

In one example of how a video presentation may be provided to a player, the AS 500 may store and/or transmit media files electronically, such that they may be accessed or viewed by a purchaser of a session (e.g., using a home computer or other user device). For example, the AS 500 may create an entry in a database (which may be maintained by any of the devices described herein), the entry being associated with a session identifier. One or more game play numbers and media files may be associated with the session identifier and an indication of these may be stored in the record. Such a database may be accessed when a purchaser of a session requests to view the video presentation associated with the session (e.g., a player accesses a Web page, and the appropriate entry of the database is accessed to determine an order in which to present media files). In some of these embodiments, the video may be created simultaneously to the viewing of the video presentation.

In another example, as described in detail herein, the AS 500 may be operable to create a DVD or CD-ROM using the media files. Accordingly, in one embodiment, a software program stored in the memory of the AS 500 may be operable to (i) determine an order in which media files are to be presented, and (ii) instruct a recording device (e.g., a DVD recording device) to transfer the information of the media files to an appropriate tangible media (e.g., a DVD) such that they may be viewable in the appropriate order. In some embodiments, such a software program may operate to output such video presentations substantially automatically (e.g., without requiring input from an operator or with minimum input from an operator). For example, the AS 500 may be operable to (i) receive or otherwise access session result data, (ii) determine media files associated with the data, and (iii) output video presentations based on the media files to a tangible media. In other embodiments, an operator may provide input instructing the AS 500 to perform various tasks (e.g., an operator selects media files, scans barcodes, etc.). In either case, in some embodiments, a video presentation may be output via tangible media.

In embodiments wherein tangible media comprises a DVD, such a disc may be formatted according to a DVD encoding process as is known in the art. For example, one or more media files may be segmented into one or more "chapters" that are individually accessible by players. For example, a DVD having recorded thereon a video presentation of a one thousand (1,000) game play session may be segregated into twenty (20) chapters of fifty (50) game plays each that a player may watch. In another example, each media file (i.e., game play) may be encoded as its own chapter, such that a player may use an "enter" button of a DVD player remote control much like a "spin" button of a slot machine, launching each video presentation or segment of a video presentation much like actuating a game play of a slot machine. It should be noted that one advantage of such a DVD format of creating a video presentation is that many of the convenient navigation features associated with watching video using a DVD player may be harnessed. For example, a player may stop, pause, fast-forward or rewind the video presentation, or skip chapters entirely.

In embodiments wherein physical media comprises a CD-ROM, a video presentation may be incorporated into a software program that is executable by a purchaser of a session using a computing device. Thus, in some embodiments, creating a video presentation may comprise creating an executable software application. For example, creating a video presentation may comprise creating a software program that lets purchasers of sessions interact with the video presentation in a similar manner to a software application of an online casino using a home computer. For example, a purchaser of a session may insert a CD-ROM into an appropriate drive of a home computer, and then click on a graphic of a "spin" button when he desires to view another outcome (e.g., the software program written to the CD-ROM is operable to receive user input, and based on the input, access and display a stored media file as is known in the art). Various software applications that may at least assist in the creation of such DVD and CD-ROM discs may be available commercially. In some embodiments, the user receives data that represents the outcome and a software program, which may or may not be delivered on the same media as the outcomes, and which animate a video presentation.

It should be noted that, in some embodiments, the order in which media files are written to tangible media and/or stored electronically in a database or other memory structure may be immaterial (e.g., such that a player later viewing outcomes remotely may not necessarily watch them in the order in which they were generated). For example, media files of a video presentation may appear in a random order.

Figure 6:
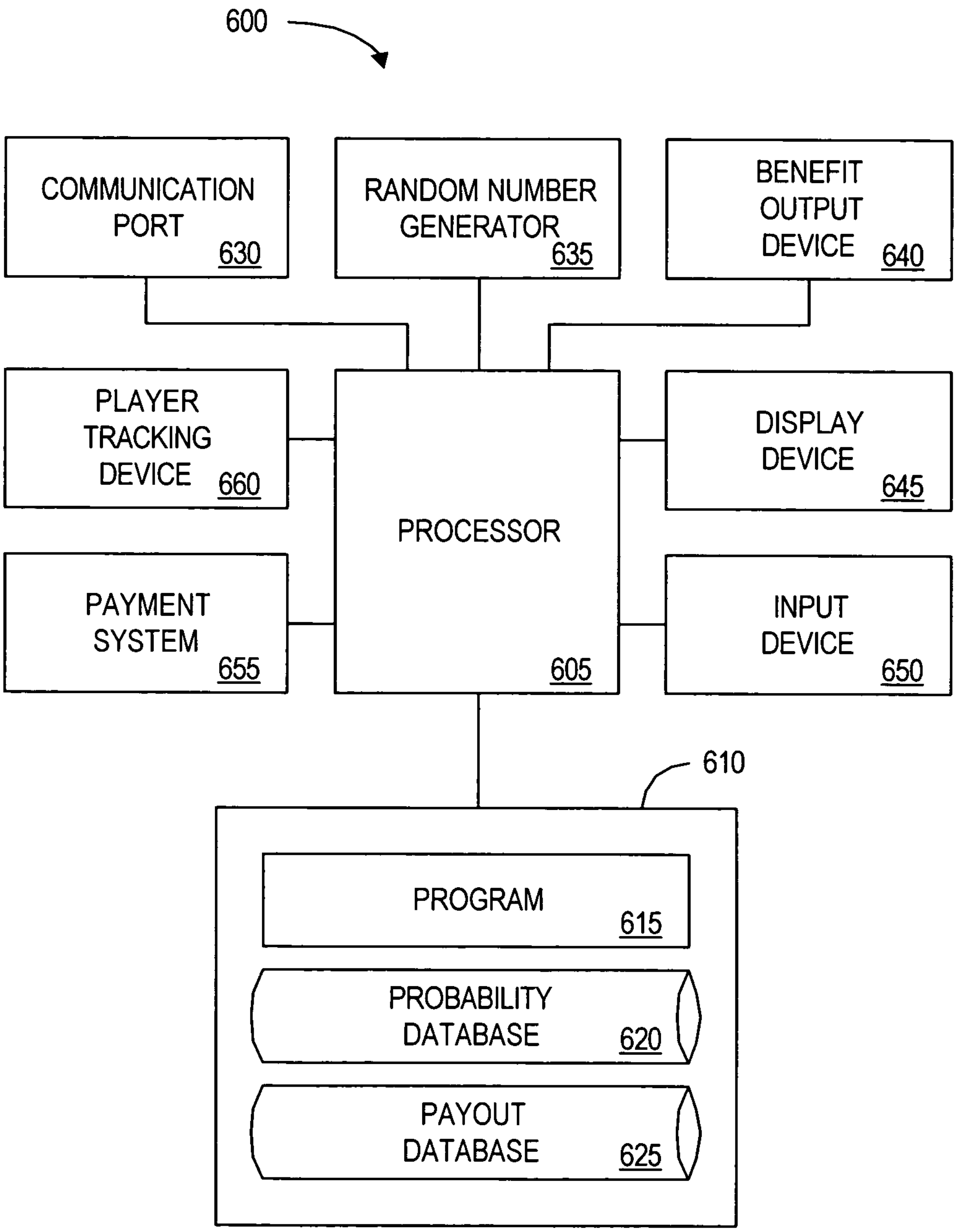
FIG. 6 is a block diagram of an exemplary gaming device (GD) in accordance with some embodiments.

Referring now to FIG. 6, illustrated therein is a block diagram of an example embodiment 600 of a GD (e.g., the GD 315 of FIG. 3). Embodiment 600 is referred to herein as GD 600. The GD 600 may be implemented as a system controller, a dedicated hardware circuit, an appropriately programmed general-purpose computer, or any other equivalent electronic, mechanical or electro-mechanical device. The GD 600 may comprise, for example, a slot machine, a video poker terminal, a video blackjack terminal, a video keno terminal, a video lottery terminal, a pachinko machine or a tabletop game. In some embodiments, the term "slot machine" is used to refer to a GD and is meant to encompass any and all of the example devices listed herein. In various embodiments, a GD may comprise, for example, a personal computer (e.g., which communicates with an online casino Web site), a telephone (e.g., to communicate with an automated sports book that provides gaming services), or a portable handheld gaming device (e.g., a personal digital assistant, Nintendo™ GameBoy™ device, Sony™ SPS™ device, or other appropriate device). In some embodiments, the GD 600 may comprise a device operable to facilitate a table game (e.g., a device operable to monitor a blackjack game, such as size of a player's wager, cards received and/or decisions made). In some embodiments, a user device such as a PDA or cell phone may be used in place of, or in addition to, some or all of the GD 600 components depicted in FIG. 6.

Further, the GD 600 may comprise a personal computer or other device operable to communicate with an online casino and facilitate game play at the online casino. In one or more embodiments, the GD 600 may comprise a computing device operable to execute software that simulates play of a reeled slot machine game, video poker game, video blackjack game, video keno game, video roulette game, or lottery game.

The example GD 600 comprises a processor 605, such as one or more Intel® Pentium® processors. The processor 605 is in communication with a memory 610. The memory 610 may comprise an appropriate combination of magnetic, optical and/or semiconductor memory, and may include, for example, Random Access Memory (RAM), Read-Only Memory (ROM), a compact disc and/or a hard disk. The memory 610 may comprise or include any type of computer-readable medium. The processor 605 and the memory 610 may each be, for example: (i) located entirely within a single computer or other device; or (ii) connected to each other by a remote communication medium, such as a serial port cable, telephone line or radio frequency transceiver. In one embodiment, the GD 600 may comprise one or more devices that are connected to a remote server computer for maintaining databases.

The memory 610 stores a program 615 for controlling the processor 605. The processor 605 performs instructions of the program 615, and thereby operates in accordance with embodiments of the present invention, and particularly in accordance with the methods described in detail herein. The program 615, as well as any other program for controlling a processor described herein, may be stored in a compressed, uncompiled and/or encrypted format. The following description of program 615 applies equally to all programs for directing a processor described herein. The program 615 includes program elements that may be necessary, such as an operating system, a database management system and "device drivers" for allowing the processor 605 to interface with computer peripheral devices. Appropriate program elements are known to those skilled in the art, and need not be described in detail herein.

According to an embodiment, the instructions of the program 615 may be read into a main memory from another computer-readable medium, such from a ROM to RAM. Execution of sequences of the instructions in program 615 may cause processor 605 to perform one or more process steps described herein. In alternate embodiments, hardwired circuitry may be used in place of, or in combination with, software instructions for implementation of the processes of the present invention. Thus, embodiments described herein are not limited to any specific combination of hardware and software. In some embodiments, the execution of sequences of the instructions in a program of a peripheral device associated with the GD 600 may cause processor 605 to perform some or all of the process steps described herein.

The memory 610 may also store one or more databases. For example, memory 610 may store one or more of a probability database, such as probability database 620, and one or more of a payout database, such as payout database 625.

In one or more embodiments, as described, data may be stored in a memory of another device (e.g., a database of the CS 305 of FIG. 3 or a database of another device). In one or more embodiments, the GD 600 may be operable to access the data thereof or have information associated with the data stored therein downloaded or otherwise made available to the GD 600 as necessary and/or appropriate. For example, the GD 600 may access a memory of another device to determine one or more parameters for generating a plurality of outcomes in accordance with one or more embodiments (e.g., how many outcomes are to be generated for a particular session). In some embodiments, the GD 600 may be operable to write data to a memory of another device.

Note that, although the databases 620 and 625 are described as being stored in the GD 600, in other embodiments some or all of these databases and/or data thereof may be partially or wholly stored (in addition to or in lieu of being stored in the memory 610) in another device. Such other device may comprise, for example, the CS 305, the POS 320, the CPD 325 of FIG. 3, another device and/or a combination thereof.

The processor 605 is operable to communicate with a communication port 630. The communication port 630 may be utilized, for example, to transmit information to (or receive information from) another device, such as the CS 305, another GD, the CPD 325, the POS 320, the AS 310 of FIG. 3, another device, or a combination thereof.

The processor 605 is also generally operable to communicate with a random number generator 635 (RNG 635), which may be a component of the GD 600. The RNG 635 (as well as any other random number generator described herein), in accordance with at least one embodiment, may generate data representing random or pseudo-random values (referred to as "random numbers" herein). The RNG 635 may generate a random number every predetermined unit of time (e.g., every second) or in response to an initiation of a game on the gaming device. In the former embodiment, the generated random numbers may be used as they are generated (e.g., the random number generated at substantially the time of game initiation is used for that game) and/or stored for future use.

A RNG, as used herein, may be embodied as a processor separate from but working in cooperation with processor 605. Alternatively, a RNG may be embodied as an algorithm, program component, or software stored in the memory of a GD or other device and used to generate a random number.

Note that, although the generation or obtainment of a random number is described herein as involving a RNG of a GD, other methods of determining a random number may be employed. For example, a GD owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 605 is also operable to communicate with a benefit output device 640, which may be a component of the GD 600. The benefit output device 640 may comprise one or more devices for outputting a benefit to a player of the GD 600. For example, in one embodiment, the GD 600 may provide coins and/or tokens as a benefit. In such an embodiment the benefit output device 640 may comprise a hopper and hopper controller, for dispensing coins and/or tokens into a coin tray of the GD 600. According to some embodiments, the benefit output device 640 may also or alternatively be operable to output a session object, the session object indicating a session and/or DVD that the player desires to purchase and/or otherwise obtain.

According to some embodiments, the GD 600 and/or the benefit output device 640 may provide a receipt or other document on which there is printed an indication of a benefit and/or other information (e.g., a cashless gaming receipt that has printed thereon a monetary value, which is redeemable for cash in the amount of the monetary value, a check cashable for monetary value, a sticker and/or label or packaging insert comprising an indication of a session, etc.). In such an embodiment, the benefit output device 640 may comprise a printing and/or document dispensing mechanism. In yet another example, the GD 600 and/or the benefit output device 640 may provide electronic credits as a benefit (which, e.g., may be subsequently converted to coins and/or tokens and dispensed from a hopper into a coin tray). In such an embodiment, the benefit output device 640 may comprise a credit meter balance and/or a processor that manages the amount of electronic credits that is indicated on a display of a credit meter balance. The processor may be the processor 605 or another processor. In yet another example, the GD 600 and/or the benefit output device 640 may credit a monetary amount to a financial account associated with a player as a benefit provided to a player. The financial account may be, for example, a credit card account, a debit account, a charge account, a checking account, and/or a casino account. In such an embodiment the benefit output device 640 may comprise a device for communicating with a server on which the financial account is maintained.

Note that, in one or more embodiments, the GD 600 may include more than one benefit output device 640 even though only one benefit output device 640 is illustrated in FIG. 6. For example, the GD 600 may include both a hopper and hopper controller combination and a credit meter balance. Such a GD 600 may be operable to provide more than one type of benefit to a player of the GD 600. Also, a single benefit output device 640 may be operable to output more than one type of benefit. For example, the benefit output device 640 may be operable to increase the balance of credits in a credit meter and communicate with a remote device in order to increase the balance of a financial account associated with a player. The benefit output device 640 may also or alternatively be operable to dispense tokens and dispense labels (such as DVD jewel case labels), packaging mediums (such as DVD jewel cases and/or CD or DVD sleeves), and/or tickets or forms for providing indications associated with sessions.

The processor 605 is also operable to communicate with a display device 645, which may be a component of the GD 600. The display device 645 may comprise, for example, one or more display screens or areas for outputting information related to game play on the gaming device, such as a cathode ray tube (CRT) monitor, LCD screen, or light emitting diode (LED) screen.

In one or more embodiments, the GD 600 may comprise more than one display device 645. For example, the GD 600 may comprise an LCD display for displaying electronic reels and a display device that comprises a viewing window behind which are located mechanical reels and which displays the rotation of the mechanical reels during game play. In one embodiment, a display device 645 may be operable to display a message to a player. In one embodiment, a display device may be operable to display a menu to a player and/or casino attendant, the menu for inputting parameter values defining a session or plurality of outcomes to be generated by the gaming device. An example of such a menu is described below with respect to FIG. 28.

The processor 605 may also be in communication with one or more other devices besides the display device 645, for outputting information (e.g., to a player or another device). Such other one or more output devices may also be components of the GD 600. Such other one or more output devices may comprise, for example, an audio speaker (e.g., for outputting a message to a player, in addition to or in lieu of such a message being output via a display device 645), an infra-red transmitter, a radio transmitter, an electric motor, a printer (e.g., such as for printing cashless gaming vouchers), a coupon or product dispenser, an infra-red port (e.g., for communicating with a second GD 600 or a portable device of a player), a Braille computer monitor, and a coin or bill dispenser. For certain types of GDs 600, common output devices include a CRT monitor on a video poker machine, a bell (e.g., that rings when a player wins), an LED display of a player's credit balance, an LCD display of a PDA for displaying keno numbers.

The display device 645 may comprise, for example, one or more distinct display areas and/or one or more distinct display devices. For example, one of the display areas may display outcomes of games played on the GD 600 (e.g., electronic reels of a gaming device). Another of the display areas may display rules for playing a game of the GD 600. Yet another of the display areas may display the benefits obtainable by playing a game of the GD 600 (e.g., in the form of a payout table). Yet another of the display areas may display messages to the player (e.g., messages advertising the availability of a DVD featuring outcomes of a game currently being played by a player) and/or a casino attendant. For example, a message may indicate a summary of at least some session information regarding a session that has been executed on the GD 600. In one or more embodiments, the GD 600 may include more than one display device, one or more other output devices, or a combination thereof (e.g., two display devices and two audio speakers).

The processor 605 is also operable to communicate with an input device 650, which is a device that is capable of receiving an input (e.g., from a player, casino personnel or a device) and which may be a component of the GD 600. An input device may communicate with or be part of another device (e.g. the CS 305, the AS 310, the POS 320, the CPD 325 of FIG. 3, another GD 600, etc.). Some examples of input devices include: a bar-code scanner, a magnetic stripe reader, a computer keyboard or keypad, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a USB port, a GPS receiver, a RFID receiver, an RF receiver, a thermometer, a pressure sensor, an infrared port (e.g., for receiving communications from with a second gaming device or a another device such as a smart card or PDA of a player), and a weight scale. For certain types of GDs 600, common input devices include a button or touch screen on a video poker machine, a lever or handle connected to the GD 600, a magnetic stripe reader to read a player tracking card inserted into a GD 600, a touch screen for input of player selections during game play, and a coin and bill acceptor. Input device 650 may comprise any of the above-described input devices or any combination thereof (i.e., input device 650 may comprise more than one input device).

In some embodiments, the GD 600 may comprise components capable of facilitating both input and output functions (i.e., input/output devices). In one example, a touch-sensitive display screen comprises an input/output device (e.g., the device outputs graphics and receives selections from players). In another example, processor 605 may communicate with a TITO device configured to dispense and receive cash-out tickets. Such a device may also assist in (e.g., provide data so as to facilitate) various accounting functions (e.g., ticket validation and redemption). For example, any or all of the GD 600, POS, kiosk and CPD maintained at a cashier cage may (i) comprise such a benefit input/output device, and/or (ii) communicate with a central server (e.g., the CS 305 of FIG. 3) that manages the accounting associated with such ticket-in/ticket-out transactions (e.g., so as to track the issuance, redemption and expiration of such tickets). One example of TITO technology that may be adapted or utilized to implement embodiments described herein is the EZ Pay™ system, is manufactured by International Gaming Technology, headquartered in Reno, Nev.

Of course, as would be understood by one of ordinary skill in the art, the GD 600 may comprise various combinations of any or all of the component devices described herein. For example, in one or more embodiments, the gaming device may include more than one display device, one or more other output devices, several input devices, and so on (e.g., two display screens, two audio speakers, a headset, a ticket-in/ticket-out device and several buttons). Further, the GD 600 may include additional or different components from those described herein.

The processor 605 is further operable to communicate with a payment system 655, which may be a component of the GD 600. The payment system 655 is a device capable of accepting payment from a player (e.g., a bet or initiation of a balance) and/or providing payment to a player (e.g., a payout). Payment is not limited to currency, but may also include other types of consideration, including products, services, and alternate currencies. Payment system 655 may be considered to be an example of an input device 650 and/or an example of a benefit output device 640 in some embodiments.

Exemplary methods of accepting payment by the payment system 655 include (i) receiving hard currency (i.e., coins or bills), and accordingly the payment system 655 may comprise a coin or bill acceptor; (ii) receiving an alternate currency (e.g., a paper cashless gaming voucher, a coupon, a non-negotiable token), and accordingly the payment system 655 may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity.

Processor 605 is further operable to communicate with a player tracking device 660, which may be a component of the GD 600. Player tracking device 660 may, in some embodiments, be considered an example of an input device 650 and/or an example of a payment system 655 (e.g., in embodiments in which a player provides a payment by providing a player identifier that also functions as a monetary account identifier). Player tracking device 660 may, in one or more embodiments, comprise a reader device operable to read information from and/or write information to a card such as a smart card and/or a player tracking card, such that (i) players may be identified, and (ii) various data associated with players may then be determined. For example, previous wagering, coin-in and/or cash-out behaviors previously engaged in by the player may be determined based on information associated with the player identifier. In another example, previous strategies employed in a video poker game may be similarly determined. In yet another example, DVDs previously purchased by a player may be determined (e.g., for purposes of providing a player a payment associated with the DVD). Similarly, a number of cashable credits available to the player may be determined, a number of promotional credits that may not be redeemed for cash but that are associated with the player may be determined, a code or other indication of a benefit to be provided to the player may be determined, a number of accumulated loyalty points associated with the player may be determined, a number of accumulated game elements such as symbols, cards or hands associated with the player may be determined, etc.

In one example, a card reader device comprising a player tracking device 660 may determine an identifier associated with a player (e.g., by reading a player tracking card comprising an encoded version of the identifier), such that the gaming device may then access data (e.g., of a player database, a session database) associated with the player. In another example, a smart card reader device may determine data associated with a player directly by accessing a memory of an inserted smart card.

Although not illustrated herein, a player database may be used, for example, to store player wager data (e.g., such that players wagering over a given threshold in a given amount of time may be rewarded for their patronage, qualify for certain features, be identified as a potential problem gambler, and so on). The player database may also contain other information that may be useful in, for example, promoting and managing player behaviors (e.g., information about the player's gaming preferences, lodging arrangements, and the like). Further, the player database may store data regarding a given player's standing in a game session and/or a bonus game. A player database may also store information regarding DVDs previously purchased, ordered and/or redeemed by a player. Such player data may be stored in a relational database and retrieved or otherwise accessed by the processor after receiving a "key" data point from the player, such as a unique identifier read from the player's player tracking card or cashout ticket.

In one embodiment, the player tracking device 660 may comprise (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT™ or the iVIEW™ display screen manufactured by Bally Gaming and Systems™.

As known in the art, "smart cards" may incorporate (i) a memory, and (ii) means for accessing such a memory. For example, in one embodiment, the memory may store data related to embodiments of the present invention. In one embodiment, data may be written to the smart card as a player plays one or more GDs 600 (e.g., such that various data may be updated on a continuous, periodic or event-triggered bases). Accordingly, in one or more embodiments one or more devices operable to carry out various processes of the present invention (e.g., a GD 600, the CS 305 and/or the AS 310 of FIG. 3) may have associated therewith a smart card reader device, such that data may be read from the smart card pursuant to the execution of such processes. An example of a smart card system that may be used to implement one or more embodiments of the present invention is the s-Choice™ Smart Card Casino Management System from Smart Card Integrators, Inc.™.

Of course, other non-card-based methods of identifying players are contemplated. For example, a unique identification code may be associated with the player. The player may then be identified upon entering the code. For example, the code may be stored (e.g., within a database maintained within the GD 600 and/or the CS 305 of FIG. 3) such that the player may enter the code using an input device 650 of the GD 600, and accordingly allow the player to be uniquely identified. In other embodiments, player biometrics may serve as identification means (e.g., a player is identified via a thumbprint or retinal scan of the player). In further embodiments, a barcode of a cashless gaming ticket may encode a player identifier.

Thus, as described, various data associated with a player may be tracked and stored (e.g., in an appropriate record of a centrally-maintained database), such that it may be accessed as desired. Further, various statistics may be measured in association with a player (e.g., coin-in statistics, win/loss statistics, buy-in amount for a play session) and similarly accessed.

Various systems for facilitating such monitoring of player behavior and activity are contemplated. For example, a two-wire system such as one offered by IGT™ may be used. Similarly, a protocol such as the IGT™ SAS™ protocol or the IGT™ SuperSAS™ protocol may be used. The SAS™ protocol and the SuperSAS™ protocol each allows for communication between gaming machines and slot accounting systems and provides a secure method of communicating all necessary data supplied by the gaming device to the online monitoring system. One aspect of the SAS™ protocol and the SuperSAS™ protocol that may be beneficial in implementing aspects of the present invention is the authentication function which allows operators and regulators to remotely interrogate gaming devices for important memory verification information, for both game programs, and peripheral devices. In another example, a one-wire system such as the OASIS™ System offered by Aristocrat Technologies™ or the SDS™ slot-floor monitoring system offered by Bally Gaming and Systems™ may be used. Each of the systems described above is an integrated information system that (e.g., continually) monitors slot machines and customer gaming activity. Thus, for example, any one of these systems may be used to monitor a player's gaming activity in order to determine player outcomes, buy-in amounts, coin-in statistics, win/loss statistics and/or any other data deemed relevant.

In one embodiment, a player may operate a plurality of GDs 600. For example, a player may simultaneously play two side-by-side GDs 600, a player may play one GD 600 and then continue his gaming session at another GD 600, and a player may remotely operate a GD 600, possibly by using a telephone, PDA or other device (i) to transmit commands (directly or indirectly) to the GD 600, such as wager amounts and commands to select certain cards; and/or (ii) to receive output (directly or indirectly) from the GD.

In one embodiment, the GD 600 may allow a player to play a game of skill rather than a game of chance. Such an embodiment may be more appealing to certain players or may be permitted in areas where it is illegal to gamble on games of chance.

In one embodiment, the GD 600 may be operable to facilitate downloadable games such that games available for play on the GD 600 may be stored on a server device (e.g., the CS 305 of FIG. 3 and/or another device) and downloaded to the GD 600. In one embodiment, software components of the GD 600 may be remotely modified and/or updated by another device (e.g., the CS 305 of FIG. 3 and/or another device). For example, a payout or probability table stored in the memory of the GD 600 may be altered, modified or updated remotely, hot fixes may be applied to software stored by the GD 600 and/or new versions of software may be downloaded to the GD 600. Similarly, the GD 600 may be programmed to retrieve any or all such updates from another device, as appropriate and preferred. Any of the above (e.g., downloading of a game, updating of software, modification of a payout or probability table) may occur, for example, based upon an occurrence of an event (e.g., a scheduled event), an indication being received from qualified casino personnel or other personnel (e.g., a regulator), and/or upon a request from a player. In one embodiment, the GD 600 may comprise a thin client device controlled be a server device (e.g., the CS 305 of FIG. 3 and/or another device).

In one or more embodiments, aspects of the present invention, such as generating a plurality of outcomes for storage on a DVD, may be practiced by replacing and/or augmenting one or more components (e.g., hardware and/or software components) of an existing GD 600. Thus, in one or more embodiments, embodiments may be applied as a retrofit or upgrade to existing GDs 600 currently available for play within various casinos.

For example, a memory (e.g., computer chip) of the GD 600 may be replaced or added, the replacement or additional memory storing a program for instructing the processor of the GD 600 to operate in accordance with one or more embodiments. In another example, data output via the GD 600 (e.g., graphical and/or textual data displayed on the GD 600) may be replaced or added, the replacement or additional data indicating to a player information relevant to one or more aspects of some embodiments.

In a specific example, the GD 600 may comprise various electronic components mounted to one or more printed circuit boards (PCBs). Such components may include various hardware described herein, such as a communications port and various controllers of peripheral devices (e.g., a display controller), as well as a memory for storing programming instructions (software) and a processor for carrying out such instructions. Forms of memory that may be found in a gaming device include electronically erasable programmable read-only memory (EEPROM), erasable programmable read-only memory (EPROM) and flash memory. Thus, in one or more embodiments of the present invention, an EPROM storing software with instructions for carrying out aspects of the present invention (as well as instructions for carrying out other functions traditionally performed by the GD 600) may replace an EPROM previously installed in the GD 600 or may be reprogrammed in accordance with one or more embodiments described herein, such that the GD 600 may be configured to operate in accordance with various processes (or portions thereof) described herein.

For example, a "DVD outcome generation" module may be made available for purchase to various casino operators. The module, which may comprise various hardware and software (e.g., an EEPROM storing software instructions), may be installed in an existing GD 600 (e.g., a video-reel slot machine, a video poker machine, etc.), such that when the module is installed, players of the device may elect (i) to play the GD 600 in a manner that does not incorporate embodiments described herein, or (ii) to play the GD 600 in a manner that incorporates embodiments described herein (e.g., input a request for a plurality of outcomes to be generated and stored on a DVD, for future viewing at a remote location).

Similarly, in addition to or in lieu of a player being able to select a mode of operation of the GD 600, in some embodiments a casino operator may be able to do so. For example, a casino operator or other entity may be able to select whether the GD 600 is to operate in a conventional mode or in a "DVD outcome generation" mode.

Accordingly, the GD 600 may be configured to allow a player, casino operator or other entity to select one of at least two "modes" of the GD 600 and to enable the selected mode. If a "standard" mode is selected, the GD 600 may be configured to operate in a manner similar to how it operated before the installation of the module (e.g., the GD 600 operates in a conventional manner, such that embodiments described herein may not be utilized). If a "DVD outcome generation" mode is selected, the gaming device may then be operable to execute game play in accordance with one or more embodiments described herein.

In one example of allowing an entity to select one or more modes, a touch-sensitive display screen may be configured to output a prompt to select a mode of operation. Such a prompt may be output in occurrence to various trigger conditions (e.g., coins, bills or tickets are inserted; a credit balance increases from zero to some other number; a player presses a "play" button; a motion, weight, infrared or other sensor detects the presence of a player; the gaming device being turned on, initiated, re-configured and/or rebooted, etc.). Accordingly, an entity may select a mode of operation (e.g., by pressing an appropriately labeled icon of a touch-sensitive display screen), and upon receiving the entity's selection, the GD 600 may be configured to operate in the selected mode.

In another embodiment, the GD 600 may be operable to automatically determine whether it should switch modes from a standard mode to a "DVD outcome generation" mode. The GD 600 may perform such a determination, for example, by evaluating data received from a player and/or another device and/or by querying another device. For example, the GD 600 may be operable to enter a "DVD outcome generation mode" upon an occurrence of one or more predetermined events and/or upon determining that one or more predetermined conditions have been satisfied. For example, the GD 600 may be operable to enter a "GD outcome generation mode" upon an occurrence of a predetermined time, if the GD 600 is idle during that time (e.g., between 2 a.m. and 7 a.m.) and/or upon being directed to do so by another device (e.g., by the CS 305 of FIG. 3).

In one embodiment, the GD 600 may be operable to output an indication that it is currently in "DVD outcome generation" mode (e.g., to inform a player that outcomes currently being generated by a gaming device are for a DVD to be made available for sale or a DVD that has been requested). For example, the GD 600 may turn on or change a color of a light, change graphics, output a sound, etc.

In other embodiments, as described herein, a peripheral device may be useful for implementing one or more embodiments of the present invention into the operation of the GD 600. For example, in order to avoid or minimize the necessity of modifying or replacing a program already stored in a memory of the GD 600, an external or internal module that comprises a peripheral device may be inserted in, connected to or otherwise associated with the GD 600. Such a peripheral device may be operable to, for example, monitor and/or transmit information about the gaming device to another device (e.g., the CS 305 of FIG. 3).

In still further embodiments, rather than (or in addition to) configuring the GD 600 to execute embodiments described herein by physically installing or connecting new hardware and/or software, software may be downloaded into an existing memory of one or more GDs 600. U.S. Pat. No. 6,805,634 to Wells et al. teaches methods for downloading data to GDs in such a manner, these sections of which are hereby incorporated by reference herein. Thus, in some embodiments, a GD 600 may be reprogrammed to accommodate new functionality of some embodiments without the need, or by minimizing the need, to remove and replace hardware within the GD 600.

In some embodiments, the GD 600 comprises a "simplified gaming device" or SGD. An SGD, as the term is used herein, may comprise a device operable to generate an outcome based on a random number but that is not designed to be located on a casino floor for interaction with a player. For example, an SGD may be programmed to perform functions different from that of a more conventional type of GD and/or to not perform some of the functions conventionally performed by a GD (e.g., display an indication of an outcome determined based on a random number). Further, an SGD may include components different from those normally included in a more conventional type of GD and/or fewer such components. For example, in some embodiments an SGD may not include a benefit output device 640 and/or player tracking device 660. For example, in some embodiments Applicants envision that a plurality of outcomes for storage and sale via a DVD may be generated by an SGD that comprises a processor running in conjunction with an emulator of a wagering game, the SGD being located in a location other than a casino floor frequented by players. Such an SGD may not, for example, include a cabinet designed to attract a player and may not be operable to output coins, tokens or other benefits. Such an SGD may, however, be programmed to generate a large number of outcomes (e.g., substantially simultaneously) without displaying any of the outcomes so generated, which is unlike a conventional type of gaming device.

III. Databases

Various databases that may be useful in one or more embodiments will now be described. Example structures and sample contents of each of (i) the session database 425, (ii) the gaming device database 430, (iii) the reference session results database 435, (iv) the active sessions database 440, (v) the available DVDs database 445, (vi) are shown in FIG. 7 through FIG. 18, respectively. The specific data and fields illustrated in these drawings represent only some embodiments of the records stored in the databases described herein. The data and fields of these databases can be readily modified, for example, to include more or fewer data fields. A single database also may be employed to combine one or more of these databases. Note that in the databases, a different reference numeral is employed to identify each field of each database. However, in at least one embodiment, fields that are similarly named (e.g., session identifier fields) may store similar or the same data in a similar or in the same data format.

As will be understood by those skilled in the art, the schematic illustrations and accompanying descriptions of the sample databases presented herein are exemplary arrangements for stored representations of information. Any number of other arrangements may be employed besides those suggested by the tables shown. For example, even though ten (10) separate databases are illustrated, the embodiments described herein could be practiced effectively using fewer or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of one or more embodiments and likewise, object methods or behaviors can be used to implement the processes of one or more embodiments.

Referring now to FIG. 7, illustrated therein is a tabular representation 700 of an embodiment of a record of session database 425, such as may be stored in a memory of the CS 400 of FIG. 4 and/or a memory of another device. Tabular representation 700 is referred to herein as session database record 700.

Session database record 700 includes a number of example records or entries, including entries R700-1 through R700-9, each defining a game play of a particular session. Those skilled in the art will understand that the record 700 may include any number of entries.

The session database record 700 also defines a number of fields. The fields specify: (i) a unique session identifier 705; (ii) a wager amount per game play 710 (e.g., a specific wager per game play wherein the wager is the same for each game play of the session, an average wager per game play, etc.); (iii) a game 715 that specifies a game for which the game plays of the session are conducted; (iv) a session duration 720 that defines a duration of the session or an end event that causes the session to end; (v) a price 725 to be paid in exchange for the game plays of the session; (vi) a final session balance 730 that may comprise an indication of a number of credits or monetary value of a credit meter balance upon completion of a session (also referred to as an end credit meter balance herein); (vii) a game play number 735 that identifies each particular game play of the session; (ix) a wager 740 that was posted for each particular game play (if the wager per game play does not vary, this field may be omitted in light of field 710); (x) an indicia 745 that is determined as a result of each game play; (xi) an indicia identifier 750 that identifies (e.g., uniquely) the indicia of field 745 (alternatively, this may be an outcome identifier); and (xii) a payout 755 that corresponds to a benefit, prize or monetary value won as a result of a corresponding game play.

In one embodiment, the session identifier 705 may comprise indications of various session result data. For example, an indication of a payout amount, outcome identifier, wager amount, game play number, session identifier and/or other information related to a session may be included in or discernable from the session identifier 705. For example, a session result identifier "01927-012-01-25-000001-0" may indicate that a first game play of session "01927" occurred on GD "012" with a wager amount of "25," yielding an outcome of "000001" and a payout of "0".

According to some embodiments, the session identifier 705 (and/or any other of the depicted fields and/or values thereof) may be associated with one or more session objects. The session identifier 705 may, for example, correspond to a session identifier indicated by a session object (such as a DVD jewel case), such that human and/or machine recognition of the indication may cause a determination of the database record associated with the session identifier 705 and/or a DVD or other tangible medium associated therewith (such as in the case that the session and/or session DVD is pre-recorded). In some embodiments, a session identifier indicated by a session object may be utilized to create the database record associated with the session identifier 705, and/or vice versa. The session identifier 705 may correspond to one or more pre-recorded and/or on-demand DVDs, for example, such that the session identifier 705 may also function as a DVD identifier. As noted, any of the fields of the session database record 700 may function similarly. For example, the wager amount 710 and/or the price 725 may be indicative of one or more DVDs that correspond to the values of either or both of these fields. This may be accomplished such that a player may simply select and/or indicate a session object comprising an indication of, for example, a twenty-dollar ($20.00) price 725 and/or a twenty-five cent (25¢) wager amount 710, and any DVD corresponding to such parameter values may then be selected, identified, and/or determined and then provided to the player.

Figure 18:
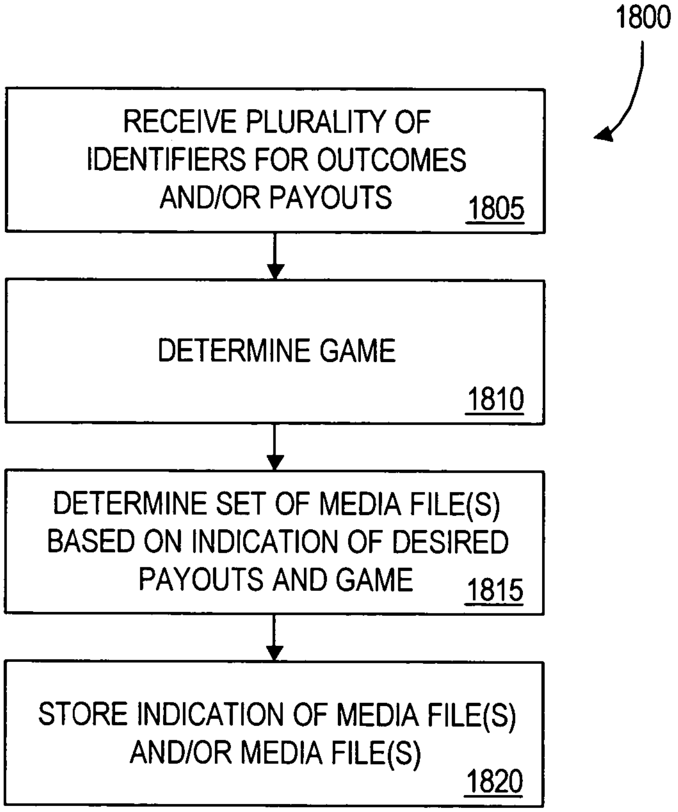
FIG. 18 is a flowchart of an exemplary process for determining a set of media files for a DVD, in accordance with some embodiments.

It should be noted, with respect to fields 745 and 750, that the indicia and indicia identifier may correspond to indicia determined by a GD based on a random number determined for the corresponding game play (e.g., using a payout table such as the one illustrated in FIG. 18). For example, the record 700 may be populated by a GD 600 of FIG. 6 and/or the CS 400 of FIG. 4, based on the outcome determined for each game play of a session. In other embodiments, the indicia in field 745 and indicia identifier 750 may correspond to indicia determined for a representative outcome, as determined by a device other than a GD (e.g., as determined by the AS 310 of FIG. 3). For example, the session database record 700 may be utilized by the AS 310 of FIG. 3 to store the indicia determined for each game play of a session based on an indication of a plurality of outcomes (e.g., an indication of a result of a session) received by the AS 310. In some embodiments, both an indication of indicia of an actual outcome and an indication of indicia of a representative outcome may be stored for a particular game play.

It should further be understood that the payout of field 755 may comprise a payout as determined by a GD based on a random number. For example, the record 700 may be populated based on the payouts as determined by the GD. It should be noted that, in some embodiments, a video presentation of payouts may be created based on the data in record 700. In such embodiments, the order in which payouts are presented via the video presentation may differ from the order in which the payouts are stored in record 700 and/or the order in which the payouts were determined by a GD.

In some embodiments, the payout field 755 may store payouts as determined by another device (e.g., the AS 310 of FIG. 3) based on an indication of a plurality of outcomes (e.g., based on an indication of a result of a session). For example, as described in detail herein, in some embodiments the AS 310 may receive an indication of (i) a beginning credit meter balance for a session; (ii) an ending credit meter balance for the session; (iii) an indication of wagers posted for the session; and (iv) a number of game plays comprising the session. The AS 310 may then determine a plurality of payouts and, in some embodiments, the order in which the payouts are to be presented via a video presentation, based on such data. Accordingly, in such embodiments the AS 310 may utilize session database record 700 to store the determined payouts and/or the order of the payouts as they are to be presented via a video presentation.

It should be understood that a payout field in any of the databases described herein may store a value of a payout amount corresponding to a particular outcome and it may be stored in any form practicable and desirable. For example, a payout value may be represented as a number of credits. Alternatively, a payout value may be stored to represent a dollar value.

Accordingly, it should be understood that in various embodiments the session database record 700 may be populated by a GD, a CS and/or an AS. Further, it should be understood that in various embodiments the record 700 may be utilized by a GD, CS and/or AS for different purposes. For example, a GD and/or CS may utilize record 700 to store an actual outcome of each game play of a session. In another example, an AS may utilize record 700 to store representative outcomes determined for a session.

Referring now to FIG. 8, illustrated therein is a tabular representation 800 of an example embodiment of gaming device database 430, as it may be stored in a memory of the CS 400 of FIG. 4 and/or a memory of another device. Tabular representation 800 is referred to herein as GD database 800.

The GD database 800 includes a number of example records or entries, including records R800-1 through R800-*n*, each defining a gaming device that may be in communication (e.g., over a LAN or WAN) with the CS 305 or otherwise available for embodiments of the present invention. Those skilled in the art will understand that the GD database 800 may include any number of entries. The GD database 800 also defines fields for each of the entries or records. The fields specify: (i) a gaming device identifier 805 that uniquely identifies a particular gaming device (e.g., uniquely identifies a particular slot machine on a casino floor or a PC communicating with an online casino), (ii) a gaming device type 810 that stores a description or designation of the type of gaming device, (iii) a gaming device status 815 that stores an indication of the corresponding gaming device (e.g., whether the gaming device is currently being used or not, whether the gaming device is off-line or on-line, whether the gaming device is available to generate outcomes for a DVD, etc.); and (iv) available games 820 that stores an indication of the one or more games the corresponding gaming device is operable to facilitate or run. It should be noted that, as with any database described herein, any and all of the information stored in a field of the database may be stored in machine-readable format and/or human-readable format (which, in certain circumstances, may be the same format).

The GD database 800 may be used, for example, to communicate with one or more GDs and to identify a GD that data is being transmitted to or received from (e.g., based on the GD identifier). In one embodiment, the GD database 800 may be used to select a particular GD, in order to direct the GD to generate a plurality of outcomes for a DVD. Such a selection may be made, for example, based on a type of GD desired (e.g., five reeled slot machine or video poker machine), a current status of the GD (e.g., currently inactive but turned on and operational), and/or the games available on the GD. Of course, information in addition to or different from that illustrated in GD database 800 may be stored in a GD database. For example, a location of a GD (e.g., to allow a casino employee to find the GD), an address for electronically communicating with the GD may be stored (e.g., for use in directing the GD to perform certain functions) and/or a manufacturer of the GD may be stored.

Referring now to FIG. 9, illustrated therein is a tabular representation 900 of an exemplary embodiment of an active sessions database 435 (e.g., such as one that may be stored in a memory of a the CS 400 of FIG. 4 or a memory of another device). Tabular representation 900 is referred to herein as active sessions database 900.

The active sessions database 900 includes a number of example records or entries, including records R900-1 through R900-4, each defining a session that is currently active (e.g., is in the process of being executed, r has been scheduled to be executed, and/or has already been executed). Those skilled in the art will understand that the active sessions database 900 may include any number of entries. The active sessions database 900 also defines fields for each of the entries or records. The fields specify: (i) a session identifier 905 that uniquely identifies a session; (ii) a GD identifier 910 that identifies a GD or type of GD on which the session is to be executed (which, in some embodiments, may include a plurality of GDs or types of GDs); (iii) a game type identifier 915 that identifies the game for which the outcomes of the session are to be determined; (iv) a wager per game play 920; (v) active payout combinations 925; (iv) a number of game plays remaining 930 (which may, in other embodiments, store another indication of a remaining duration of the corresponding session); and (v) a time remaining 935 that stores an indication (e.g., estimate) of how much time remains before the session is completely executed.

The active sessions database 900 may be utilized, for example, to track information about sessions that have begun to be (or have been) executed and/or that are scheduled to be executed on a GD (such as on-demand sessions requested by players). For example, a GD or CS may use such a database to track an indication of results of a session. Once the session has been completed, the GD or CS may then communicate the indication to an AS.

Referring now to FIG. 10, illustrated therein is a tabular representation 1000 of an example embodiment of an available DVDs database 440 (e.g., as it may be stored in a memory of the CS 400 of FIG. 4 and/or in a memory of another device). Tabular representation 1000 is referred to herein as available DVDs database 1000.

The available DVDs database 1000 includes a number of example records or entries, including records R1000-1 through R1000-5, each defining a DVD that is available for purchase or that was available for purchase. Those skilled in the art will understand that the available DVDs database 1000 may include any number of entries. The available DVDs database 1000 also defines fields for each of the entries or records. The fields specify: (i) a disc identifier 1005 that uniquely identifies a DVD; (ii) a redemption value 1010 that indicates a payment that may be provided to a player who purchases the corresponding DVD, upon redemption of the DVD; (iii) a price 1015 to be paid by a player for the DVD; (iv) a date sold 1015 that indicates a date and/or time on which the corresponding DVD was sold; (v) an activation code 1020 that may be provided, in some embodiments, to a player upon the player purchasing the DVD; (vi) a player identifier 1025 that identifies a player who purchases the corresponding DVD (in some embodiments DVDs may be purchased anonymously and this information may not be stored); and (vii) a status 1030 of the DVD (e.g., an indication of whether the DVD is "available" for purchase or otherwise available to be provided to a player, has been "purchased" or otherwise provided to a player, or has been "redeemed" such that the redemption value of the DVD, if any, has been provided to a player).

The available DVDs database 1000 may be utilized, for example, to track DVDs available for purchase at a casino. For example, as a DVD is provided by the AS 310 of FIG. 3 and/or otherwise made available for sale or other provision to a player, a new record may be created in the database based on the unique disc identifier 1005 of the DVD. In some embodiments, the disc identifier 1005 and/or another field may correspond to one or more DVDs stored and made available to players (e.g., behind a customer service desk), and/or may correspond to one or more session objects associated with an available DVD. The redemption value associated with the DVD may also be recorded in the newly created record (e.g., the redemption value that corresponds to the DVD identifier may be received from the AS 310 of FIG. 3). The status of the DVD may be set to "available."

In one embodiment, the available DVDs database 1000 may be utilized again when a player requests to purchase a DVD. For example, the database may be queried based on the disc identifier 1005 as indicated on the packaging of the DVD (e.g., a session object) that the player desires to purchase. It may be verified that the DVD has not previously been purchased, based on the status 1030 associated with the DVD in the database. Further, an activation code may be determined (e.g., by the CS 305 of FIG. 3, which may generated or select an activation code for each DVD as it is sold via a POS) and the activation code may be recorded in the appropriate record of the available DVDs database. For example, the POS 320 of FIG. 3 may communicate with the CS 305 in order to determine the activation code and verify that the DVD is available for purchase.

It should be noted that an activation code may, in some embodiments, be necessary to activate a DVD (e.g., the player may be required to input the activation code when inserting the DVD into a DVD player). In other embodiments, the activation code may only be necessary for redemption of the DVD but not for viewing the video presentation of the DVD. The activation code may also be printed on a receipt provided to the player for the purchase of the DVD, or otherwise provided to the player upon the DVD being provided to the player in a legitimate manner.

The available DVDs database 1000 may be accessed yet again when a player attempts to redeem a DVD (e.g., collect the redemption value associated with the DVD). For example, as described in detail herein (e.g., particularly with reference to FIG. 25), it may be verified that the DVD was legitimately purchased (and/or otherwise provided) and that the DVD has not previously been redeemed (e.g., the status associated with the DVD is "purchased").

Referring now to FIG. 11A, illustrated therein is a tabular representation 1100A of an exemplary embodiment of a record of a media file database 525 (e.g., as it may be stored in a memory of the AS 500 of FIG. 5 and/or a memory of another device). Tabular representation 1100A is referred to herein as media file record 1100A.

The media file record 1100A includes a number of example entries, including entries R1100-1 through R1100-9, each defining a media file available for inclusion in a video presentation depicting outcomes for a session. Those skilled in the art will understand that the media file record 1100A may include any number of entries. The media file record 1100A also defines fields for each of the entries or records. The fields specify:

(i) a game 1105A that indicates a game to which the media files correspond (the identifier may be in an alphanumeric or text form; the identifier may be in machine and/or human readable form; the identifier may comprise a brand name of a game (e.g., IGT™ Double Diamonds™ game) or another identifier that uniquely identifies the game within a system);

(ii) a game type file 1110A, which stores a media file comprising data indicating a type of game for which the outcomes of a current session were determined (e.g., reeled slot machine vs. draw video poker or three-reeled slot machine vs. five-reeled slot machine);

(iii) a game brand file 1115A, which stores a media file comprising data indicating a brand of the game (e.g., a logo of the manufacturer of the game and/or a logo of the title of the game) for which the outcomes of a current session were determined;

(iv) a casino brand file 1120A, which stores a media file comprising data indicating a casino at which the outcomes of a current session were determined and/or a casino that ordered the DVD corresponding to the session (e.g., the logo of the casino, an aerial shot of the casino, a drawing or picture of the outside of the casino, etc.);

(v) an outcome identifier 1125A that uniquely identifies an outcome;

(vi) an outcome 1125A that describes the set of indicia corresponding to the outcome identifier;

(vii) an outcome media file 1130A that stores a media file comprising data indicating the outcome corresponding to the outcome identifier (e.g., an animation of the appropriate number of reels starting to spin from a stopped position and stopping to depict the appropriate symbols along a payline, accompanied by appropriate sounds of the slot machine);

(viii) a duration 1140A that indicates a duration of the corresponding outcome media file.

It should be understood that, with respect to fields 1110A, 1115A, 1120A and 1135A, in one embodiment, the fields may store one or more of (i) the files themselves; (ii) an indication of where a file is stored (e.g., a file path); (iii) video and/or audio data; (iv) a large file name plus start/stop time codes for the file, such that the large file may include indication of a plurality of outcomes and the start/stop times may be used to select the particular portion of the large file that depicts the desired outcome.

The term "current session", as the term is used above with respect to the description of FIG. 11A, refers to a session for which a video presentation is currently being created based on the information in media file record 1100A.

It should be understood that, in some embodiments, the AS 500 of FIG. 5 may be operable to manufacture multiple video sessions and/or multiple DVDs simultaneously.

A media file may comprise graphical and/or audio data. Further, the graphical data may be still and/or animated.

The duration 1240 of a media file may vary from a first outcome to a second outcome. For example, outcomes corresponding to larger payouts may comprise a longer duration that includes a longer pause at the end of an animation showing the reels stopping to display a winning combination of symbols along a payline, to allow a player to enjoy the win and/or to help ensure that the player recognizes the win.

The media file record 1100A may, in some embodiments, include different and/or additional data. For example, a media file depicting the wager amount per game play may be stored. In another example, an indication of the number of frames included in each media file may be stored.

The number of frames information may be used, for example, to determine a portion of a media file into which another media file may be overlaid. For example, in some embodiments a changing credit meter balance may be indicated during each represented game play. For example, for a reeled slot machine game, each time an outcome is revealed during the presentation by depicting an animation of reels spinning, a media file comprising a credit meter balance value may be overlaid in a specific portion of each frame, and the credit meter balance may be depicted as changing within a certain number of frames from the beginning of the media file depicting the spinning reels. For example, assuming a media file depicting the spinning reels is nine hundred (900) frames long, at the fiftieth ($50^{th}$) frame, an overlay of the credit meter balance graphic may be depicted as decreasing due to the wager posted for the game play and, during the eight hundredth ($800^{th}$) frame, the overlay of the credit meter balance graphic may be depicted as increasing due to a payout won, if any, as a result of the game play. Accordingly, a program for creating the video presentation may be programmed to overlay certain graphics at certain frames of a media file.

The media file record 1100A may be accessed, for example, by the AS 500 of FIG. 5 to select media files to include in a video presentation. For example, in one embodiment the AS 500 may access the record 1100A and select media files based on session result information for a particular session received from the CS 305 of FIG. 3 or another device. For example, the AS 500 may determine, from the session result information, the game for which outcomes comprising the session were determined. The AS 500 may thus select the appropriate record of a media file database based on the game (i.e., in some embodiments each record may correspond to a different game). The AS 500 may then create a video presentation by putting together the following media files in the following order: (i) the game type file; (ii) the game brand file; (iii) the casino brand file; (iv) the appropriate outcome media files, selected based on the outcomes determined for the session and put together in an appropriate order. The outcomes depicted in the outcome media files may be referred to as the representative outcomes for the session.

With respect to item (iv), as described in detail herein, in some embodiments the outcomes for the session may be selected by the AS 500 based on session result information or an indication of a plurality of outcomes determined for the session. Similarly, in some embodiments the order of the outcomes may be selected by the AS 500. Accordingly, the AS 500 may perform a routine for selecting the outcomes (e.g., outcome identifiers) and order thereof prior to accessing the media files database. In other embodiments, the outcomes and/or order thereof may be determined by another device (e.g., the CS 305 or the GD 315 of FIG. 3). In such embodiments, the AS 500 may access the media files database to select the appropriate outcome media files and the order in which they should be put together in the video presentation based on the received information that indicates the particular outcomes and particular order thereof.

In some embodiments, media files of additional information may be stored in media file record 1100A. For example, a media file depicting a payout schedule active for a current session may be stored. In another example, a message congratulating a player on obtaining a particularly large payout (e.g., a payout greater than one hundred (100) credits) may be depicted in a media file. Accordingly, in some embodiments the AS 500 (or another device operable to create a video presentation for a session) may be programmed to select such a media file and place it in the video presentation in an appropriate location (e.g., immediately following a media file depicting the particularly large payout). In some embodiments such messages may be generic such that they are not dependent on the game or game type being played. Accordingly, in such embodiments such messages may be stored in a distinct database that is accessed by the AS 500 as appropriate.

It should be noted that, in creating a video presentation based on media files, the media files may not necessarily be put together in a sequential order such that only a single media file is depicted at any given time, followed by another media file. The media files may be put together in any manner that is desirable and practicable (e.g., the media files may be overlaid together, merged, depicted simultaneously on a screen, etc.). For example, some media files (e.g., payout schedule media file, casino brand media file, wager per game play media file, game brand media file) may be depicted in one or more frames or portions of frames of one or more media files (e.g., along with each outcome media file). For example, a video presentation may be created such that the casino logo, game logo, credit meter balance graphic and/or a number of spins remaining graphic is always displayed along a portion of the screen as the animation of reels spinning to reveal an outcome is depicted along another portion of the screen.

In some embodiments, the overlay of a graphic or first media file onto one or more frames (or portions of a frame) of a second media file may be performed during the production process (e.g., as the video presentation and corresponding DVD are being created). In other embodiments, the appropriate information may be stored on a DVD and an appropriately programmed DVD player in a player's home may be operable to overlay the information when playing the video presentation.

In some embodiments, distinct media files depicting outcomes may be created for each casino or other customer who may order a DVD in accordance with embodiments described herein. For example, a particular outcome for a Double Diamonds™ machine at Stallion casino may be stored in a distinct media file from the same outcome for a Double Diamonds™ machine at the French Riviera™ casino. This may save resources (e.g., time) producing a DVD in that a graphic of the game brand and/or casino need not be overlaid onto each frame or media file depicting an outcome. Rather, the appropriate record for the appropriate combination of game brand and casino may be accessed to determine the media files to be used in creating the video presentation, and the media files may already be customized for the game brand and/or casino. In such embodiments, the game brand file 1215 and/or the casino brand file 1220 may instead be field that include an identifier of a game brand and/or an identifier of a casino brand, for purposes of accessing the appropriate record.

In some embodiments, an indication of a payout corresponding to each set of indicia comprising an outcome may also be stored in table 1100A. In other embodiments, the corresponding payout (e.g., for determined how to adjust a credit meter balance graphic) may be stored in a separate database (e.g., the payout may be determined based on the outcome identifier, wherein the subject database correlates each payout to an outcome identifier).

Of course, it should be understood that more than one such media file may be associated with an outcome identifier, and that a variety of such media formats are contemplated. For example, in one embodiment, files indicated and stored by a media file database may be of a format commonly used for storing video on a DVD. Other formats for digitally storing video or audio/video (e.g., MPEG, MPEG2, AVI, MOV, DivX, etc.) are contemplated, as well as other formats for storing audio (e.g., MP3, WAV, etc.). Such media files may comprise video animations, video recordings or any other graphic renderings that otherwise recreate or approximate the entertainment that a GD commonly outputs when communicating game results. For example, if an outcome of a GD is "BELL-BELL-BELL," a media file corresponding to the outcome (or a plurality of media files that are overlaid, interlaced or otherwise combined to represent the outcome) may comprise a graphic animation of the spinning reels, changes in credit balance and other visuals commonly output by a display screen of the GD, as well as accompanying sound effects. In another example, a media file may comprise a video recording of an actual GD producing such a game result (e.g., a video camera is used to capture the GD outputting such a result). Various combinations and modifications of such embodiments are also contemplated.

Additionally, it should be understood that such a media file database may be structured in a variety of manners. For example, rather than storing outcome identifiers and associated media files as records of entry associated with a particular game, outcome identifiers themselves may comprise an embedded indication of a game (e.g., an outcome identifier is "GD-BTO-012-O-000001" or "012-000001," with "GD-BTO-012" or "012" identifying a game for which the outcome was generated), such that a media file database need not comprise separate entries for each of a plurality of possible games.

It should also be noted that in the above-described embodiment, each non-winning outcome is represented by the same outcome identifier (e.g., "BELL-BAR-ORANGE" is the same as "7-BAR-PLUM"). Of course, alternative methods of representing such outcomes are contemplated (e.g., each non-winning outcome and winning outcome is associated with a unique outcome identifier). Further, it should be understood that various "substitute" or "alternate" media files may be used in place of an identified outcome. For example, a database may indicate a number of appropriate media files from which one may be selected randomly (or based on another rule) to represent the identified outcome.

In one embodiment, only payout (and, in some embodiments, game play number) information associated with a session may be utilized (e.g., by the AS 500 of FIG. 5) in creating a video presentation to be recorded onto a DVD. For example, session result data may indicate only that a first game play yielded a payout of zero (0) coins, a second game play yielded a payout of five (5) coins, and so on. In this manner, the AS 500 may select from a variety of appropriate media files (e.g., media files may be archived according to the occurrence of a payout amount that the file represents). Such an embodiment may be beneficial in that, for example, the AS 500 may choose one of a variety of different gaming device "skins" or visual motifs when determining a media file associated with an outcome (e.g., the AS 500 may select a media file themed after a slot machine a player has indicated a preference for). Such an embodiment is described below with reference to embodiment 1100B of a media file database.

Still further methods of determining media files pursuant to creating a video presentation of session are contemplated. In one embodiment, rather than determine an associated media file based on an outcome identifier or other identifier, the AS 500 may simply access, in association with a session, (i) a game play number and (ii) an associated media file. For example, in some embodiments, in outputting session result data (e.g., to a session database 425 and/or to a printed ticket), a GD may simply output (i) a session identifier, (ii) one or more game play numbers, and (iii) one or more associated media files. In this manner, AS 500 may determine which media files are to be used in the creation of a video presentation without, for example, the need access a database such as a media file database 425. For example, simply by scanning a video ticket, the AS 500 may learn which media files are appropriate—and perhaps even the order which they may be assembled, as indicated by a game play number—to create a video presentation associated with a session).

In summary, in some embodiments the AS 500 (and/or another device) may (i) receive session result data associated with an executed session, and (ii) determine media files based on the session result data. In some embodiments, as a game play number may be associated with a an outcome indicated in session result data, an order in which media filed may be assembled to create a video presentation may be determined as well.

Referring now to FIG. 11B, illustrated therein is a tabular representation 1100B of another example embodiment of media file database 525 (e.g., as it may be stored in a memory of the AS 500 of FIG. 5 and/or a memory of another device). Tabular representation 1100B is referred to herein as media file record 1100B.

The media file record 1100B includes a number of example entries, including entries R1100-1 through R1100-9, each defining a media file available for inclusion in a video presentation depicting outcomes for a session. Those skilled in the art will understand that the media file record 1100B may include any number of entries. The media file record 1100B also defines fields for each of the entries or records. The fields specify: (i) a game 1105A that indicates a game to which the media files correspond (the identifier may be in an alphanumeric or text form; the identifier may be in machine and/or human readable form); (ii) a game type file 1110A, which stores a media file comprising data indicating a type of game for which the outcomes of a current session were determined; (iii) a game brand file 1115A, which stores a media file comprising data indicating a brand of the game (e.g., a logo of the manufacturer of the game and/or a logo of the title of the game) for which the outcomes of a current session were determined; (iv) a casino brand file 1120A, which stores a media file comprising data indicating a casino at which the outcomes of a current session were determined (e.g., the logo of the casino, an aerial shot of the casino, a drawing or picture of the outside of the casino, etc.); (v) a payout 1125B, which indicates a particular amount of a payout; (vi) a payout media file 1130B, which stores a media file comprising data indicating the indicia corresponding to the amount of the payout; and (vii) a duration 1135B that indicates a duration of a corresponding payout media file.

Media record 1100B is included herein to illustrate another embodiment of a media files database, one in which media files are selected based on payout amounts instead of outcome identifiers. For example, the AS 500 may perform processes very similar to those described with respect to FIG. 11A for creating a video presentation. However, rather than selecting outcome media files based on outcomes and the order thereof determined for a session, the AS 500 may instead select payout media files and put them together in a particular order to create a video presentation based on payout data that is determined based on session result data for a particular session. For example, as described in detail herein, in one embodiment the AS 500 may receive an indication of (i) a starting credit meter balance for a session, (ii) a wager per game play, (iii) a number of game plays comprising the session, and (iv) an ending credit meter balance for the session. Based on this information, the AS 500 may determine the particular payouts, and the order thereof, to be depicted in a video presentation created for the session. The AS 500 may then access record 1100B and select the appropriate payout media files 1130B. In another embodiment, the AS 500 may receive the information of the particular payouts obtained for a session and, in some embodiments, the order thereof, and may access record 1100B based on this information.

The fields 1105B through 1120B, as well as field 1135B, correspond to the fields of the same name in FIG. 11A. Accordingly, the descriptions thereof need not be repeated. Similarly, the description of additional and/or different data that may be stored in record 1100A applies equally to record 1100B and need not be repeated.

Referring to both FIG. 11A and FIG. 11B, in accordance with some embodiments a device (e.g., AS 500) may be operable to create a database of media files for use in creating a video presentation. For example, once certain parameters (e.g., one or more of game type, game brand, casino brand, wager per game play, a payout schedule to be used, etc.) are entered (e.g., by an operator of the device), the device may be operable to (i) generate each possible outcome or payout combination (which step may include determined the set of indicia comprising each outcome);

(ii) for each outcome:

(a) animate the code depicting the outcome;

(b) encode to a specific format desired; and (c) store the resulting media file to a database (e.g., the database of FIG. 11A or FIG. 11B).

In some embodiments, the above process is performed in association with each of the possible outcomes. In other embodiments, each possible outcome is determined one for each of a plurality of possible starting credit meter balances.

In some embodiments, the device may further be operable to update a media file database with the location of a particular file created and/or the media file itself if the media file is stored in the database. The device may also be further operable to create audio for each video media file simultaneously with the process described above. In other embodiments, the device (or another device) may be operable to create appropriate audio for a video media file in a separate process. For example, there may be a smaller number of distinct audio files required than there are video files (e.g., each winning outcome, although it depicts different indicia and corresponds to a different payout, may include the same audio file). In some embodiments, the audio is stored (e.g., multiplexed and/or interleaved) with a video file while in other embodiments an audio file and video file are stored as separate files.

Once media files have been determined, a video presentation may be created using the media files. Various processes for creating a video presentation based on media files are described herein (e.g., particularly with reference to FIG. 17, FIG. 20, FIG. 21A, and FIG. 21B). For example, in some embodiments, a video presentation may comprise a series of media files (e.g., animations of slot machine reels spinning and accompanying sounds) that a player may view (e.g., in succession or individually). Thus, a player may remotely watch a video presentation of a session, and learn of a plurality of outcomes comprising the session by watching recreations or renderings of the outcomes, though the actual generation of such outcomes may have occurred previously (e.g., in a legal jurisdiction, such as a casino).

Referring now to FIG. 12, illustrated therein is a tabular representation 1200 of an exemplary embodiment of a record of a session media file database 530 (e.g., as it may be stored in a memory of the AS 500 of FIG. 5 and/or a memory of another device). Tabular representation 1200 is referred to herein as session media file record 1200. The session media file database may be utilized, for example, to store the media files selected (and, e.g., the order thereof) for a particular session. For example, as the AS 500 accesses a record 1100A or 1100B to select the media files for a video presentation to be created for a session, the AS 500 may create a new record in a session media file database for the session. Then, as the AS 500 selects files for the video presentation of the session from the record 1100A or 1100B, it may populate the newly created record of the session media file database to store an indication of the media files selected and the order in which these media files are to be put together in the resulting video presentation.

The session media file record 1200 includes a number of example entries, including entries R1200-1 through R1200-9, each defining a media file to be included in a video presentation for a current session. The term "a current session", as the term is used with respect to FIG. 12, refers to the session for which a video presentation is being created and for which media files are being selected. Those skilled in the art will understand that the session media file record 1200 may include any number of entries. The session media file record 1200 also defines fields for each of the entries or records. The fields specify: (i) a session identifier 1205 that uniquely identifies a session; (ii) a media file order indicator 1210 that indicates the order in which the media files selected for the video presentation are to be put together in the video presentation; (iii) a media file 1215, which stores a media file or an indication of the media file; and (iv) a media file description 1220 that describes what is included in the corresponding media file.

As described herein, in some embodiments a video presentation may include content in addition to video/audio representations of outcomes. For example, a video presentation may begin with an animated logo of a game and casino associated with a session based on which the video presentation was created. Accordingly, a media file of the game brand may begin the video presentation (as depicted in entry R1200-1 of record R1200), followed by a media file of the casino logo (as depicted in entry R1200-2 of record R1200). The video presentation may then continue by presenting, in sequential order, a plurality of outcomes (as depicted in entries R1200-3 through R1200-5). In some embodiments, a message may be included in the video presentation, in between the depiction of representative outcomes (as depicted in entry R1200-6). It should be understood that, although the media files of session "S-01927" are depicted as being ordered in sequence, in some embodiments two or more media files or the contents thereof may be presented simultaneously in one or more frames of a video presentation (as described above with reference to FIG. 11A). For example, the game and/or casino logo may persist from frame to frame as different representative outcomes are presented during the video presentation.

Referring now to FIG. 13A and FIG. 13B, collectively, illustrated therein are tabular representations 1300 of an exemplary embodiment of a DVD production queue database 535 (e.g., as it may be stored in a memory of the AS 500 of FIG. 5 and/or in the memory of another device). Tabular representation 1300 is referred to herein as DVD production queue database 1300.

The DVD production queue database 1300 includes a number of example records or entries, including records R1300-1 through R1300-3, each defining a DVD that has been placed in a production queue (e.g., a production queue of the AS 500 of FIG. 5). Those skilled in the art will understand that the DVD production queue database 1300 may include any number of records or entries. The DVD production queue database 1300 also defines fields for each of the entries or records. The fields specify:

(i) an order number 1305 that stores a unique order number identifying the order in which the request for the DVD of the particular record was received (e.g., a casino or other entity may place an order for one thousand (1,000) DVDs and each of the DVDs may be associated with the same order number; in another embodiment, each DVD may be associated with a distinct and unique order number);

(ii) a customer identifier 1310 that stores an identifier of a customer who ordered the DVD of the record (e.g., casino, GD manufacturer, player or other entity);

(iii) a disc identifier 1315 that uniquely identifies a DVD of the record;

(iv) a game brand 1320 that stores an indication of the game for which the outcomes to be represented in the video presentation to be recorded on the DVD of the record were determined;

(v) a casino 1325 that identifies the casino associated with the outcomes to be represented in a video presentation to be recorded on the DVD of the record;

(vi) a denomination 1330 of the GD to be represented in a video presentation to be recorded on the DVD of the record;

(vii) a wager per game play 1335 used in generating the outcomes to be represented in a video presentation to be recorded on the DVD of the record;

(viii) a payout schedule identifier 140 that identifies the payout schedule (i.e., active payout combinations) utilized in determining the outcomes to be represented in a video presentation to be recorded on the DVD of the record;

(ix) a number of game plays 1345 to be represented in the video presentation to be recorded on the DVD of the record;

(x) a starting credit meter balance 1350 that indicates the value of the credit meter balance prior to any outcomes being determined for the session to be represented in the video presentation to be recorded on the DVD of the record (which, in some embodiments, may be the price of the DVD);

(xi) an end credit meter balance 1355 that indicates the value of the credit meter balance once the last of the outcomes comprising the session to be represented in the video presentation to be recorded on the DVD of the record has been generated (which, in some embodiments, may be the redemption value of the DVD);

(xii) a session identifier 1360 that uniquely identifies the session to be represented in a video presentation to be recorded on the DVD of the record (which session identifier may be used to access records of other databases, such as a record of a session media files database (an example of which is described with respect to FIG. 12));

(xiii) an order submission time 1365 that indicates a date and/or time at which the order for the DVD of the record was submitted (e.g., received by the AS 500);

(xiv) a production start time 1370 that indicates a date and/or time at which production of the DVD was begun (in some embodiments, the beginning of the production of the DVD may be considered to be the time at which the video presentation to be recorded on the DVD is begun to be determined (e.g., by selecting appropriate media files to be included on the DVD); in other embodiments this time may be considered to be the time at which the recording of the video presentation onto the DVD is begun, or another event);

(xv) a production step 1 time 1375 that indicates the date and/or time at which a first step of a process to produce or create the DVD of the record was begun (alternatively or additionally, the time at which the first step was completed may be stored);

(xvi) a production step n time 1380 that indicates the date and/or time at which an $n^{th}$ step of a produces to produce or create the DVD of the record was begun (alternatively or additionally, the time at which the $n^{th}$ step was completed may be stored; it should be understood that the number of fields for recording the beginning time of each step in a DVD production process is based on the number of steps included in the process);

(xvii) a production completed time 1385 that indicates the date and/or time at which the production of the DVD was completed (in some embodiments, the completion of production may be considered to be the video presentation being recorded onto the DVD; in other embodiments, the completion of production may be considered to be when the DVD is appropriately packaged and is ready for shipment, or another event);

(xviii) a shipped time 1390 that indicates a date and/or time at which the DVD of the record was shipped (e.g., to the customer indicated in field 1310).

The DVD production queue database 1300 may be utilized, for example, to track the process of producing each DVD (e.g., each DVD of a batch of pre-recorded DVDs and/or each DVD of a plurality of on-demand DVDs requested by players). For example, a new record may be created in the DVD production queue database 1300 upon an order for a DVD being received. For example, an employee associated with the AS 500 may enter the information into the database upon receiving an order. In another embodiment, the CS 305 of FIG. 3 or another device may be operable to write data to the DVD production queue database 1300. A particular record may be updated (e.g., based on the disc identifier and/or session identifier) as the corresponding DVD moves through the production process. Of course, additional and/or different information may be stored in the DVD production queue database 1300.

A DVD may be created using a combination of databases. Example processes for using various databases to create a DVD and track the progress thereof are described in detail herein.

Referring now to FIG. 14, illustrated therein is a tabular representation 1400 of a record of an example embodiment of an outcome sets database 540 (e.g., as it may be stored in a memory of the AS 500 of FIG. 5 and/or a memory of another device). The tabular representation 1400 is referred to herein as outcome sets database record 1400. It should be noted that, in the embodiment depicted via FIG. 14, a record may be created in an outcome sets database 540 for each desired combination of the following parameters and values thereof (i) a game; (ii) a number of game plays; (iii) a wager per game play. Thus, for example, if a casino or other entity desires to sell, for a given game, (i) some DVDs having five hundred (500) outcomes depicted at a wager of one dollar ($1.00) per game play, (ii) some DVDs having five hundred (500) outcomes depicted at a wager of fifty cents ($0.50) per game play, (iii) some DVDs having one thousand (1,000) outcomes depicted at a wager of one dollar ($1.00) per game play, and (iv) some DVDs having one thousand (1,000) outcomes depicted at a wager of fifty cents ($0.50) per game play, there may be four distinct records created for the game. Each record corresponds to a unique combination of: (i) game, (ii) number of game plays; and (iii) wager per game play. Of course other parameters may be included in creating such combinations of parameters, such as a particular payout schedule to be used, etc. Varying the number of parameters characterizing a record will affect the number of records that are appropriate for a given game.

The outcome sets database 1400 includes a number of example records or entries, including records R1400-1 through R1400-*n*, each defining a plurality of sets of outcomes corresponding to a particular end credit meter balance for a particular combination of game, number of game plays and wager per game play. Those skilled in the art will understand that the outcome sets database 1400 may include any number of records or entries. The outcome sets database 1400 also defines fields for each of the entries or records. The fields specify: (i) a game identifier 1405 that indicates (e.g., in alphanumeric form) a particular game to which the sets of outcomes correspond; (ii) a number of game plays 1410 characterizing a current session (i.e., the session for which a set of outcomes is being determined); (iii) a wager per game play 1415 that indicates the wager posted for each game play of the current session; (iv) a final credit meter balance 1420 that indicates the end credit meter balance of a current session; (v) a first set of outcomes 1425 that corresponds to a particular end credit meter balance; (vi) a second set of outcomes 1430 that corresponds to a particular end credit meter balance; and (vii) an $n^{th}$ set of outcomes 1435 that corresponds to a particular end credit meter balance. It should be understood that any number of sets of outcomes may be used.

The database 540 may be used, for example, to determine a set of representative outcomes to be included in a video presentation to be recorded onto a DVD. As described herein, in some embodiments, the AS 500 (or another device operable to create a video presentation to be recorded onto a DVD) may receive an indication of a plurality of outcomes comprising a session (i.e., session result data) that includes an indication of (i) the game for which the outcomes of the session were determined; (ii) the number of game plays comprising the session; (iii) the wager per game play; (iv) the end credit meter balance at the completion of the session. Based on such session result data, the AS 500 may determine a set of representative outcomes to be included in a video presentation to be recorded on a DVD, for indicating the session result data to the player in a player friendly format.

In one embodiment, selecting the set of representative outcomes may be based on an end credit meter balance of the session. In such an embodiment, the outcome sets database illustrated via record 1400 may be used. For example, for each possible end credit meter balance of a session corresponding to a particular combination of a game, number of game plays and wager per game play, there may be associated several possible sets of outcomes. The AS 500 may thus access the appropriate record of the outcome sets database based on the combination of game, number of game plays and wager per game play indicated in the session result data. The AS 500 may then determine the appropriate sets of outcomes based on the end credit meter balance included in the session result data.

In some embodiments, the AS 500 may then further select one of the sets of outcomes to include in a video presentation based on a predetermined rule (e.g., randomly, in sequence such that each set of indicia sets is cycled through in an orderly basis, or based on another rule). In one embodiment, each set of outcomes includes an indication of the indicia comprising each outcome and the order in which the outcomes are to be presented. In another embodiment, each set of outcomes includes an indication of the payouts to be represented in the video presentation and the order in which the payouts are to be presented in the video presentation (each payout being presented by presenting a media file depicting the appropriate set of indicia representing the payout).

In some embodiments, the AS 500 may, after selecting a set of outcomes from the plurality of sets of outcomes corresponding to a particular end credit meter balance, determine the appropriate media file for each outcome of the set by accessing a media file database. For example, the AS 500 may access the media file database of FIG. 11A if the outcome set includes a set of outcome identifiers, or the media file database of FIG. 11B if the outcome set includes a set of payout identifiers.

In some embodiments the media file is searched. If it does not yet exist it is created. After creation, the media file is stored in a manner that allows searching (e.g., a file and a pointer to the file in a database). In this manner, should the same outcome be needed in the future, the system does not need to create the media file yet again. In this manner, the database of prepared media files will grow over time.

It should be noted, with respect to each of fields 1425, 1430 and 1435, that although only a few outcomes are illustrated in each set, in practice the number of outcomes may be equal to the number of game plays comprising the session (i.e., if the session comprises five hundred (500) game plays, each set of outcomes may comprise five hundred (500) outcomes).

It should further be noted, also with respect to each of fields 1425, 1430 and 1435, that each set of outcomes corresponding to a particular end credit meter balance may be populated via a program designed to determine an appropriate set of outcomes and corresponding payouts based on the desired combination of parameters (e.g., such as game, number of game plays and wager per game play). Such a program may be run and the sets of outcomes determined for each possible end credit meter balance prior to any DVD being created in accordance with embodiments of the present invention. In other embodiments, such a program may be run in order to determine one or more appropriate sets of outcomes based on the desired combination of parameters once session result data indicating a value for each of the desired parameters is received.

Referring now to FIG. 15, illustrated therein is a tabular representation 1500 of an example probability database 620 (which may be stored in the GD 600 or in another device). Tabular representation 1500 is referred to herein as probability database 1500. It should be noted that, in some embodiments, a plurality of probability databases may be stored and/or used. For example, a first probability database may be used for a first game and a second probability database may be used for a second game. In another example, a first probability database may be used when a GD is operating in a conventional mode (e.g., a player is playing the GD to obtain and view outcomes one-by-one) and a second probability database may be used when a GD is operating in a "session outcome generation mode" (e.g., the GD is generating a plurality of outcomes to be stored on a DVD and sold to a player for remote viewing of the outcomes at a subsequent time). A first probability database may be different from a second probability database, for example, by including (i) more, fewer or different ranges of random numbers; (ii) a shorter or longer total range of available random numbers; and/or (iii) different outcomes. The probability database 1500 is thus an illustration of one example probability database that may be stored for use in some embodiment.

Probability database 1500 includes a number of example records or entries, including records R1500-1 through R1500-18, each defining an outcome available for a game on a gaming device. Those skilled in the art will understand that the probability database 1500 may include any number of entries. The probability database 1500 also defines fields for each of the entries or records. The fields specify: (i) a random number (or range of random numbers) 1505 that may be generated by a random number generator; and (ii) an outcome identifier 1510 that indicates the one or more indicia comprising the outcome that corresponds to the random number or range of random numbers of a particular record.

A probability database 1500 may be utilized, for example, to determine what outcome corresponds to a random number generated by a random number generator. For a three-reeled slot machine, for example, the outcomes may comprise the three symbols to be displayed along a payline. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

Referring now to FIG. 16, illustrated therein is a tabular representation 1600 of an example payout database 625 that may be stored in a the GD 600 of FIG. 6 or in another device. Tabular representation 1600 is referred to as payout database 1600. It should be noted that, in some embodiments, a plurality of payout databases may be stored and/or used. For example, a first payout database may be used for a first game and a second payout database may be used for a second game. In another example, a first payout database may be used when a GD is operating in a conventional mode (e.g., a player is playing the GD to obtain and view outcomes one-by-one) and a second payout database may be used when a GD is operating in a "session outcome generation mode" (e.g., the GD is generating a plurality of outcomes to be stored on a DVD and sold to a player for remote viewing of the outcomes at a subsequent time). A first payout database may be different from a second payout database, for example, by including (i) different payouts for the same outcome; (ii) different payout combinations; and/or (iii) different indicia corresponding to a payout. The payout database 1600 is thus an illustration of one example probability database that may be stored for use in some embodiment.

Payout database 1600 includes a number of example records or entries, including records R1600-1 through R1600-18, each defining a payout for a particular outcome or payout combination available for a game on a gaming device. Those skilled in the art will understand that the payout database 1600 may include any number of entries. The payout database 1600 also defines fields for each of the entries or records. The fields specify: (i) an outcome identifier 1605 that uniquely identifies an outcome; (ii) an outcome 1610 that corresponds to the outcome identifier (e.g., the set of indicia comprising the outcome); and (ii) a payout that corresponds to the outcome.

It should be noted that, in some embodiments, information illustrated as stored in a payout database and a probability database may be combined and/or some information may be unnecessary and thus not stored. For example, in one embodiment, a probability database and payout database may be combined such that the resulting database stores (i) a random number of range of random numbers field; (ii) a payout that corresponds to each random number or range of random numbers; and (iii) a payout identifier that uniquely identifies each payout. As described, in some embodiments a GD or SGD may generate a plurality of random numbers, each random number being an outcome or result of a game play for a session. However, there may not be a need to determine a set of indicia corresponding to each outcome or result. All that may be desired and/or necessary is to determine the payout corresponding to each random number so generated. Accordingly, a database such as described in this paragraph may be appropriate for use in such embodiments. A GD or other device may use such a database to determine the individual payouts for a session (based on the random numbers generated for the session) and/or a sum of payouts for the session, without determining or being able to determine a set of indicia that corresponds to any particular random number. In some embodiments, as described, the individual payouts and/or sum of payouts determined for a session may be transmitted or communicated to another device, such as the AS 310 of FIG. 3, for translation and storage onto a DVD. A set of indicia may be determined by this other device, for example, during a translation process that determines at least one set of indicia based on the individual payouts and/or sum of payouts of the session.

IV. Processes

Figure 17:
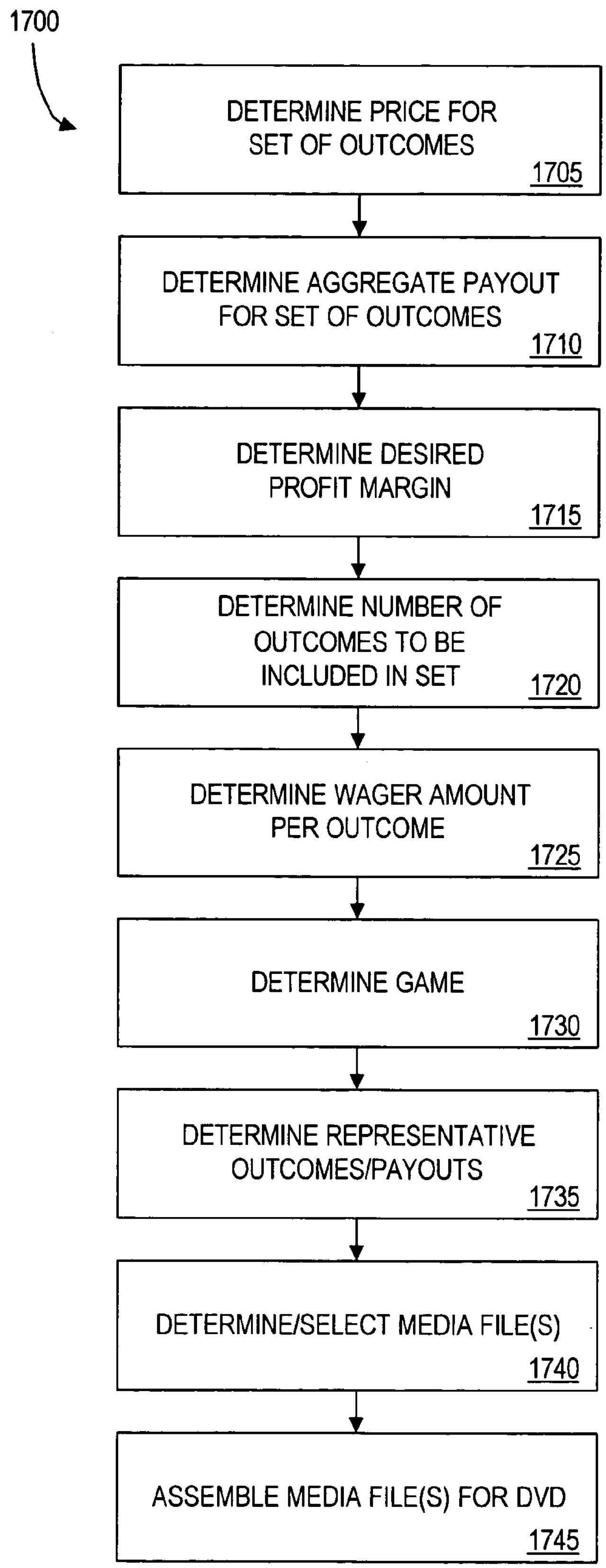
FIG. 17 is a flowchart of an exemplary process for determining a set of outcomes and/or payouts to be represented in a video presentation, in accordance with some embodiments.

Referring now to FIG. 17, illustrated therein is a flowchart of an exemplary process 1700 for determining representative outcomes to be included in a video presentation to be recorded onto a DVD. The process includes a sub-process for selecting the media files to be assembled into the video presentation, which in some embodiments may be a separate process. The process 1700 may be performed, for example, by the AS 500. Of course, as described herein, any process described herein may be performed by any device or combination of devices that is practicable and desirable. Further, as also applies to all processes described herein, the steps may be performed in an order different from that illustrated and additional or different steps may be included. Similarly, some steps may be omitted or combined.

The process 1700 may begin, for example, upon receiving session result data and/or a DVD order based on which a DVD is to be created. Based on the received session result data and/or order information, various information is determined, for use in determining a set of representative outcomes to be represented in a video presentation to be recorded onto a DVD. The information may further be used to select particular media files (e.g., video and/or audio files) for use in creating the video presentation.

In step 1705 a price for the set of representative outcomes to be included on the DVD is determined. In some embodiments, the price may comprise the initial credit meter balance for the session, to be represented in the video presentation. In some embodiments, this price is the price to be charged to a player for purchasing the DVD.

The aggregate payout for the set of representative outcomes (and thus for the session) is determined in step 1710. The aggregate payout for the session is the sum of all payouts determined by a GD when generating the actual outcome for the session. For example, if five (5) actual outcomes were generated and three of them corresponded to a payout of zero (0), while one corresponded to a payout of three (3) credits while the fifth ($5^{th}$) corresponded to a payout of four (4) credits, the aggregate payout for the session is seven (7) credits. It should be understood that the aggregate payout determined in step 1710 may be indicated in any format or denomination desired (e.g., number of credits and the corresponding value of each credit, dollar value, etc.).

A desired profit margin for the DVD is determined in step 1715. In some embodiments, the desired profit margin may inherently be programmed into a GD that creates the actual outcomes for the session, as part of the house advantage that a probability table used in determining the actual outcomes is based on. In such embodiments, a separate determination of the desired profit margin in process 1700 may be unnecessary, as this may inherently be included in the session result data (e.g., price, aggregate payout, wager per game play, etc.).

The number of representative outcomes to be included in the video presentation (typically the number of actual outcomes determined by a GD, on which the session result data is based) is determined in step 1720. For example, the session result data may include the number of game plays, and thus the number of outcomes, comprising the session.

The wager amount per game play is determined in step 1725. This may be, for example, an actual wager amount per game play, an average wager amount per game play for the number of game plays, etc. In some embodiments (e.g., embodiments in which the wager amount per game play does not vary from one game play to another in a given session), the wager amount per game play may be determined by dividing up the price of the set of outcomes (determined in step 1705) by the number of outcomes to be included (determined in step 1720). In other embodiments, the wager amount(s) may be explicitly included in the session result data. For example, the session result data may specify that the wager amount per game play is "$0.50" or, even more specifically, list each game play and the corresponding wager amount.

The game to which the representative outcomes correspond (the game for which a video presentation is to be recorded onto the DVD) is determined in step 1730. Again, this information may be included in the session result data or DVD order.

Based on the above information, a set of representative outcomes is determined in step 1735. For example, a database may be accessed and the set of representative outcomes retrieved from an appropriate record of the database.

For example, in one embodiment the set of representative outcomes may be determined from an outcome sets database 540 (e.g., such as the one depicted in FIG. 14). A particular record of the database may be accessed based on the number of outcomes or game plays, and the wager per game play. The appropriate plurality of sets of outcomes may be determined based on an ending session balance (which may be included in the session result data or calculated based on the price, aggregate payout, number of game plays and wager per game play information). Then one of the sets of outcomes may be selected (e.g., randomly or based on another rule). In some embodiments, a process of determining a set of outcomes or set of payouts based on session result information such as an ending credit balance may be a distinct process performed separately from the reminder of process 1700 (e.g., by the same device or a different device from the device performing other steps of process 1700).

In another example, a program may generate a representative set of outcomes based on the parameters determined in steps 1705-1720. In yet another example, the set of outcomes may be included in the session result data (e.g., another device, such as the CS 305 of FIG. 3 may have determined the representative outcomes and/or the actual outcomes determined by the GD may be used as the representative outcomes directly).

In one embodiment, determining the set of outcomes may include determining an order in which the outcomes are to be represented in a video presentation (e.g., which may differ from an order in which corresponding actual outcomes were generated by a GD).

In one embodiment, determining the set of representative outcomes may comprise determining a set of payouts (and, e.g., the payout identifier corresponding to each payout and/or the order in which the payouts are to be presented in the video presentation).

Once the set of representative outcomes is determined in step 1735, the process 1700 continues to steps 1740 and 1745. It should be noted that, in some embodiments, the process 1700 may end at step 1735 and another process (e.g., performed by another device) may comprise steps 1740 and 1745. For example, part of process 1700 may be to store the set of representative outcomes determined in step 1735 (e.g., in a record of a database, accessible by the unique session identifier, a unique disc identifier and/or an order identifier). For example, the outcome identifier (e.g., and/or payout identifier, as appropriate and desired) for each outcome determined in step 1735 may be stored in such a database. This database may be subsequently accessed for purposes of performing steps 1740 and 1745 or similar steps.

In step 1740, media files are determined and/or selected based on the set of representative outcomes determined in step 1735. For example, a media file database 525 (e.g., such as the one illustrated in FIG. 11A or the one illustrated in FIG. 11B) may be accessed. For example, a particular record may be selected from the database based on the game (in some embodiments the record may be selected based on the game and casino, if, for the same game, there are different media files stored for different casinos). Then the appropriate media files may be selected based on the outcome identifiers of the outcomes determined in step 1735. Determining the media files may include determining media files in addition to media files storing an image or animation of the outcomes. For example, a media file storing an image or animation of a payout schedule, a congratulatory message, an advertisement, a credit meter balance and/or other material may also be selected and assembled into the video presentation. Of course, determining media files may include selecting audio data files as well as video or image files and/or selecting files which later drive a software program.

In step 1745, the media files determined in step 1745 are assembled into a video presentation. A particular process for assembling media files into a video presentation is described with reference to FIG. 22. For example, the media files may be assembled into an order based on an order in which the outcomes are to be presented.

Referring now to FIG. 18, illustrated therein is a flowchart of an exemplary process 1800 for determining a set of media files based on an indication of a set of desired payouts (or a set of desired outcomes), in accordance with some embodiments. The process 1800 may be utilized, for example, in embodiments in which the AS 310 of FIG. 3 (or another device operable to determine media files to be included in a video presentation) receive a plurality of outcome identifiers and/or a plurality of payout identifiers and determines the media files based on these identifiers. For example, unlike the embodiment described with respect to FIG. 17, in which general data defining a session is received and representative outcomes are determined based on this data, in the embodiment of process 1800 the identifiers of the actual outcomes may be received (or the identifiers of the payouts corresponding to the actual identifiers) from the CS 305 of FIG. 3 or another device, thus requiring less processing on the part of the AS 310. The AS 310 may simply select the appropriate media files based on the received identifiers. Of course, the embodiment of process 1800 may require substantially more data to be transmitted from the CS 305 to the AS 310 in the embodiment of process 1800 than in the embodiment of process 1700. For example, in process 1700, it may be sufficient for the CS 305 to transmit to the AS 310 the following information regarding a particular session: (i) a price of the session, (ii) an ending credit meter balance of the session, (iii) an indication of the payout schedule used for the session, and (iv) an indication of the ending credit meter balance for the session. The AS 310 may then determine a plurality of representative outcomes based on this information. In the embodiment of process 1800, however, more information may be transmitted; the outcome identifier and/or payout identifier for each game play (which may be a substantial number of identifiers, as a session may comprise, for example, five hundred (500) or one thousand (1,000) outcomes) may be transmitted.

In step 1805, a plurality of identifiers, each identifier identifying an outcome and/or payout of a session, is received. For example, the identifiers may be received from the CS 305. In one embodiment, the identifiers may be stored in a database and subsequently retrieved. In one embodiment, the identifiers of payouts may comprise the values of the payouts. For example, a record (e.g., such as the one illustrated in FIG. 26 described below) may be used to store the plurality of payout values for a session. In one embodiment, the information received in step 1805 may include an indication of an order in which the outcomes and/or payouts are to be represented in a video presentation for the session. In one embodiment, for example, some or all of the information stored in a record of a session database 425 (e.g., such as the record 700 of FIG. 7) may be received by the AS 310 as part of step 1805.

In step 1810, the game, for which the outcomes and/or payouts of step 1805 were received, is determined. This information may be used to access an appropriate record of a media file database. For example, as described with respect to FIG. 11A and FIG. 11B, a distinct set of media files may be stored for each available game. In one embodiment, step 1810 may further comprise receiving an indication of a casino to be represented in the video presentation (e.g., a casino in which the actual outcomes of the session were generated, a casino that placed the order for the DVD and/or the casino in which the DVD is to be sold). As described with reference to FIG. 11A and FIG. 11B, in some embodiments media files of outcomes for a particular game may be further customized to reflect a particular casino. In such embodiments, an appropriate record of a media file database may be accessed based on a desired combination of game and casino.

In step 1815, the media files for the video presentation to be created are determined based on the outcome identifiers and/or payout identifiers received in step 1705 and the game determined in step 1810. For example, a media file database such as the one depicted in FIG. 11A may be accessed and the appropriate media files selected based on the outcome identifiers.

In step 1820, an indication of the media files determined in step 1815 (and, in some embodiments, the media files themselves or copies thereof) may be stored in association with a session identifier or other unique identifier associated with the session (e.g., a disc identifier identifying the DVD on which the media files are to be included as part of a video presentation to be recorded onto the DVD). Storing the media files may comprise, for example, creating or opening a previously created record of the session media file database 530. For example, a record such as the record 1200 (FIG. 12) of such a database may be created (e.g., during the execution of process 1800) and populated with the media files (or indications or copies thereof) determined in step 1815, in an order in which the media files are to be assembled into the video presentation. It should be understood that a step similar to step 1820 may be performed in process 1700 or any other process described herein that involves the creation of a video presentation. In some embodiments, the 1820 may also or alternatively comprise various subroutines and/or additional steps. The method 1800 may also, for example, create and/or cause to be created a session object associated with the session. For example, a sheet of labels may be printed, each label comprising an identifier associated with at least one session. Each of the labels may then be applied to one or more packaging objects such as DVD jewel cases or sleeves, such that a player may select the session object to indicate which session and/or type of session the player desires to purchase.

Figure 19:
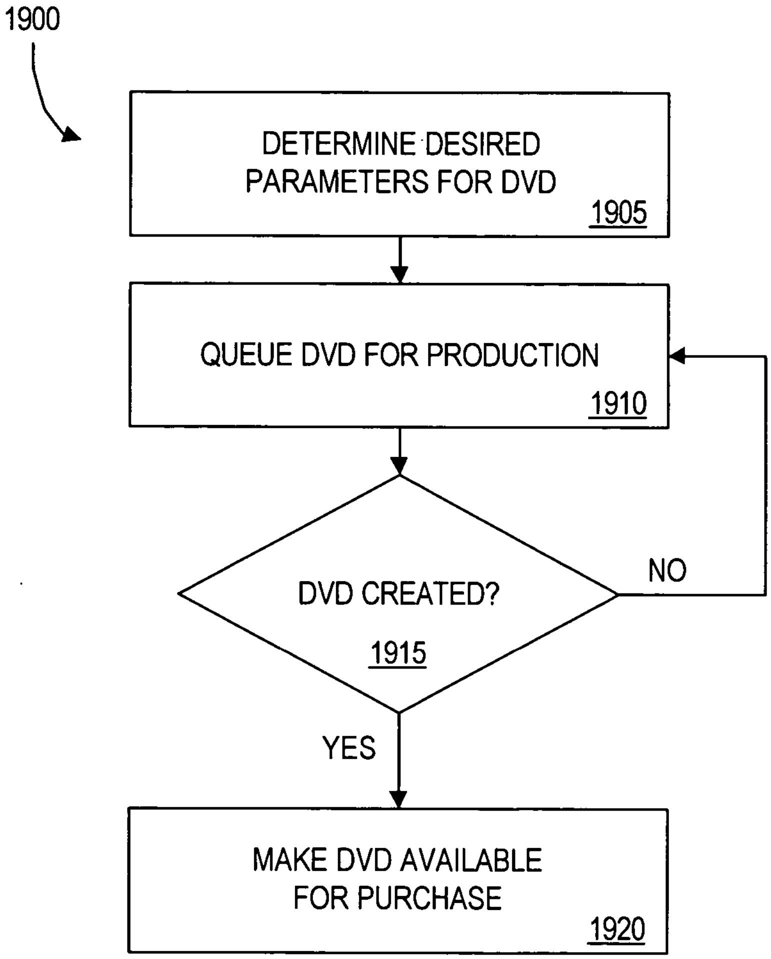
FIG. 19 is a flowchart of an exemplary process for making a DVD available for purchase, in accordance with some embodiments.
Figure 20:
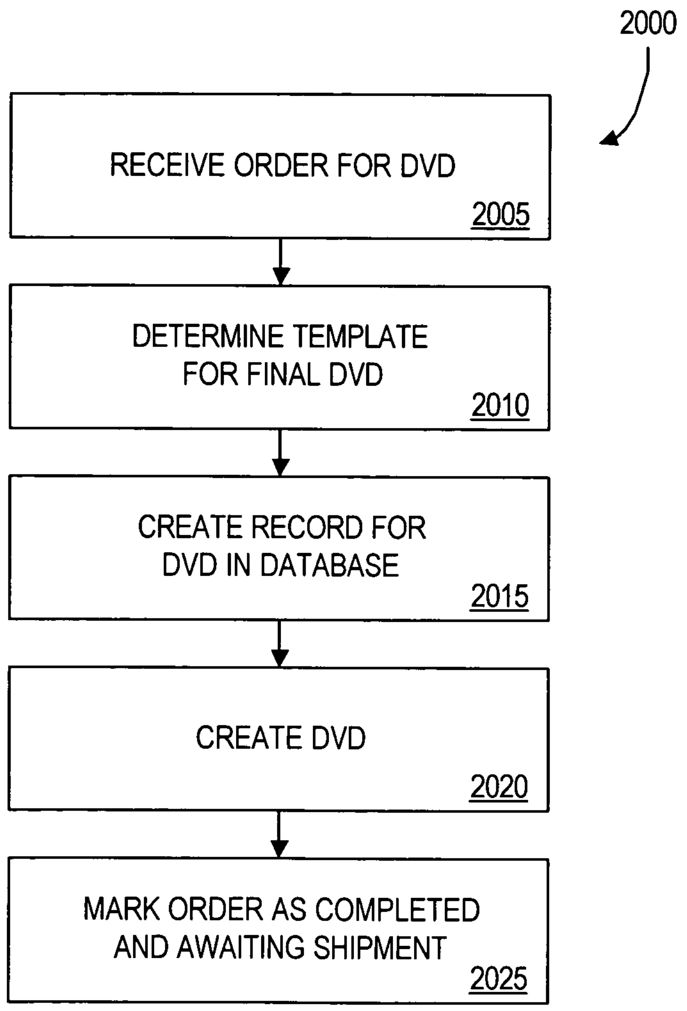
FIG. 20 is a flowchart of an exemplary process for processing an order for a DVD, in accordance with some embodiments.
Figure 21A:
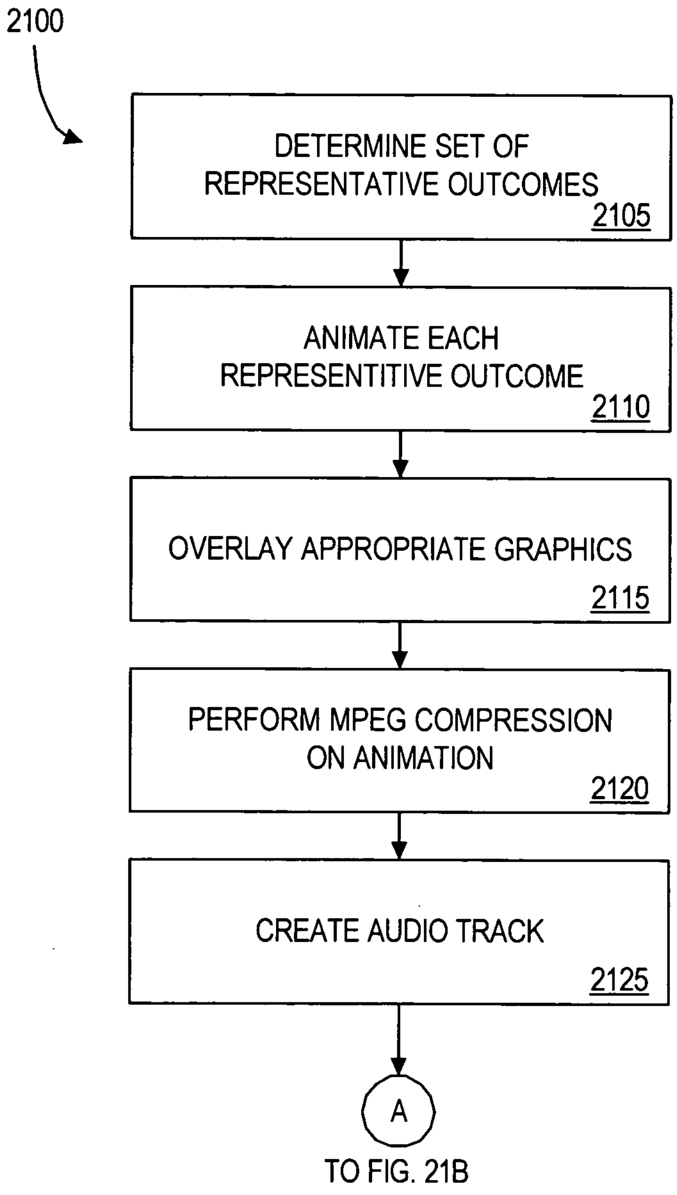
FIG. 21A and FIG. 21B are flowcharts of an exemplary process for creating a DVD, in accordance with some embodiments.
Figure 21B:
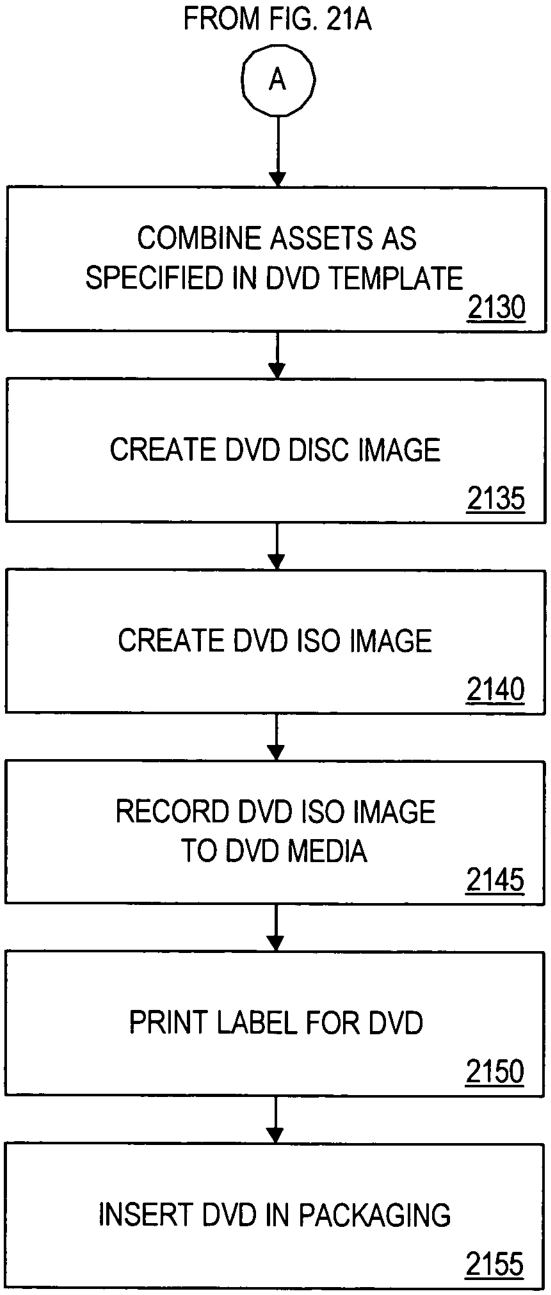

Referring now to FIG. 19, illustrated therein is a flowchart of an exemplary process 1900 for creating a DVD. The process 1900 is meant as an overview of the process of creating a DVD and does not include many detailed steps or sub-routines that may be involved in such a process. FIG. 20 and FIG. 21A and FIG. 21B illustrate more detailed example processes for creating a DVD.

In step 1905, the desired parameters for a DVD to be created are determined. For example, an order for a DVD and/or session result data may be received. According to some embodiments, the session data may be received and/or indicated by, for example, receiving and/or identifying a session object associated with a player. The session object may indicate, for example, one or more parameters (predefined and/or player-defined), directly and/or indirectly (e.g., printed directly on the session object and/or indicated by an identifier and/or code). In one embodiment, some or all of the information in a session database 425 (such as the one embodied in the example record 700 of FIG. 7) may be communicated in step 1905 as an indication of the parameters of the DVD to be created.

Examples of parameters that may be determined in step 1905 include, without limitation, (i) a price of the DVD (which may, in some embodiments, be the starting credit meter balance of the session based on which the DVD is to be created; (ii) a game; (ii) a gaming device; (iii) a casino; (iv) a payout schedule; (v) a strategy to be employed in making decisions on behalf of a player; (vi) an ending credit meter balance; (vii) a number of game plays or outcomes to be represented; (viii) a wager per game play; (ix) outcomes to be represented; (x) an order of outcomes to be represented; (xi) advertisements, promotional or other material to be included in the video presentation to be included on the DVD; (xii) audio to be included on the DVD; (xiii) a language preference in which the material in the DVD is to be presented; and/or (xiv) one or more payouts to be represented on the DVD. It should be understood that some of the above items may be redundant with other items. It should further be understood that not all of the above-listed parameters are required to be known in order to create a DVD.

It should still further be understood that, in some embodiments, some of the parameters (and values thereof) may be determined by a first device (e.g., CS 305) and transmitted to a second device (e.g., the AS 310 of FIG. 3) performing step 1905, while other parameters (and values thereof) may be determined directly by the second device. The second device may determine such additional parameters (and values thereof), for example, based on information received from the first device and/or based on a program or instructions stored in a memory of the second device.

In other embodiments, all of the parameters (and values thereof) may be determined by the first device and transmitted to the second device, the second device having minimal processing capabilities and merely serving to assemble the video presentation and record it onto a DVD.

In step 1910, the DVD is queued for production. For example, a record may be created in a DVD production queue 535 (an example embodiment of which is illustrated in database 1300 of FIG. 13A, FIG. 13B, and FIG. 13C). For example, a unique disc identifier may be determined and used to create a new record. At least some of the parameters determined in step 1905 (and values thereof) may be stored in the record. The disc identifier may be placed in a DVD production queue. A device for producing the DVDs (or at least the device performing a first step in the production process), such as the AS 500, may select the DVDs to be created on a first-come-first-serve basis (e.g., based on the order submission time, based on the disc identifier, etc.).

In step 1915 it is determined whether the DVD has been created. For example, it may be determined whether a record for the DVD in a DVD production queue database indicates that the production process for the DVD has been completed. In a more particular example, the DVD production queue database 1300 may be accessed to determine whether there is an entry in the production completed time field 1385.

If it is determined that the DVD has been created, the DVD is made available for purchase in step 1920. For example, the DVD may be packaged in a shipment of a plurality of DVDs intended for a particular destination (e.g., a casino identified in customer identifier field 1310 of the DVD production queue database 1300) and shipped to the destination. In some embodiments, the DVD may be made available for purchase by, for example, placing the DVD and/or an associated session object (such as an empty packaging medium or a packaging medium housing the DVD) on a storage rack and/or display, such as the session object display 232 of FIG. 2. Otherwise, the process 1915 loops until it is determined that the DVD has been created.

In some embodiments, session result data may be generated and stored in advance of the receipt of a request to produce a game disc. For example, session result data may be "warehoused" (e.g., generated and then stored en masse), such that at a later point, a disc may be created using the historic results. In other embodiments, a device may be configured to generate game play results for a session on demand (e.g., upon receiving a signal from another device). In still further embodiments, a device may be configured to continuously produce game play results (e.g., the device produces one result every second, continually), which game play results may be utilized when game play results are desired pursuant to the creation of a video presentation for a DVD (e.g., when a disc comprising five hundred (500) outcomes is desired, the next five hundred (500) seconds worth of game play results generated by the device are monitored, accessed, recorded and/or otherwise utilized to create the disc).

Such a device may then itself produce a disc, or communicate with one or more devices configured to product such a disc. For example, a memory of a device may store a program for determining one or more media files based on session result data, as described. Thus, a number of media files (e.g., audio and/or video clips or recordings of various slot machine animations) may be determined in association with a disc. As described, in one embodiment, a device that generates game play results may itself be configured to produce a video presentation and/or DVD having the video presentation recorded therein. For example, the device may comprise a program for determining which media files to encode on a DVD, as well as hardware for storing such files on a DVD and formatting the DVD in a manner such that the DVD may be viewable by conventional devices (e.g., the device comprises hardware and software that allows for the production of DVDs). In other embodiments, session result data and/or media files may be accessed by or transmitted to one or more separate devices (e.g., via a communications network) from the device that generates the game play results, such that the one or more separate devices may then produce the video presentations and/or discs. For example, in one embodiment, a central computer may receive blocks of game play results from a plurality of devices (e.g., GDs and/or MGDs). For example, each such device my produce a plurality of game play results, and transmit the results (perhaps along with a session identifier) to the central computer (e.g., the CS 305 and/or the AS 310 of FIG. 3). The central computer may comprise a program for accessing appropriate media files based on the game play results and encoding them onto a DVD, as well as hardware for transferring such files to a DVD (e.g., an optical laser, etc.). Thus, one or more devices of such an automated facility may produce en masse discs according to various parameters, as described herein.

In one embodiment, a secure facility may comprise one or more GDs for producing game play results (e.g., MGDs that generate game play results in an automated fashion, with little or no human involvement). Additionally, such a facility may comprise various hardware and software for producing DVDs (and/or corresponding session objects) based on the results generated by the GDs. For example, an "assembly line" of computerized and/or mechanized devices may be configured to (i) store appropriate media content on DVDs based on game play results generated by the GDs, (ii) label such DVDs, (iii) package such DVDs (e.g., including adding barcodes, graphics, etc.), such as in or on one or more packaging medium session objects, and/or (iv) shrink-wrap such packaging mediums and/or DVDs. Thus, such a facility may comprise a variety of devices, one or more of which may communicate with one or more databases for determining necessary information for producing such DVDs and/or associated session objects. For example, each DVD may be unique (e.g., the game play results thereof may be based on a session generated for that particular DVD), and therefore when producing each DVD, it may be necessary for various devices to communicate with one or more GDs (or otherwise obtain data generated by one or more GDs) and/or databases so as to determine appropriate content for the DVD. For example, an assembly unit may comprise a computer system in communication with a mechanized or robotic arm that accesses physical media (e.g., lifts a "blank" DVD from a spindle of DVDs and places it into an area in which the DVD may subsequently be written to by an optical device). The computer system may also be configured to instruct an optical device to encode the DVD with various content (e.g., indications of game play results, a menu interface, etc.). The computer system itself may or may not generate the game play results that are used to determine the content for the DVD. Accordingly, the assembly unit (e.g., the computer system in communication with the mechanized hardware, optical device, etc.) may communicate with one or more devices and/or databases that store session results and/or media files for creating a video presentation to be recorded onto a DVD.

In one embodiment, because numerous game play results may be generated in a rapid or substantially instantaneous manner, game play results may be generated as required for the production of a particular DVD (e.g., as each DVD becomes ready for content, a GD is instructed to generate game play results). In other embodiments, game play results and/or associated media files may be stored in a database, and then accessed as needed (e.g., upon player request and/or upon determining a corresponding indicia from a session object).

In this manner, an assembly unit may produce a DVD storing indications of game play results in association with a particular session and/or create or store session objects associated therewith and/or indicative thereof. For example, the DVD may be encoded with audio and/or video files depicting an animated slot machine producing various arrays of symbols, a credit meter balance adjusting after each game play, etc. The DVD may further be encoded electronically with a session identifier and/or other session information, a player identifier, and/or a code (e.g., an activation code, a disc identifier, etc.), etc., such that when the DVD is inserted into an appropriate reader device, such information may be accessed. Thus, in some embodiments, a plurality of DVDs may be manufactured, each DVD comprising indications of unique session results.

In some embodiments, a facility for producing DVDs may further be configured to uniquely mark the packaging or labeling of such DVDs with one or more identifiers or codes. For example, a session identifier, player identifier, and/or activation code may be uniquely marked on the packaging or labeling of a DVD, such that the code or identifier may be used to facilitate various steps described herein with respect to the sale, activation and redemption of such DVDs. Thus, in one example, after a DVD has been uniquely encoded with content by a first assembly unit, the DVD may then be transferred to one or more second assembly units that may assist in the labeling and/or packaging of the DVD. For example, a second assembly unit may comprise a computer system in communication with various hardware for applying graphics or other labeling to the top side of a DVD (e.g., a pressing unit applies permanent color or grayscale images to the top side of the DVD). Such a unit may then communicate with one or more databases, such that one or more identifiers associated with the DVD may then be determined (e.g., a "Disc Activation Number"). In one embodiment, a master computer system may keep track of each DVD's position within a series of assembly units, such that when a DVD reaches a second assembly unit, the unit may be instructed to label the DVD with one or more identifiers. In another example, the unit may determine an identifier by reading the DVD (e.g., if the DVD was previously encoded with an identifier). In either case, the identifier may then be marked upon the DVD. In some embodiments, the identifier may be machine-readable (e.g., a barcode is labeled upon the top of the DVD). Alternately or additionally, a human-readable identifier may be labeled upon the DVD (e.g., a numeric code is imprinted). In some embodiments, the labeled and encoded DVD may then be transported to one or more further assembly units. For example, yet another assembly unit may be responsible for inserting the DVD into a jewel case, and/or for shrink-wrapping a jewel case, etc. Other processes such as printing packaging materials (e.g., paper inserts or other paper materials that accompany jewel cases) may or may not take place in such a facility. For example, in one embodiment, a separate press may receive instructions for imprinting a paper cover to be inserted into a jewel case with graphics and a unique identifier (e.g., associated with a particular DVD). The paper cover may then later be merged and/or otherwise incorporated into such an assembly process (e.g., the cover is matched to a jewel case containing the appropriate DVD).

It should be noted that various efforts may be made to ensure that the production of video presentations and/or DVDs on which such video presentations are recorded in such an automated facility occurs without tampering. For example, such devices and/or various components thereof may be equipped with devices that indicate whether physical tampering has occurred (e.g., the casing of a device for generating game play results comprises a tamper-evident seal). In other embodiments, a central computer or server may authenticate or verify that the software of a device has not been tampered with, via a checksum or one or more other such authentication procedures known in the art.

Further, gaming regulators may require various steps, for example, to prove that when creating DVDs, operators of a system may not purposefully create "losing" video presentations and/or DVDs (i.e., ones that correspond to a redemption value of zero) by selecting losing outcomes, or manipulate the random nature of game play result generation in any fashion (e.g., physical or electronic tampering, which may be monitored by a third party, would be evident). In some embodiments, it may be desirable for a system to ensure that all of the game play results generated are used in the creation of a video presentation (such that operators may not "pick and choose" which game play results to incorporate) or that the aggregate payout for the actual outcomes generated equals the aggregate payout for the representative outcomes comprising a video presentation. For example, the system may authenticate that if one hundred thousand (100,000) game play results have been generated by one or more GDs (e.g., during a period of time, since the inception of the device, etc.), all one hundred thousand (100,000) of such game play results have been incorporated into the production of one or more DVDs. In a more specific example, an electronic record may be kept of all the (uniquely identified) game play results generated by all GDs pursuant to the execution of sessions, as well as all the game play results used to render videos of one or more DVDs (e.g., such that an auditor may check the results of the DVDs against the generated results).

In further embodiments, to help ensure fairness of production of DVDs, an operator of a system producing DVDs and/or video presentations therefore may certify a payback percentage for an aggregate number of DVDs (e.g., DVDs are produced in a manner such that for every one thousand (1,000) DVDs made, the one thousand (1,000) DVDs will on average pay out a certain sum to customers). It should be appreciated that manners of auditing such claims are well known in the art (e.g., much as how a slot machine payback percentage is audited).

In alternate embodiments, a system of the present invention may be configured similar to a system for producing "instant-win" or "scratch-off" lottery tickets, in that for every set of DVDs produced (e.g., every group of five hundred (500)), it may be predetermined that certain DVDs will yield certain final credit meter balances or credit meter balances within a certain range (e.g., in the batch of five hundred (500), there will be one DVD with a final credit meter balance of twelve thousand seven hundred and eighty-three (12,783) credits, four (4) DVDs with final credit meter balance of four hundred and seventy-six (476), and so on). Thus, a final session balance associated with each of a set of DVDs may be determined similarly to a roll of instant-win lottery tickets (e.g., according to a predetermined matrix). As with a roll of instant-win lottery tickets, it may be advantageous to distribute "winning" DVDs in a manner such that a series of DVDs produced and sold in sequence (e.g., DVDs characterized consecutive numeric identification codes) do not result in almost all losses. For example, a common game structure used in instant-win lottery tickets is known as "guaranteed low end prize structure" or GLEPS. In this structure, tickets are provided to the ticket-selling agents in numbered "books," with each book containing a predetermined number of tickets. Each book of GLEPS game tickets contains a predetermined number of low end, or small award, winning tickets. For example, small award winners may include awards up to, and including, ten dollars. In addition, ticket books may also contain additional winning tickets that have larger prize values and are not part of the GLEPS structure. The ticket books are arranged in "pools" and these larger-amount tickets are distributed over the ticket book pools in a truly random manner and are much less numerous than the GLEPS winning tickets. Thus, in some embodiments, DVDs may be produced in a similar manner (e.g., a matrix of final contract/session balances may be associated with a pool of DVDs in a non-random manner, but the final credit/session balances may be distributed to serially identified DVDs within the pool in at least a partially random manner).

Referring now to FIG. 20, illustrated therein is a flowchart of an example process 2000 for creating a DVD. The process 2000 is described with particular reference to the embodiment of the DVD production queue database illustrated in FIG. 13A, FIG. 13B, and FIG. 13C.

In step 2005, an order for a DVD is received. For example, an order from a casino for a plurality of DVDs may be received electronically and/or via paper or other tangible medium. For example, a casino or other customer may transmit session result data for a plurality of sessions, thus ordering a DVD corresponding to each of the sessions. In some embodiments, an order may specify that a plurality of DVDs be created based on session result data for a particular session. In one example, the session result data of an order may be transmitted to the AS 310 of FIG. 3 electronically or be called in by a casino representative. In another example, a document corresponding to one or more of the sessions may be received (i.e., a session object). For example, as described herein, in some embodiments one or more session results tickets, cards, forms, and/or labels may be printed by a GD for a session executed by the GD. In one embodiment, step 2005 may include receiving the session object (or copies thereof) for each session included in the order. In some embodiments, each session may be received as a separate order. A player may provide, indicate, and/or otherwise select, for example, a session object from a display (such as the session object display 232 of FIG. 2), defining (at least partially) the order for the DVD of outcomes (e.g., the session).

In step 2010 a template is determined for the final DVD. As would be understood by one of ordinary skill in the art of producing DVDs, a template for a DVD may include an indication of information to be included in the DVD and may include items that are constant across a batch of DVDs. A template may further include programming commands (pause here, skip to there if this button is pushed, etc.) for manipulating the assets (i.e., content) of the DVD. In some embodiments, the same template may be used for all DVDs of the same game, casino, number of game plays and wager per game play. Thus, there may be a plurality of templates stored in a memory (e.g., a memory of the AS 500 of FIG. 5) and step 2010 may comprise selecting the appropriate template for use, based on the session result information determined in step 2005. A particular template may include, for example, an opening menu design, buttons, graphics, and advertising material. In some embodiments, some of the data in a template may be variable (e.g., a first advertisement may be selected for inclusion in an advertising portion of a first DVD while a second advertisement may be selected for inclusion in an advertising portion of a second DVD).

In step 2015, a record for the DVD of the order is created in a database (e.g., DVD production queue database 1300). A record in the DVD production queue database 1300 may be created based on the receipt of the order. For example, a unique order number may be determined (e.g., the order number may be received as part of the order or assigned to the order upon the order being received) and stored in the newly created record. The customer identifier for the order may also be recorded. A disc identifier may be determined and stored as well. Additional information regarding parameters of the DVD to be created may also be determined from the session result information of the order and stored in the record (e.g., game brand, casino, denomination, wager per game play, payout schedule, number of game plays, starting credit meter balance, end credit meter balance, session identifier). The order submission time (e.g., the time at which the order was received) may also be stored.

In step 2020, the DVD is created via a production process that may comprise one or more steps. The steps may comprise, for example, (i) creating a video presentation to be recorded onto the DVD, (ii) recording the video presentation onto the DVD, (iii) creating a session object and/or packaging the DVD with and/or in such session object, and (iv) readying the DVD for shipment and/or other transportation to the customer who ordered the DVD. Process 2100, described in detail with respect to FIG. 21A and FIG. 21B, is one example process for how a DVD may be created. In some embodiments, as a DVD proceeds through a production process comprising several steps, the appropriate record of the DVD production queue database 1300 is updated upon the completion of each step, to track the progress of the DVD creation.

In step 2025 it is determined that the DVD has been successfully created and the order is marked as ready for shipment. For example, production completed time field 1385 may be updated to reflect the time at which the production process was completed, thus marking the DVD (or record of the DVD) to reflect that the DVD is ready for shipment.

Referring now to FIG. 21A and FIG. 21B, illustrated therein are flowcharts of an exemplary process 2100 for creating a DVD. The process 2100 may, in some embodiments, comprise an example of step 2020 of process 2000.

In step 2105, a set of representative and/or actual outcomes to be included in a video presentation are determined. For example, a process similar to that described with respect to FIG. 17 or a process similar to that described with respect to FIG. 18 may be utilized. In other words, the representative outcomes may be determined based on session result data received or identifiers of the representative outcomes may be received.

In step 2110, at least one media file is determined for each of the outcomes determined in step 2105. Determining a media file may comprise, for example, generating a new media file or retrieving a previously created media file from a media file database or other memory structure.

In some embodiments, step 2110 may further comprise determining (e.g., generating or retrieving) any other appropriate media files. For example, one or more media files comprising a graphic depicting one or more of a meter of number of game plays remaining, a credit meter balance and/or a payout schedule may be determined.

Step 2110 may comprise animating the media files. Animation of the media files may comprise, for example, creating a sequence of frames which, when viewed together in rapid succession, simulate motion. Such a sequence may comprise, for example, creating the frames pixel by pixel, copying the frames from a database, or any method on a continuum between these two processes.

In step 2115, graphics are overlaid onto the media files depicting the outcomes determined in step 2105, as appropriate. For example, a graphic of a credit meter balance or a meter depicting a number of spins remaining may be overlaid onto particular portions of each frame of a media file.

In some embodiments, step 2115 may further comprise determining an order or other layout of the media files. For example, it may be determined which frame or portion of a frame a particular graphic is to be overlaid on. In another example, an order in which the representative outcomes are to be determined (and thus an order in which the media files depicting the representative outcomes are to be output in the video presentation) may be determined.

In step 2120, media preparation (e.g., such as MPEG compression) is performed on the media files. Of course, if the media files are to be stored in a format other than MPEG, another procedure may be performed on the media files to convert them to the appropriate format. For example, another compression algorithm other than MPEG compression may be performed.

In step 2125, an audio track is created for the DVD. In some embodiments (e.g., embodiments in which a media file includes both video and audio data), this step may be unnecessary. For example, the creation of the audio track may be performed synchronously with the determination of the media files or video files. In some embodiments, creating an audio track comprises selecting the appropriate audio media files and assembling them into an appropriate order based on the planned video content for the video presentation.

In step 2130, the assets for the DVD (i.e., content to be included in the DVD, including video and audio content) are combined as specified in a DVD template being used to create the DVD. In some embodiments, process 2100 may include a step of selecting the appropriate DVD template (which step was described with reference to step 2010 of FIG. 20). The assets for the DVD may comprise, for example, the media files and the audio track previously determined. The assets may also include any still pictures, subtitles, or other content to be included on the DVD. For example, the template may say:

Opening Menu
create one button pointing to program point 10
play background music audio Z until button selected
pause
Point 10
play video Y Step 2130 may comprise modifying the template for a specific DVD by inserting particular files into the template. For example, the above template may be modified by inserting “disc123/slotsvideo/video.mpg” for the variable Y, and “disc123/menumusic/music.audio” for variable Z.

In step 2135, a DVD disc image is determined for the DVD. As would be understood by one of ordinary skill in the art of DVD production, a DVD disc image is the logical structure for the DVD or directory structure with the files in the proper LOGICAL location. Typically, a directory structure comprises a top level directory which includes menu files, a video directory and an audio directory. The video directory has a file for each chapter, etc. However, the data on the disc itself may be physically spread out over various physical locations on the disc (a practice referred to as fragmentation). Step 2135 may comprise, for example, copying the media files determined in process 1200 into the correct logical structure.

In step 2140, an ISO (International Standards Organization) image (or bit-by-bit structure) is determined for the DVD, based on the standard being used. As would be understood by one of ordinary skill in the art of DVD production, an ISO image defines the actual layout of the individual bytes of the files. Files may be interlaced (e.g., one hundred (100) bytes of video may be followed by ten (10) bytes of audio so a laser reading the disc can play them together) and consecutive files may be physically consecutive in the ISO disc image (unlike the DVD disc image). It should be noted that step 2135 may be performed by a first program and step 2140 may be performed by a second program, as is true for all steps of processes described herein.

In step 2145, the DVD ISO image is recorded onto the DVD. Recording the ISO image may comprise transferring the information onto a DVD. For example, in one embodiment recording a DVD may comprise stamping the DVD. In another embodiment, recording information onto a DVD or transferring information onto a DVD may comprise burning the information onto the DVD. For example, DVD-R or DVD+R burners may use relatively high-powered lasers to darken inks inside a recordable DVD media to simulate the pits of traditional mass-produced DVDs. Examples of such technologies are readily available, such as DVD recorders from Plextor™ or Panasonic™. In some of these embodiments, the DVD recording device may have multiple recording devices and a robotic mechanism for disc movement into and out of the drives. Examples of this technology include Rimage’s Protoge Plus™, or Microtech’s™ product lines In step 2150 a label is printed for the DVD. This may involve, for example, determining a graphics image and printing it onto the label or DVD itself. The label may further include unique information such as a unique disc identifier or the session identifier. In some embodiments, the label may include an indication of the game and/or casino represented in the video presentation of the DVD. The label (and/or other printing conducted at 2150) may, for example, comprise printing and/or creating a session object and/or printing or creating an indicia to be coupled to a session object. A label may be printed and adhered to a packaging object, for example, and/or indicia may be engraved, printed, and/or stamped on a medium comprising and/or defining a session object.

In step 2150 the DVD is inserted into (and/or otherwise coupled to) packaging. The DVD may, for example, be coupled to and/or housed within a packaging medium comprising a session object. The DVD may be packaged such that tampering with the DVD (e.g., unauthorized opening of the DVD) is visible or otherwise easily discernable. Further, the DVD may be packaged in anti-tampering material. Step 2150 or another step of process 2100 may further include storing an indication (e.g., in a DVD production queue database) that the DVD has been completed and is ready for shipment. The time and/or date on which the production of the DVD was completed may also be stored. The DVD may then be transported to an appropriate destination (e.g., shipped along with many other DVDs created in a similar manner to a casino that ordered the DVDs).

Figure 22:
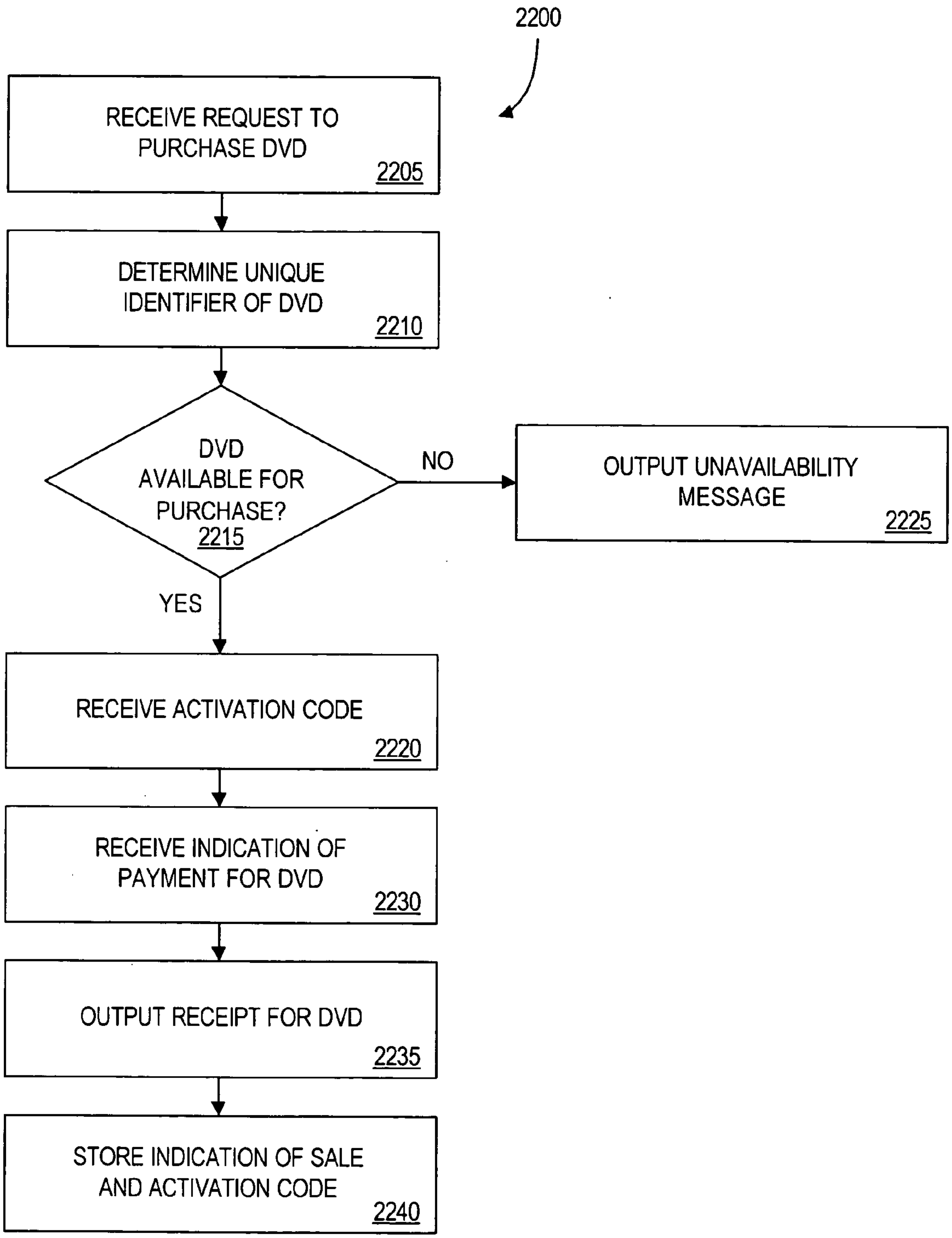
FIG. 22 is a flowchart of an exemplary process for storing an indication of a sale of a DVD, in accordance with some embodiments.

Referring now to FIG. 22, illustrated therein is a process 2200 for facilitating the purchase of a DVD or a session in another remotely viewable form. The process 2200 may be performed, for example, by the POS 320 of FIG. 3.

In step 2205, a request to purchase a DVD is received. For example, in one embodiment a player may select, from a display (such as the session object display 232 of FIG. 2), a session object indicative of a DVD (and/or the DVD itself that has recorded thereon a video presentation based on outcomes previously generated by a GD. Alternatively, the player may request that the casino attendant provide a DVD from behind a casino counter (e.g., by indicating one or more session parameters and/or by indicating, selecting, and/or presenting a session object indicative of such parameters). The player may also request to purchase the selected DVD. Step 2205 may comprise, for example, receiving from a casino attendant into a POS (such as the POS 320 of FIG. 3) an indication that a new transaction for the purchase of such a DVD is to be initiated. According to some embodiments, this may be accomplished by the casino attendant accepting a session object presented and/or selected by the player and reading indicia from the session object. A barcode and/or other machine-readable and/or human readable indicia on the session object may be scanned and/or read, for example, to indicate that a purchase of a particular DVD and/or type of DVD is to be initiated.

In another embodiment, step 2205 may comprise receiving a request that a DVD be generated on behalf of the player (e.g., an on-demand DVD request). In this latter embodiment, the request may include an indication of parameters (and values thereof) defining a session based on which a video presentation is to be created and recorded onto the DVD. For example, a player may specify a game, wager amount per game play, number of game plays, and price for the session and resultant DVD. In some embodiments, as described herein, such session parameters and/or indications thereof may be defined by the player’s selection and/or indication of a session object. Such parameters may, of course, also or alternatively be defined verbally, via menu-based indications, and/or in any other manner that is or becomes known or practicable.

In step 2210, a unique identifier of the DVD is determined. For example, a unique disc identifier on a session object such as the packaging of a DVD (or, in some embodiments, on the DVD itself) may be entered via a bar code scanner or keyboard. In embodiments in which the request for the DVD comprises a request that a DVD be generated on behalf of a player, step 2210 may comprise determining or assigning a unique identifier for the DVD to be created. For example, a unique DVD identifier may be generated based on a program or algorithm or a previously generated but as yet unassigned DVD identifier may be retrieved from a database of available DVD identifiers. In one embodiment, step 2210 may comprise determining a session identifier of a session associated with the DVD previously created or the DVD to be created.

In step 2215, it is determined whether the DVD is available for purchase. For example, a database such as database 1000 of FIG. 10 may be accessed and it may be determined whether the status of the DVD is set to “available" or other information associated with the DVD may be retrieved, based on the unique identifier received in step 2215, that allows a determination of whether the DVD is available for purchase. In one embodiment, the POS 320 of FIG. 3 accesses such information and determines the availability of the DVD for purchase. In other embodiments, the POS 320 transmits an indication of the unique identifier to another device (e.g., the CS 305 of FIG. 3), which determines the availability of the DVD for purchase and transmits an indication of the availability to the POS 320. In embodiments in which the request to purchase a DVD is a request for a DVD to be created, step 2215 may comprise determining whether a session as defined in the request of step 2205 may be created (e.g., whether the requested combination of parameters and values thereof are approved or approvable).

If the DVD is not available for purchase, a message indicating the unavailability of the DVD for purchase is output in step 2225. For example, such a message may be output to a casino attendant (who may communicate the message to the player requesting to purchase the DVD) and/or directly to the player requesting to purchase the DVD. Otherwise, the process 2200 continues to step 2220. In embodiments where a session object is selected and/or indicated by a player, the presence and/or availability of the session object may be an indication of the availability of the DVD. Session objects corresponding to one or more DVDs may not be created, displayed, and/or otherwise made available unless, for example, the DVDs and/or outcomes of corresponding sessions are available as well.

In step 2220, an activation code is received. The activation code may comprise, for example, a code provided to a player upon a legitimate purchase of a DVD, to be used by the player as subsequent proof of the purchase and/or to activate a video presentation recorded on the DVD. In some embodiments, the activation code may simply comprise a unique transaction identifier generated or otherwise determined by the POS 320. In other embodiments, an activation code may be distinct from a transaction identifier. In some embodiments, a unique activation code may be generated at the time of a purchase of a DVD (e.g., using an algorithm created for this purpose). In other embodiments, an activation code may be selected from a list of previously generated and available activation codes. In some embodiments, an activation code may be encrypted. In some embodiments, the activation code associated with the DVD at the time of purchase of the DVD may be stored in a record of a database associated with the DVD (e.g., in association with the disc identifier and/or other unique identifier already associated with the DVD).

It should be noted that, in some embodiments, an activation code may be determined and associated with a particular DVD during the manufacturing process.

In step 2230, an indication of payment for the DVD is received. For example, an operator of the POS 320 may indicate an amount and form of payment received for the DVD, as is known in the art of POS operations. In some embodiments, step 2230 may comprise first retrieving the price of the DVD (e.g., from a database, such as database 1000, or by scanning or otherwise determining a price indicated on the DVD or packaging thereof).

In step 2235, a receipt for the DVD is output. An example of such a receipt is illustrated in FIG. 27 (described in detail below). For example, the POS 320 may cause a receipt to be printed. In some embodiments, the receipt for the DVD may be e-mailed to the player or provided to the player in another electronic form. In some embodiments, the activation code may be included on the receipt. A copy of the receipt may be retained by the casino or other entity selling the DVD to the player.

In step 2240, an indication of the sale of the DVD is stored, along with the activation code. For example, a database such as database 1000 of FIG. 10 may be accessed and the current date and time may be stored in the date sold field. The activation code now associated with the DVD may also be stored in the record of such a database. The status of the DVD may be set to "purchased" or another similar status.

Figure 23:
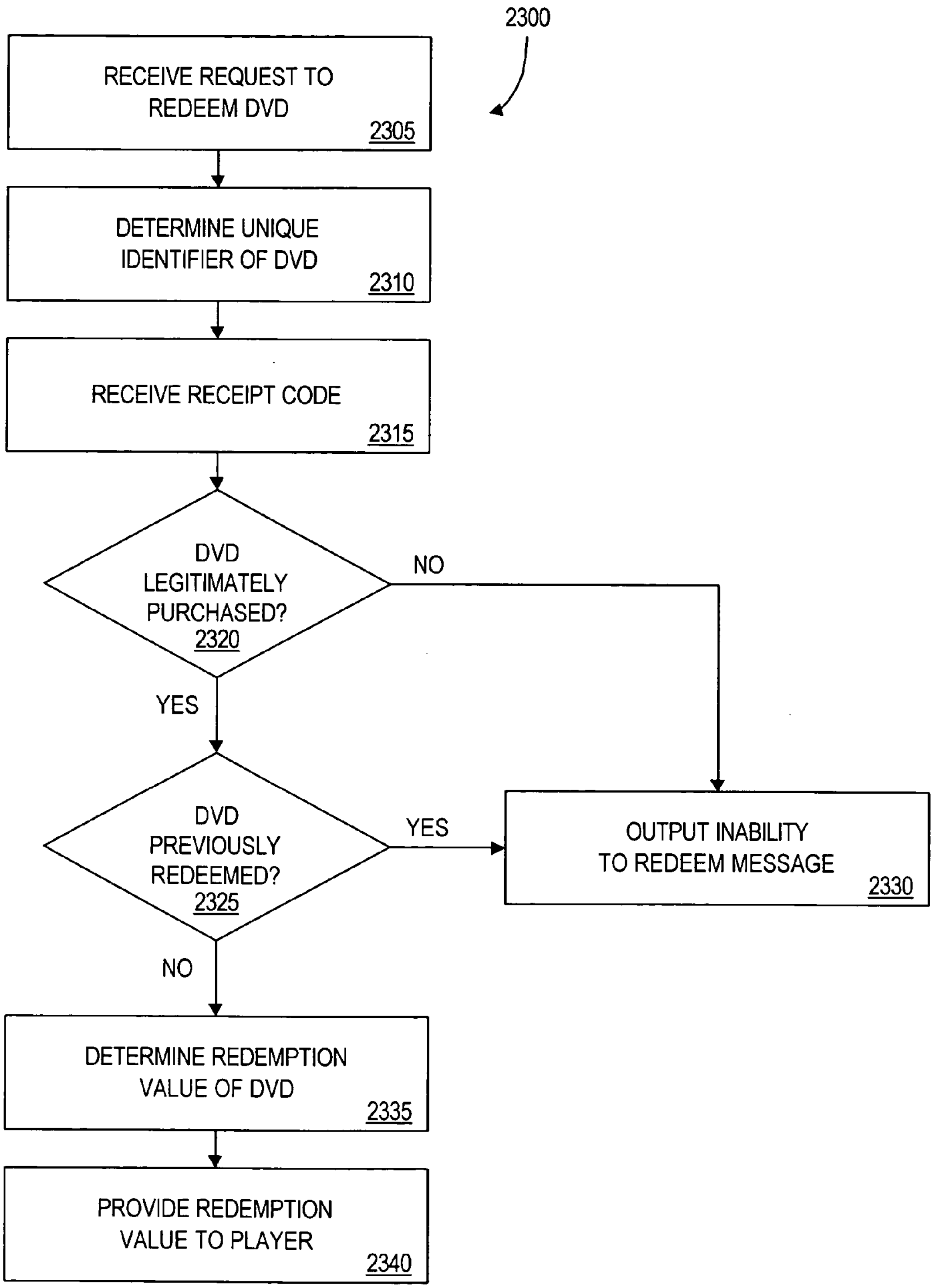
FIG. 23 is a flowchart of an exemplary process for providing a payment corresponding to a DVD redemption value, in accordance with some embodiments.

Referring now to FIG. 23, illustrated therein is a flowchart of an example process 2300 for redeeming a DVD. The process 2300 may be performed, for example, at a POS (such as the POS 320 of FIG. 3).

In one embodiment, a player who purchases a DVD may return to the casino at which the DVD was purchased. By presenting any or all of a (i) a disc identifier (e.g., as indicated by the disc and/or a session object associated therewith), (ii) an activation code, (iii) a purchase receipt (e.g., as shown in FIG. 27), and/or (iv) a valid photo identification, the player may be able to redeem the DVD for the redemption value of the DVD (typically the end credit meter balance of the session on which the DVD video presentation was based). The player may, for example, collect a redemption value of a DVD from one or more of (i) a casino attendant operating a computer device (e.g., the POS 320 and/or the CPD 325 of FIG. 3), (ii) a kiosk operable to facilitate the redemption of DVDs (e.g., by receiving a session identifier and/or other relevant information via an input device, accessing a database, and determining a final session balance or redemption value associated with the DVD) (iii) a GD, and (iv) another device. A redemption value may be provided to a player, for example, in the form of cash, voucher, gaming credit, or any other form. In some embodiments, players may be given an incentive to return to a casino to redeem DVDs (e.g., casinos may recognize that drawing customers back to their property may lead to increased gambling activity and thus increased revenues). For example, if a player is due a final session balance of sixty-three dollars and twenty-five cents ($63.25), the player may be offered an amount more than the final session balance (e.g., an additional ten dollars ($10)) to redeem the DVD at the casino (e.g., rather than having a check for the redemption value of the DVD mailed to the player).

In some embodiments, a player may return to a casino and present a purchase receipt (the receipt having been provided at the time the contract was purchased) indicating a gaming contract. Such a receipt may indicate a gaming contract by identifying a gaming contract (e.g., the receipt comprises a contract identifier) and/or game video disc (e.g., DVD), which may be associated with a gaming contract. In an example shown by FIG. 27, a "disc activation number" may be indicated, the disc activation number uniquely identifying the video disc and/or associated gaming contract (e.g., the disc activation code may further be used in an activation process described further herein). Further, in one or more embodiments, such a receipt may comprise a barcode encoding one or more identifiers. In this manner, a representative may scan the barcode to determine (i) whether or not the player is due a final contract balance, and if so (ii) what the final contract balance is. Further, such a receipt may comprise a validation code determined during an activation process described further herein. In one embodiment wherein players are provided with DVDs, DVDs or the packaging thereof may be imprinted or otherwise marked with one or more barcodes and/or numeric or alphanumeric identifiers.

In one embodiment, a player may redeem a DVD without returning to the casino at which the DVD was purchased. For example, a player may contact a casino after viewing a video presentation (e.g., via postal mail, phone, fax, e-mail, a form of a casino Web page, etc.) and indicate a session identifier, disc identifier, activation code and/or some other information (e.g., a home phone number and/or player identification number) by which a casino may determine a final session balance or other redemption value due to the player. In one embodiment, the player may be given an opportunity to specify whether the player prefers to be mailed a check, to have funds transferred in some electronic manner (e.g., funds are transferred electronically to a player's financial account) or to have the redemption value provided to the player in some other manner.

In some embodiments, a player may not contact a casino after purchasing a session. In one such embodiment, if a player is owed a final session balance based on the purchased session, the casino may wait a predetermined period of time after the purchase of the DVD associated with the session. If this period of time (e.g., thirty (30) days) elapses and no contact is received from the player (e.g., the player does not return to the casino to redeem the DVD), the casino may automatically issue any funds owed to the player (e.g., by mailing a check to a provided address or storing the funds in a financial account associated with the player).

In some embodiments, although a redemption value greater than zero may correspond to a session purchased or provided to a player and a price may be associated with the session, the player may have not yet paid the price at the time he requests the redemption value. Accordingly, in some embodiments, the price of the session may be deducted from the redemption value. If the redemption value is greater than the price, the player may be paid the difference. If however, the redemption value is less than the price, the player may be paid nothing.

In some embodiments, a session may end with a negative balance (e.g., at the end of the session, the sum of wagers deducted from a starting credit meter balance exceeds a sum of payouts added to the starting credit meter balance). In some embodiments, such negative balances may be treated similarly to a balance of zero credits; in other words, the redemption value of the session may be zero.

It should be noted that, in various embodiments, a player may have an opportunity to redeem a DVD without having watched the video presentation recorded on the DVD in its entirety (or at all). For example, a player may purchase a DVD containing a video presentation, but may not have a chance to watch the video presentation before his next trip to the casino. In some embodiments, such a player may be allowed to redeem the DVD irrespective of the failure to watch the video presentation. However, in other embodiments, a player may not be allowed to redeem a DVD unless the player provides a special code output upon (e.g., during) the conclusion of a video presentation recorded on the DVD (e.g., an alphanumeric code or password is displayed during or after a final game play result is depicted).

Referring again to FIG. 23, in step 2305 a request to redeem a DVD is received. For example, a player may approach a POS and provide the DVD to be redeemed (and/or the packaging and/or receipt or other documentation thereof; e.g., a session object corresponding to the DVD) and request the redemption value of the DVD to be provided to the player. In another example, a player may contact a casino or other entity that facilitates the redemption of purchased DVDs in another manner (e.g., via telephone, e-mail, the Internet, postal mail, etc.) to request the redemption of a DVD.

In step 2310, a unique identifier of the DVD is determined (e.g., based on information provided in the request to redeem the DVD). For example, a disc identifier located on packaging of the DVD may be scanned in or typed in by a casino attendant (in such embodiments a player may be required to provide the DVD, or at least the packaging thereof, when redeeming the DVD).

In step 2315, a receipt code is received. For example, an activation code printed on the receipt (and/or on a session object) may be received. In another example, a unique receipt identifier uniquely identifying the receipt and/or transaction in which the receipt was issued is received. For example, a casino attendant may scan or type in the code. That is, in some embodiments a player may be required to provide a receipt (or copy thereof) for the purchase of a DVD when requesting to redeem the DVD. In some embodiments in which the code received in step 2315 is an activation code, the activation code for a DVD may have been provided to a player in a manner other than being printed on a receipt (e.g., it may have been provided to a player via e-mail, via another printed document, verbally, etc.). Accordingly, in some embodiments in which an activation code is required to redeem a DVD, step 2315 may comprise receiving the activation code in any manner desired and practicable and not necessarily via a receipt (in which case a receipt may or may not be required to redeem the DVD).

In step 2320, it is determined whether the DVD has been legitimately purchased. For example, a database or other memory structure storing information about DVDs previously purchased may be accessed. For example, the database 1000 of FIG. 10 may be accessed and it may be verified that the disc identifier and activation code correspond to one another in the database and, further, that the status of the DVD corresponding to the disc identifier is currently "purchased." In one embodiment, a POS or another device performing the redemption process (e.g., a kiosk of a casino) may communicate with a device storing such information (e.g., the CS 305 of FIG. 3). In one embodiment, the POS 320 of FIG. 3 and/or other device performing the redemption process may be operable to determine whether the DVD was legitimately purchased by accessing such a database and verifying the information received in steps 1305-1315. In another embodiment, the POS 320 or other device performing the redemption process may forward the information received in steps 1305-1320 to another device (e.g., the CS 305 of FIG. 3) storing information useful in verifying the legitimate purchase of the DVD and determine that the DVD was legitimately purchased upon receiving an authorization message or indication from this other device.

If it is determined that the DVD was not legitimately purchased, a message indicating an inability to redeem the DVD is output in step 2330. For example, a message indicating that the system is "unable to confirm previous purchase" may be output (e.g., to a payer attempting to redeem the DVD and/or to a casino attendant facilitating the redemption process, who in turn may communicate this information to the player) and the redemption of the DVD may be denied. Otherwise, the process 2300 continues to step 2325. In some embodiments, however, such as in the case that the DVD may have been provided to the player free of charge (at least free of initial and/or upfront charge or payment), step 2320 may not be necessary and/or may be modified as appropriate. Since no actual "purchase" of such a DVD may have occurred, for example, the step 2320 may alternatively not be performed or be performed to determined if the same player that the DVD was given to is attempting to redeem it. In the case that promotional and/or "free" DVDs are freely transferable, the step 2320 may only be required to verify the legitimacy of the DVD itself, regardless of previous "purchase" and/or other historical and/or associated activity.

In step 2325, it is determined whether the DVD has previously been redeemed. This step may be performed to prevent "double dipping" or at attempt by a payer to redeem a DVD more than once. For example, an appropriate database may be accessed (e.g., such as the database 1000 depicted in FIG. 10) to determine whether the status of the subject DVD is set to "redeemed" or to another status indicating that the DVD has previously been redeemed (or if a previous successful redemption of the DVD is otherwise stored in a memory). In one embodiment, a POS or another device performing the redemption process (e.g., a kiosk of a casino) may communicate with a device storing such information (e.g., the CS 305 of FIG. 3). In one embodiment, the POS 320 of FIG. 3 and/or other device performing the redemption process may be operable to determine whether the DVD has previously been redeemed by accessing an appropriate database and confirming whether information stored in the database indicates that the DVD has previously been redeemed. In another embodiment, the POS 320 or other device performing the redemption process may forward the information received in steps 1305-1320 to another device (e.g., the CS 305) storing information useful in determining whether a DVD has previously been redeemed and determine that the DVD has not previously been redeemed upon receiving an authorization message or indication from this other device. In some embodiments, the determinations of steps 2320 and 2325 may be performed in a single step and/or by a single device.

If it is determined that the DVD has already been redeemed, a message indicating an inability to redeem the DVD is output in step 2330. For example, a message indicating "previously redeemed" or another appropriate indication may be output (e.g., to a payer attempting to redeem the DVD and/or to a casino attendant facilitating the redemption process, who in turn may communicate this information to the player) and the redemption may be denied. Otherwise, the process 2300 continues to step 2335.

In step 2335, the redemption value of the DVD is determined. For example, a record of a database associated with the DVD may be accessed and the redemption value may be read from the database. In some embodiments, the redemption value may be encoded on the DVD itself and/or packaging (e.g., a session object) thereof and may be read there from (e.g., in addition to or in lieu of accessing a database storing such information). In some embodiments, as described herein the redemption value may be determined in various ways. In the case that the DVD was sold for a purchase price to the player, for example, the redemption value may simply be equivalent to the ending credit meter balance of the plurality of outcomes of the DVD session (or sessions). In the case that the DVD was provided free of upfront charge, however, the redemption value may comprise the difference between the ending credit meter balance and a fee (such as a redemption and/or post-acquisition purchase fee).

In step 2340, the redemption value is provided to a player. As described, a redemption value may be provided to a player in many different forms and in a variety of different manners. For example, cash may be handed to the player by a casino attendant or dispensed from a kiosk. In another example, a cashless gaming receipt that may be redeemed at a casino booth or be used for wagering at a GD may be provided, the value of the receipt being based on the redemption value. In yet another example, a check may be mailed to a player. In another example, an electronic and/or financial account associated with the player may be credited based on the redemption value. In some embodiments, a redemption value may correspond to a physical prize to be provided to the player (e.g., a coupon, piece of jewelry, discount booklet, gift certificate or other tangible item). In such embodiments, step 2340 may comprise authorizing a casino attendant to provide the prize to the player. Step 2340 may further comprise storing an indication of the successful redemption of the DVD in a memory (e.g., a status field of the database 1000 of FIG. 10 may be set to "redeemed"), to prevent the player from redeeming the DVD a second time. Alternatively, such a step of storing an indication of the successful redemption of a DVD may be a distinct step of process 2300.

V. Additional Description of Some Embodiments

It should be noted that a player and/or casino agent may input and/or define parameters (and values thereof) desired for a session via many and/or various means (e.g., as alternatives to using one or more of the GD 315, the POS 320, and/or the CPD 325 of FIG. 3). For example, a kiosk, set top box of hotel room TV, a Web page interface, a handheld casino device, a cellular telephone or landline telephone may be used to input such information. Further, any and all such means may be used by a player to input payment for a session or DVD. For example, a player selecting a DVD from a display in his hotel room may use a set top box of the TV in his room to enter a financial account identifier to provide payment for the DVD. In another embodiment, the price of the DVD may automatically be charged to the player's hotel room bill upon it being determined (e.g., during a cleaning of his room) that the DVD as been taken from the display.

In some embodiments in which outcomes are generated at a GD by a casino attendant (e.g., on behalf of a particular player), players may not be present to view the generation of outcomes at the GD. Accordingly, substantially lavish graphical presentations (or, for example, the spinning of mechanical reels) that typically accompany the generation of outcomes may not be necessary. In fact, in some embodiments, without a need to entertain players at the time the outcomes are generated, graphic presentations or accompanying mechanical reel spins may either be (i) expedited considerably (e.g., a video display screen outputs one thousand (1,000) consecutive animations of spinning reels in the course of a few minutes), (ii) presented in an alternate fashion (e.g., a display screen simultaneously depicts one thousand (1,000) symbol arrays), and/or (iii) abandoned altogether (e.g., outcomes are generated and stored or output as described elsewhere herein, but not presented in a conventional visual fashion).

Accordingly, a GD consistent with one or more embodiments may comprise a special "session outcome generation" mode accessible only by authorized persons (e.g., by casino attendants, and not by players). In such a session outcome generation mode, a GD may be capable of rapidly generating outcomes pursuant to a session characterized by certain parameters. For example, upon receiving instructions defining one or more parameters (and values thereof) of a session from a casino attendant, a GD may use a random number generator to rapidly generate a plurality of random numbers, which may correlate to outcomes as specified by a probability database, an exemplary tabular representation of which is depicted by FIG. 15. It should be appreciated that other methods of generating outcomes are known in the art and need not be detailed further herein.

As stated, in some embodiments, such a mode of operation may only be made available to authorized persons. Thus, in some embodiments, a process of authorizing a GD to enter a session outcome generation mode (e.g., as performed by the GD 315 or the CS 305 of FIG. 3) may comprise granting access to such a mode of operation.

Access to such a mode of operation may be granted in a variety of manners. For example, in one or more embodiments, a GD may be configured to receive an access code from a casino attendant.

For example, a casino attendant may actuate an input device of a GD (e.g., by pressing a button or an icon of a touch-sensitive display screen) requesting to access such a mode of operation. Upon receiving such an input, a GD or other device in communication with the GD (e.g., the CS 305 of FIG. 3) may be configured to output a request to receive an access code or to cause such a request to be output to the player. The casino attendant may then use an input device to enter an access code. For example, the casino attendant may enter a numeric or alphanumeric code via a keypad or touch-sensitive display screen. The casino attendant may have received such a code when receiving an instruction to execute the session at the GD (e.g., the access code may be provided to the casino attendant via a CPD, along with an instruction to execute the session). In some embodiments, an access code may be provided to one or more casino attendant for use in executing sessions on GDs and may not be unique to a particular session. In some embodiments, an access code may be unique to a GD while in other embodiments it may not be. An access code may be determined or generated, for example, by the CS 305.

In some embodiments, a process for authorizing a GD to enter a session outcome generation mode may comprise determining whether a received access code is valid. For example, in one or more embodiments, a database (not shown) maintained by a GD or other device in communication therewith (e.g., the CS 305 of FIG. 3) may contain a list of valid access codes, such that when an access code is received, it may be compared to the list to determine whether or not it is valid. In some embodiments, access codes may expire (e.g., upon one use, so as to prevent repeated fraudulent access), and accordingly, a device (e.g., a GD 315 of FIG. 3) may be configured to write to such a database (e.g., so as to eliminate a record of an access code, such that it may not be considered valid if received thereafter or to update a status of an access code to reflect its use and/or expiration).

Of course, various other methods of determining whether a user should be granted access to such a mode of operation are contemplated. For example, in one embodiment, a casino attendant desiring to access such a session outcome generation mode may simply insert or otherwise provide a card or identifier (e.g., in the form of a plastic magnetic stripe-based card similar to a player tracking card, a smart card, etc.). Upon receiving the card or identifier, a device (e.g., GD) may determine whether or not access should be granted to the session outcome generation mode. For example, a card reader device may read a magnetic stripe to determine whether a valid access code is encoded thereon. In another example, a reader device may access a memory of a smart card to determine whether a valid code is stored in memory thereon.

In other embodiments, authorized users may be granted access to such a session outcome generation mode via biometric means. For example, in some embodiments, a GD may comprise iris or retinal scanning means, voice detection means, and so on.

In still further embodiments, a GD may electronically receive a signal indicating that a session outcome generation mode is to be entered. For example, a server device (e.g., the CS 305 of FIG. 3) may transmit an instruction or signal to a GD 315 instructing that a session is to be executed. Such an instruction may include an indication of the parameters of the session (and values thereof). In another embodiment, such an instruction or signal may originate from a CPD (such as the CPD 325 of FIG. 3) or other computing device. For example, a casino attendant stationed at a location within a casino receives a request from a player to execute a session on his behalf, and the casino attendant uses a CPD or other computing device to transmit an instruction or signal that instructs the GD to execute the session. It should be noted that, in some embodiments wherein such electronic instructions or signals requesting the execution of a session are received, an accompanying access code or other means of authentication or verification may or may not be required.

Figure 25:
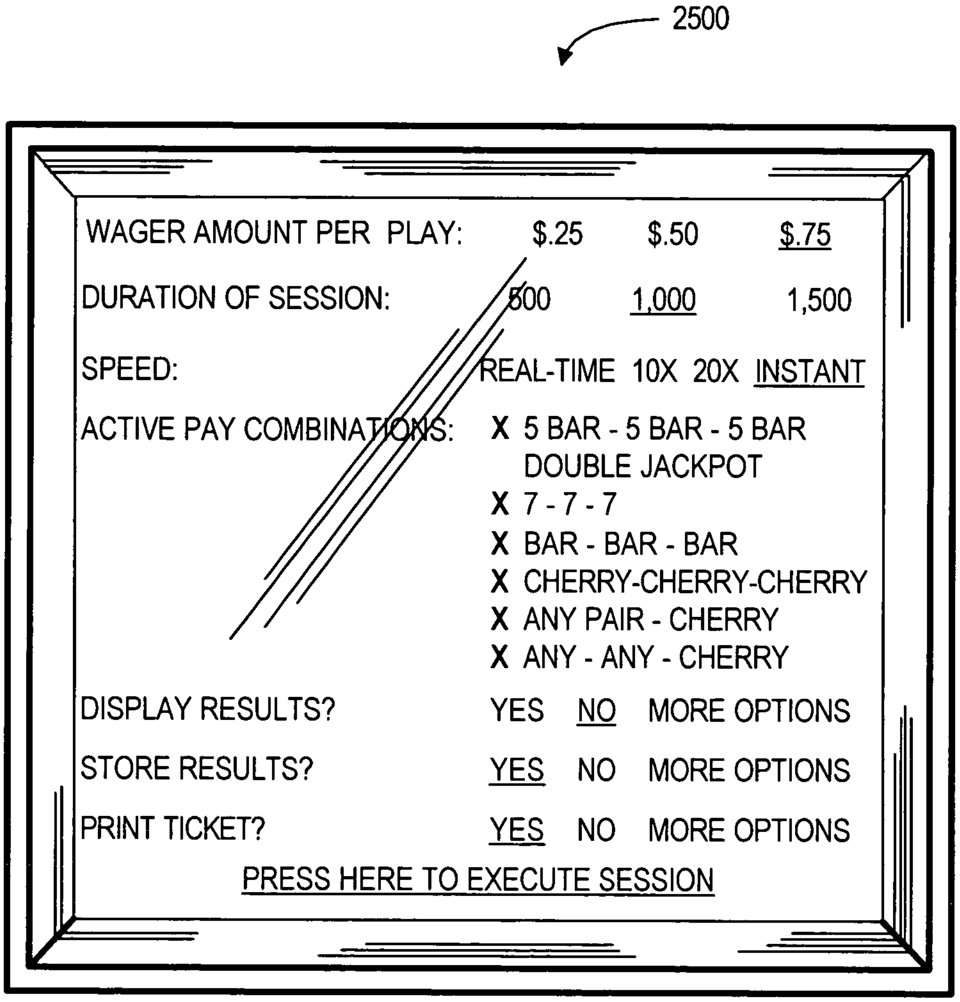
FIG. 25 is an example screen of information that may be output in accordance with some embodiments.

In some embodiments wherein a session may be executed by a casino attendant or other authorized user interfacing with a GD, a program stored within a GD may, upon receiving a valid request to access a session outcome generation mode, cause various component devices (e.g., output devices) to reconfigure, such that an authorized user may facilitate the execution of the session. For example, upon entering a session outcome generation mode, a display device (e.g., a touch-sensitive display screen) may be configured to output a menu screen (e.g., via a Graphical User Interface (GUI)) offering selectable options that would facilitate a user (e.g., a casino attendant) executing a session (e.g., on behalf of a particular player). FIG. 25 depicts an example illustration of such a menu screen.

Such selectable options may in essence allow a user to configure parameters associated with a session (i.e., to input values for each relevant parameter). For example, after entering a valid access code, a casino attendant may be presented with the menu screen and begin to configure various parameters of a session before having the GD execute the session, using a menu interface depicted by FIG. 25.

In some embodiments, a physical, non-electronic record of desired session parameters may be received from a player purchasing a session. For example, a player may have filled out a session object comprising a paper form, selecting (e.g., marking with a writing instrument) various session parameter values (e.g., wager amount per game play, number of game plays, etc.). In another example, a casino attendant operating a computing device (e.g., the CPD 325 of FIG. 3) may issue a printed record of session parameters. In either case, a casino attendant may use such a physical record of session parameters for the purposes of entering desired session parameter values when configuring a GD for executing a session.

For example, when instructed to execute a particular session (e.g., identified by a unique session identifier), a casino attendant may be provided with such a physical form indicating associated parameters and values thereof. The casino attendant may then locate (e.g., using GD database 800) the one or more GDs on which the session is to be executed. In some embodiments, the one or more GDs may be identified by the player purchasing the session (e.g., the player may have specified a particular GD, a type of GD, a characteristic of a GD, etc.). After locating the GD and accessing a session outcome generation mode, the casino attendant may read from the paper form (and/or other session object), and enter session parameter values using a menu interface. In some embodiments, one or more of the parameters may be pre-defined. The player and/or user may, for example, simply select a session object that defines values for some or all session parameters, the pre-defined values then being utilized to determine and/or execute the session.

Figure 24:
FIG. 24 depicts several examples of a ticket that may be output in accordance with some embodiments.

Referring now to FIG. 24, illustrated therein are three (3) distinct examples 2405, 2410 and 2415, of tickets that may be printed by a GD and/or other device, each ticket 2405, 2410, 2415 having an indication of a result of a session printed thereon. A ticket such as one of the three (3) depicted in FIG. 24 may be printed, for example, for auditing purposes, placed in a DVD jewel case (i.e., a session object comprising a packaging medium) for a player to use to redeem a payment associated with the DVD, and/or used to provide an indication to a device (e.g., the AS 310 of FIG. 3) of one or more outcomes of a session, the latter for purposes of creating a video representation of the outcomes for recording onto a DVD. Such tickets are referred to as "session results tickets" herein, as they typically store an indication of one or more results (e.g., payouts, sum of payouts) of a session.

Of course, a session results ticket may store an indication of other information associated with a session as well, such as an indication of one or more parameters defining a session and/or values thereof. Examples of such other information include, without limitation, (i) an end credit meter balance of the session; (ii) a price of the session; (iii) a beginning credit meter balance for the session; (iv) a number of outcomes generated for the session; (iv) a player associated with the session; (v) a casino attendant associated with the session; (vi) a time and/or date at which the session was initiated and/or completed; (vii) a gaming device at which the session was conducted; (viii) a game for which the outcomes of the session were generated; (ix) a casino at which the ticket was generated and/or is redeemable; and (x) a unique session identifier associated with the ticket.

In one embodiment of a session results ticket, that is printed for a three-reel slot machine game, each outcome of a three-reel slot machine game, as well as a corresponding payout information, appears as text. Such a ticket is illustrated as ticket 2415 in FIG. 24. Using conventional TITO tickets (measuring 2.5"×6"; or approximately 6.35 cm×15.24 cm) and TITO ticket printing technology, text regarding a substantial number of outcomes may be printed on a ticket in this manner. Several of such tickets may be used as necessary (e.g., a program stored within the memory of a GD instructs a printer device to print twenty (20) tickets, each with fifty (50) game results of a one thousand (1,000) spin session). Exemplary paper tickets suitable for use according to such embodiments are sold by Slot-Tickets.com™ of Memphis, Term. Of course, other methods of printing an indication of outcomes of a session are contemplated. For example, rather than print an indication of a limited number of outcomes on a small, conventional ticket, a GD may comprise a roll of receipt paper similar to those known and used in common retail systems, such that an indication of a substantially large number of outcomes may be printed on one contiguous piece of paper (e.g., which may be torn off by a casino attendant or other authorized person after printing is complete). Such printing may occur at any time during or after the execution of a session. A printed record of a result of a session may not only be desired by players (who may view the record at a later time), but also may be filed or stored by a casino or other entity for auditing purposes (e.g., regulations may require that such printed records exist).

In some embodiments, an authorized person (e.g., casino employee) may specify that a GD print a conventional "cashout ticket" indicating a balance of credits and/or currency at the conclusion of the execution of a session.

In one or more embodiments, an indication of a result of a session may be printed in an encoded or encrypted form or a form that is readable by a device but not easily discernable by a person. For example, a high-density barcode (e.g., see "video ticket") may encode a result of a session. Such encoded data may then be used to render a video presentation of outcomes, which may be viewed remotely by a player who has purchased a DVD on which outcomes representative of the result of the session are recorded. For example, text, numerals or other symbols or indicia stored within a session database (e.g., a series of outcome identifiers) may be encoded such that they are represented graphically by a barcode such as a high-density barcode.

In some embodiments, various parameters or settings of a GD and/or session may be set to "default" (e.g., a GD automatically prints a cashout ticket, video ticket and game result ticket upon the conclusion of an executed session). In some embodiments, an authorized person (e.g., a casino employee executing the session or causing the GD to execute the session) may alter one or more of these parameters from the default sessions. In other embodiments, such an authorized person may not be authorized to alter certain settings.

In some embodiments, an entity (e.g., an operator of a the AS 310 of FIG. 3) may determine session result data from a session results ticket. For example, if the session results ticket includes an indication of a session result encoded in barcode form, the session result may be determined by scanning a barcode of a session result ticket (e.g., such as the bar code of example session results ticket 2510. Such a barcode may encode, for example, a session identifier, a series of outcome identifiers and one or more associated GD identifiers.

In one embodiment, a device (e.g., the AS 310) may comprise software to create a video representation of outcomes for recording onto a DVD based on session result data, such as may be determined from a session results ticket. For example, the AS 310 of FIG. 3 may receive session result data associated with a session in a manner such that the AS 310 need not communicate via an electronic network with a casino for purposes of obtaining such session result data, but may rather be operable to receive session result data via session result tickets. The AS 310 may be further operable to assemble video representations of outcomes based on such tickets and supply such video representations (e.g., in the form of DVDs on which such video representations are recorded) to players and/or casinos for subsequent sale to players.

Referring now to FIG. 25, illustrated therein is an example menu 2500 that may be presented to a person (e.g., a player and/or casino attendant) for entering and/or selecting or choosing values of parameters to define a session. Such a menu may be utilized, for example, by a player who desires to order a DVD of outcomes. A player may define a session of outcomes to be generated via such a menu. In another example, such a menu may be utilized by a casino attendant who is directing a gaming device to generate a plurality of outcomes for a session (either on behalf of a particular player or prior to any player ordering or purchasing such a session). The menu 2500 may be displayed, for example, via a GD, kiosk, CPD, or other device.

As illustrated, in some embodiments a variety of parameters may be configured to define a session. For example, a wager amount per game play (actual or average) may be selected or indicated. In another example, a duration of the session (e.g., in terms of number of game plays, time, or ending event) may be selected or indicated. In yet another example, a speed with which outcomes are to be generated, played back and/or represented may be selected. In yet another example, a number of payout combinations or particular payout combinations to be active for the session may be selected or indicated. In yet another example, an option for displaying the generated outcomes may be selected (e.g., such an option may only be available if the session is being defined by a casino attendant but not if it is being defined by a player, as this would spoil the player's enjoyment of subsequently viewing the outcomes via a DVD). In yet another example, an option for storing the results may be selected (such an option may, in some embodiments, include several options for how (e.g., on what medium, on what device, as each is generated vs. once all are generated, etc.) the outcomes are to be stored. In yet another example, an option for printing a ticket or receipt indicative of the result of the session (e.g., a session results ticket) may be selected. Of course, other types of parameters may be presented and defined (e.g., a GD or type of GD on which the session is to be executed, a game for which the outcomes are to be generated, a time at which the session is to be executed, a strategy to be employed in making decisions during game play, etc.).

Once a session is defined via the menu 2500, the person defining the session may indicate a confirmation that the session is to be executed and/or identified or otherwise determined. Such a confirmation may, in some embodiments, cause a GD to immediately or substantially immediately execute the session in accordance with the parameter values indicated via the menu 2500 and/or locate a pre-recorded DVD and/or otherwise identify pre-executed sessions. In other embodiments, such a confirmation may cause the session to be scheduled or entered into a queue, for subsequent execution by a GD (e.g., upon an availability of an appropriate GD).

It should be understood that in some embodiments a value for a particular parameter (e.g., number of game plays defining a session) may be selected from a menu of pre-defined choices while in other embodiments a value may be entered without selecting from pre-defined choices (e.g., person can select any number of game plays or any number within a pre-defined range of numbers).

For example, turning again to FIG. 25, the casino attendant may select a wager amount of seventy-five cents (75¢) per game play and a session duration of one thousand (1,000) game plays. The casino attendant may then select a speed setting. A speed setting may govern the rate at which outcomes are generated during the session. For example, if a casino attendant selects a "real time" option, outcomes may be automatically generated at a substantially conventional pace (as they normally would in a standard mode of operation, taking several seconds to reveal each outcome). In another example, a casino attendant may select an option that multiplies the standard rate of outcome generation by some factor (e.g., outcomes will be generated "ten times faster"). In yet another example, a casino attendant may select an option that specifies a rate per unit time at which outcomes may be generated (e.g., "100 spins per minute"). In yet another example, a casino attendant may select an option that "instantly" or substantially instantly generates results for all game plays associated with a session. It should be understood that many if not all GDs possess the processing power to generate thousands if not hundreds of thousands of random numbers in as little as one second, facilitating the rapid or seemingly "instant" generation of such game results.

Various other parameters for a session may also be configured. For example, a casino attendant may specify one or more active pay combinations associated with a session (e.g., "BAR-BAR-BAR" is active, though "DOUBLE JACKPOT" is not).

Further, a casino attendant may configure various display options associated with the execution of the session. As stated, without the need to entertain a player (who may not be present for execution of one or more game plays associated with a session), graphic presentations or other visual accompaniments commonly employed by GDs may either be (i) expedited considerably (e.g., a video display screen outputs one thousand (1,000) consecutive animations of spinning reels in the course of a few minutes), (ii) presented in an alternate fashion (e.g., a display screen simultaneously depicts one thousand (1,000) symbol arrays), and/or (iii) abandoned altogether (e.g., outcomes are generated and stored or output as described elsewhere herein, but not presented in a conventional visual fashion). Accordingly, a casino attendant may have an opportunity to select various display options. For example, in one embodiment, a casino attendant may select an option such that graphics, animations, sounds, the spinning of mechanical reels, etc. may be eliminated entirely. In another embodiment, a casino attendant may indicate that the GD should simultaneously display a plurality of game results at the same time (e.g., fifty (50) hands of five-card stud poker are displayed at once). In another embodiment, a casino attendant may specify the amount of time that one or more game results should be presented before another game result or set of game results are presented (e.g., simultaneously display fifty (50) outcomes of a five-reel, video slot machine for ten (10) seconds, then display the next set of fifty (50)).

In further embodiments, a casino attendant may (i) select whether or not game results are to be stored and/or transmitted electronically, and/or (ii) identify a manner in which game results are to be stored and/or transmitted electronically. For example, by pressing an icon of a touch-sensitive display screen, a casino attendant may indicate that all game results associated with a session should be stored electronically in a session database (e.g., such as session database 425 or active sessions database 435).

In one embodiment, a casino attendant may specify a location to which game results are to be transmitted electronically (e.g., the CS 305 and/or the AS 310 of FIG. 3, etc.). In one embodiment, a casino attendant may indicate that gaming results are to be stored on a smart card currently inserted into a reader device in communication with the GD generating the outcomes for the session (e.g., such that a smart card may be associated with a session, and the results stored thereon such that they later may be accessed for auditing, accounting or any other purposes). Such storage or transmission may occur at any time during or after the execution of a session (e.g., game results are individually stored as they are generated; game results are stored in RAM while they are being generated, then written to ROM and erased from RAM; and so on).

In one example of executing a session in accordance with defined parameters, a number of game plays may then be executed in accordance with the configured parameters. For example, one thousand (1,000) game plays of a three-reel slot machine at a wager amount of seventy-five cents (75¢) per game play may be executed using an "instant" speed option, such that outcomes and associated payout amounts are generated as rapidly as possible. Visual indications of such game results may then, if desired, be output via a display device (e.g., a casino attendant may optionally "scroll" through screens simultaneously depicting one hundred (100) outcomes each, after they have been generated). Further, the result of the session may be output as described herein (e.g., a session results ticket may be printed and/or an indication of the session result may be transmitted to another device). It should be noted that, in some embodiments, the execution of a plurality of game plays (i.e., generation of outcomes) may occur in a substantially automatic manner. For example, once a person requests that a session be executed, the outcome generation for the session may occur without further input from the person. For example, it may not be required for the person to actuate a "spin" button or other game play initiation mechanism in association with each game play; rather, the GD may be configured to execute game plays without interaction from the person. Further, a GD may be configured to execute a game play without deducting a wager amount from a credit balance, or by deducting a wager amount from a credit balance, even if the balance is "negative" or "zero," and so on. Such methods are described in commonly-owned U.S. application Ser. No. 10/635,986, filed Aug. 7, 2003, entitled "SYSTEM AND METHOD FOR REMOTE AUTOMATED PLAY OF GAMING DEVICES"; U.S. application Ser. No. 10/636,520, filed Aug. 7, 2003, entitled "SYSTEM AND METHOD FOR COMMUNICATING GAME SESSION INFORMATION"; and U.S. Pat. No. 6,012,983, filed Dec. 30, 1996, entitled "AUTOMATED PLAY GAMING DEVICE"; these methods of each of which are hereby incorporated by reference herein for all purposes.

Thus, in some embodiments, a person such as a casino attendant or player may configure a GD such that it executes a session in accordance with one or more embodiments described herein. In other embodiments, a GD may be configured to execute a session without receiving input from a person.

As stated, in some embodiments of the present invention, a gaming device may be configured to execute a plurality of game plays on the player's behalf while the player is not present. Accordingly, as described, a gaming device may be configured to operate in a "remote contract" mode wherein a plurality of outcomes may be generated relatively rapidly.

Further, in some embodiments and as described with respect to FIG. 25, a casino attendant may (i) select whether or not game results are to be printed (e.g., using a "TITO" device), and/or (ii) identify a manner in which game results are to be printed. For example, by pressing an icon of a touch-sensitive display screen, a casino attendant may indicate that all game results associated with a session should be printed using a TITO device. Further, a casino attendant may configure a manner in which such gaming results are to be printed.

Thus, in some embodiments, a GD may receive one or more signals or instructions from a separate device (e.g., a server such as the CS 305 of FIG. 3, a second GD, a CPD, etc.), which may indicate (i) that a session should be executed, and (ii) parameters (and values thereof) associated with the session. For example, a five-reel, nine-payline video slot machine located on the floor of a casino may receive a signal indicating that the device should generate one thousand (1,000) spins, with nine paylines activated and twenty-five cents (25¢) wagered per spin. The device may then execute the session as described above (e.g., use the random number generator to generate the outcomes) and output the session result data as described herein. Various methods of receiving such signals or instructions are contemplated. For example, a communications port may receive a transmission via any communications protocol described herein (e.g., a server sends such a signal to a GD using BOB or other appropriate protocol). Thus, in some embodiments, it may not be necessary for a casino attendant to interface with a GD to execute a session. In some embodiments, a casino attendant may later visit a GD on which a session has been executed to retrieve printouts, session result data, etc.). In other embodiments, session result data may be transmitted electronically, as described herein, and a casino attendant need not be involved in the transmission of the session result data.

In some embodiments in which a player may request a session and a DVD of the session may be created in response thereto, a casino may receive a request to execute a session at a first time, and execute the session at a later time. For example, so long as a player has agreed to such a condition, a casino may receive a request to execute a session from the player, and the session may be executed whenever the casino deems most appropriate, so long as the execution occurs no later than a specified time after the request was received (e.g., the casino has up to forty-eight (48) hours to execute the session).

Thus, in one or more embodiments, a casino may determine a level of gaming device utilization before executing a session (whether the session is executed on behalf of a particular player or not). For example, in one embodiment, a session may be executed when it is determined that there is sufficient capacity for the session. For example, it may be determined that enough slot machines located on the floor of a casino are not currently being utilized, such that occupying one slot machine for the purposes of facilitating a session will not result in a shortfall of GD capacity that is deemed unacceptable by a casino. In one embodiment, GD utilization data may be stored in a GD database, an exemplary data structure of which is depicted by FIG. 8. For example, a GD database may indicate a "device status" associated with a GD, which may describe whether the particular GD is currently "in use" or "not in use." A variety of methods of monitoring GDs to detect such utilization are contemplated (e.g., detecting game play activity, detecting the insertion of a player tracking card or contract card, detecting the presence of a player using a sensor device, monitoring GDs with video cameras, polling the GDs, etc.), such that in some embodiments, a server device (e.g., the CS 305 of FIG. 3) may track GD utilization in a substantially automatic manner (e.g., a server detects use and writes to a centrally-stored GD database). In one embodiment, a percentage utilization metric may then be calculated with respect to all GDs within a casino (e.g., thirty-seven percent (37%) of all machines are in use). Accordingly, in some embodiments, a session may or may not be executed depending on a determined percentage utilization metric (e.g., if a percentage utilization metric is above a certain threshold, no sessions are to be executed). In one embodiment, historic GD utilization data may be considered when determining whether or not a session is to be executed (e.g., on average, slot machine utilization from 12 p.m. until 6 p.m. on Wednesdays has been twenty-three percent (23%) at Casino A). In this manner, a casino can effectively load balance the execution of sessions against the utilization of its casino floor, thus executing sessions at times when doing so is preferable.

In some embodiments in which a session is executed on behalf of a particular player and in response to a player request for the session, a player may request that a session be executed on a particular GD and/or GD of a particular type. Accordingly, in one embodiment, utilization data for GDs may be accessed (e.g., by a casino attendant using a CPD or by the CS 305 of FIG. 3) to determine whether such a GD is available. If the desired GD is available, the session may be executed (e.g., by dispatching a casino attendant to execute the session). In some embodiments, session may only be executed if the desired GD has not been in use for some predefined period of time (e.g., thirty (30) minutes), and/or if it is a certain time/date (e.g., no sessions may be executed on weekends or weeknights between 7 and 11 p.m.). In some embodiments, a server or other computing device (e.g., the CS 305 of FIG. 3) may continuously, substantially continuously, periodically or on another basis monitor the availability of one or more GDs, and should a previously utilized GD that a player has requested for a session become available, the session may be executed. For example, (i) a casino attendant may be dispatched to the GD (e.g., a signal is sent to a CPD, indicating the available GD's location, session parameters (and values thereof), and so on). In another example, a signal or instruction may be sent to the GD such that the session is executed. In some embodiments, a signal or instruction may be sent to a GD even when the GD is in use and the GD may be programmed to execute the session in accordance with the instruction at the first appropriate time or simultaneously while allowing the use of the GD by a player in a conventional manner.

Referring now to FIG. 26, illustrated therein is an example embodiment 2600 of a record of a database, storing an indication of payouts determined by a gaming device for a session. As described, in some embodiments it may be unnecessary and/or undesirable to store an indication of the set of indicia representing each outcome of a session. However, it may be desirable to store an indication of payouts determined for the session and, in some embodiments, the order in which the payouts were determined. For example, a probability database, payout database (or a database that combines features of a probability database and payout database, as described above with reference to FIG. 18), may be used by a GD to determine a payout for each game play of a session. The GD or another device may then store an indication of each payout and, in some embodiments such as the one illustrated in FIG. 26, the indication of the payouts. A device (e.g., the AS 310 of FIG. 3) may then use the payout data to create a video representation of the payouts. For example, the AS 310 may select, for each payout indicated in record 2600, a media file that corresponds to the payout. For example, the first payout, which is indicated as "0", the AS 310 may select a media file that comprises a set of indicia representing an outcome that corresponds to zero credits being won as a result of the game play.

The record 2600 includes a number of fields, including (i) a gaming device identifier field 2605 that stores an identifier of a GD on which the payouts were determined; (ii) a data type field 2610 that indicates the type of data stored in the record (e.g., in some embodiments different types of data, such as an indication of a set of indicia comprising an outcome, may be stored); and (iii) an indication of payouts field 2615 that stores an indication of each payout generated for a session (each payout corresponding to a particular game play of the session) and the order in which the payouts were generated. Of course, additional or different data may be stored in such a record. For example, an indication of a game (e.g., in addition to or in lieu of the gaming device identifier) for which the payouts were determined may be stored. In another example, an indication of a time and/or date of the session and/or each individual payout may be stored. In yet another example, an indication of a verification of the software used to generate the payouts may be stored (e.g., a hash function technique may be used to verify the authenticity and integrity of the software may be performed at the beginning of each session and an indication of the result of such an authentication process may be stored in the record).

Referring now to FIG. 27, illustrated therein is a receipt 2700, as an example embodiment of a receipt that may be output to a player upon a purchase of a DVD by the player. The receipt 2700 includes a name of a casino (in area 2705) that may indicate the casino at which the DVD was purchased, the casino at which the DVD may be redeemed, and/or the casino at which the session upon which the outcomes represented on the DVD were generated.

In area 2710 a message is printed, informing the player that the receipt 2700 must be presented in order for the corresponding DVD to be redeemed, as is consistent with some embodiments described herein.

The receipt 2700 also includes (in area 2715) an indication of the date and time at which the DVD was purchased.

The receipt 2700 also includes (in area 2720) an indication of session information describing various parameters (and values thereof) defining the session upon which the DVD video presentation is based. For example, the example session information indicated on receipt 2700 is the name of the casino (e.g., casino at which the DVD was purchased, at which the DVD may be redeemed and/or at which the outcomes represented on the DVD were generated), the game for which the outcomes represented on the DVD were generated, and an indication of the wager per game play posted for each game play represented on the DVD. Of course, different and/or additional session information may be indicated on such a receipt.

The receipt 2700 also includes with additional data (in area 2720) that may comprise encoded information corresponding to the DVD and/or session (e.g., a redemption value, a POS and/or a casino attendant associated with the sale, a session or DVD identifier, a price of the DVD, etc.).

The receipt 2700 also includes a disc activation number (in area 2725), in both human readable and bar code form. The disc activation number may comprise, for example, a disc activation code as described herein.

The receipt 2700 also includes a signature line (in area 2735) that may comprise a line on which a player may be required to sign upon redeeming a DVD (e.g., as a measure preventing the player from claiming that the player has not redeemed the DVD and/or to discourage the player from attempting to re-use the receipt to again redeem the DVD).

The receipt 2700 further includes another line and boxes (in area 2740) to be filled in by a casino attendant upon a DVD being redeemed. For example, information relating to the authorization of the redemption, the date and/or time of the redemption, and/or the signature of the casino attendant facilitating the redemption may be filled in.

The receipt further includes a prize claim code (in area 2745). The prize claim code may comprise, for example, a code pointing to information stored in a database. For example, the prize claim code may be a pointer to a record of a database that stores an indication of the redemption value of the DVD. In some embodiments, the prize claim code may comprise a disc identifier and/or a session identifier, as these are described herein.

In some embodiments, a receipt 2700 may indicate any or all of (i) a gaming device identifier, (ii) a scheduled session identifier (e.g., a "game number" associated with a scheduled and/or previously conducted session), (iii) a time/date associated with one or more scheduled and/or previously conducted sessions and/or (iv) a player identifier, contact information or other means of identifying a player associated with the receipt and/or session.

Turning again to a description of a video presentation that may be recorded onto a DVD, in some embodiments one or more of several features may additionally be made available to players when viewing a video presentation. Some of these features are described below.

In some embodiments, a counter feature may inform players how many outcomes of a session have been depicted in prior segments of a video presentation and/or how many outcomes remain in subsequent segments of a video presentation. For example, at a particular frame of a video presentation, an outcome or game play meter may display that there are three hundred and twenty-two (322) outcomes, e.g., of five hundred (500) outcomes, depicted in subsequent segments of the video presentation. Such an outcome countdown meter may be a graphic overlaid onto frames or sections of frames of the video presentation.

In some embodiments, players may sort outcomes depicted in a video presentation by various criteria and view the video presentation accordingly. For example, players may select an option to "view all winning results" or "view all losing" results. In another example, a player may select an option to "view all remaining results in order of my payouts, from highest to lowest." Accordingly, in an embodiment wherein players view outcomes via a Web interface, a database or other memory structure (e.g., a session database) may be accessed in response to such requests (or may be utilized in creating video presentations configurable based on such requests) and may thus comprise additional fields for payout data, such that players requesting to view results based on payout amounts may do so (e.g., such that a server may receive such a request, access a session database to determine an appropriate media file, and output the media file).

In some embodiments, players may be able to control the speed at which a video presentation is output. For example, in one embodiment, a player may view a video presentation recorded onto a DVD. The disc may contain three different media files associated with each game play number: one media file depicting a rendering of the game play result at a normal speed, a second media file depicting a rendering of the game play result at a rapid speed, and a third media file depicting a rendering of the game play result at a slow speed. Thus, the player may, using an input device of a DVD player (or personal computer), select a "fast-forward" option, such that one or more game play results of a session may then be output at a more rapid pace (e.g., upon receiving the input, the DVD player accesses the "rapid" version of each requested game play number). In an embodiment wherein players elect an option to review a plurality of game play results at a time (e.g., without requiring further input, fifty (50) animations (each depicting a spin of a slot machine) are seen in sequence), such a fast-forward and "slow motion" features may be useful (e.g., such that players may, for instance, rapidly scroll through sets of outcomes). In another example of a speed option that a player may control, a player may select an option to enable or disable to "spinning" of animated reels, such that if the option is disabled, the player may see only the final resolution of the spin (e.g., the resulting symbol array) without a longer animated introduction.

Further, in some embodiments, players may be able to review video presentations they have already viewed. For example, a player watching a video presentation of a video poker session may select an option to "replay last hand" (such an input triggering a DVD to revert to a previous chapter, a software application to replay the most recently-viewed animation, a server to access a media file in association with a particular game play number, and so on). Further, players may similarly review a plurality of game play results in such a manner (e.g., "replay last twenty spins"). In a further embodiment, a purchaser of a session may use an input device of a DVD player or DVD remote control to "rewind" a video presentation (such an embodiment may be particularly effective when a player chooses a mode that displays a plurality of game play results in succession without requiring further input).

In one or more embodiments, various triggers may cause the output of a video presentation to be temporarily suspended or paused. For example, a video presentation may be temporarily suspended or paused upon the occurrence of a payout over a threshold amount of coins (e.g., payouts over one hundred (100) coins). More specifically, in one example, a media file encoded on a DVD depicting a slot machine spin yielding a payout of one thousand (1,000) coins may contain an extended pause at the end of the file during which there is no animation (or, alternately, added animation such a fireworks or other graphics may appear). In one embodiment, a media file depicting an outcome corresponding to a payout of at least a certain magnitude may be of a longer duration, thus effectively including a pause or other image designed to draw the player's attention to the payout. In one embodiment in which a pause is employed, an input may be required from a player before the video presentation continues from a point at which it was paused (e.g., such that the player must acknowledge the win). In this manner, players may be less likely to miss the results that yielded large payout amounts. In some embodiments, a pause may be employed after the display of each outcome.

In some embodiments, players may also optionally configure various display parameters for video presentations. Similarly to the display parameters described with respect to FIG. 25 (e.g., wherein a casino attendant may set display parameters before executing a session), purchasers of sessions may have the opportunity to select a variety of display options for viewing a video presentation based on the session, which display options may alter such parameters as (i) the number of outcomes displayed on the screen at once, (ii) the size of the outcomes displayed on the screen, (iii) the "skin," appearance or theme of various indicia (e.g., a player chooses an "ice age" theme as opposed to a "treasure hunt" theme), and so on.

In some embodiments, a game play result that has been used to generate a video presentation may comprise a "bonus round" or other point in which a decision from a player is typically required (e.g., a draw video poker game typically requires a player to decide which cards to hold in a given initial hand of cards). Commonly, some GDs offer entrance to a bonus round upon the occurrence of a triggering condition, such as the receipt of a bonus-triggering outcome (e.g., "Bonus-Bonus-Bonus"). In some cases, such bonus rounds occurring on GDs may require no additional input or choice from a player. For example, a player may achieve a bonus-triggering outcome, and accordingly a display screen may depict an animated sequence that resolves in a number of additional "bonus" credits that the player has won. In some embodiments, such non-interactive bonus presentations may be incorporated into video presentations (e.g., during a video presentation of a reeled slot machine game, after the reels spin and depict a bonus-triggering outcome, the video presentation depicts an animated bonus sequence and reveals an amount of bonus credits).

In other cases, players interfacing with GDs on a casino floor may be presented with several choices or options during a bonus round or other point in a game (e.g., upon an initial hand of cards being dealt to a player in a video poker game). For example, upon achieving a bonus-triggering outcome, several choices may be output to a player (e.g., a touch-screen depicts three boxes from which a player may choose one). A bonus payout amount may then be based on the player's choice.

However, as described, some embodiments of the present invention comprise the execution of sessions of outcomes without the presence of a player to make such decisions. This may be handled in several manners. For example, in one embodiment, a player may authorize an agent (e.g., casino attendant) to make such decisions on his behalf (e.g., such that when executing a session, the agent may use a touch-sensitive display screen or other input device of a GD to make a selection in a bonus game or to decide which cards of a hand of cards to hold and which to discard). In another embodiment, a GD may be programmed such that, when operating in a session outcome generation mode (e.g., a DVD outcome generation mode), such selections (e.g., in a bonus round or other point of a game play) may be made randomly or based on a predetermined strategy. For example, if there are three choices associated with a bonus game, a GD may be programmed to generate a random number between one and three to determine an outcome/payout of the bonus round or to select the left-most choice).

In some embodiments, a player may select a strategy as a value of a parameter in defining a session to be executed on behalf of the player. In some embodiments in which DVDs of sessions are mass produced prior to any request for a session being received from a player, a description of a DVD available for purchase may include a description of a strategy used in executing the session, to make decisions on behalf of a player. This may be true for sessions of video poker games or other games typically involving player decisions. For example, a session for a draw video poker game may be executed using a perfect strategy or near-perfect strategy in deciding which cards to hold for a given initial hand.

In some embodiments, players viewing video presentations that present such bonus rounds or other decisions may offer no interactivity. For example, a video presentation depicts three boxes, one of which is highlighted/selected during the video presentation without receiving player input, such that a payout amount is subsequently revealed). In other embodiments, players may have a perceived influence over such bonus round outcomes or other decisions (e.g., players may be given an opportunity to "select a box" using an input device, though the result may already have been determined before the player's selection and, for example, assigned to all options the player may choose). It should again be noted that such players watching video presentations at remote locations may have no actual influence over associated game play results, as any game play may have previously occurred (e.g., in a legal jurisdiction).

In some embodiments, a progressive "win" may occur during the execution of a session. Such a progressive win achieved during a session being executed may be handled in a variety of manners.

For example, in one embodiment in which a session is being executed on behalf of a particular player, the player may be instantly notified of the progressive win (e.g., the player is called before he is even provided with video presentation). In other embodiments, the player may not be notified, but rather may learn of such a progressive win by watching a video presentation.

In some embodiments, a pool of funds dedicated to paying out progressive wins may be decreased and/or reset immediately after a progressive "win" occurs during the execution of a session, or soon thereafter. However, in other embodiments, such a pool may not be decreased and/or reset until a player claims winnings.

In other embodiments, execution of sessions may not be permitted on GDs offering progressive jackpots.

Progressive jackpot wins may be processed in a different manner in embodiments in which sessions are executed for a mass production process in which the sessions are not being executed on behalf of any particular player but are rather being produced to be later offered for sale. Such embodiments may be referred to as pre-packaged DVD embodiments herein. For example, a pre-packaged DVD may comprise an outcome corresponding to a progressive win, though the disc may remain unsold for a period of time. Accordingly, in some such embodiments, though a progressive "win" occurs once the session is executed, a progressive jackpot pool may not be decreased until the DVD is sold, and/or until a player who eventually purchases the DVD attempts to redeem the DVD.

In some embodiments, various steps may be taken to prevent or discourage fraudulent purchase of pre-packaged DVDs. For example, because game play results have already been generated at the time of purchase, a casino may attempt to disguise the redemption values of such DVDs (e.g., such that players and casino employees may not figure out a way to "beat the system" by purchasing DVDs which they may know or suspect to correspond to large redemption values). For example, when generating a cashout ticket or otherwise outputting session result data associated with a session on which a resultant DVD will be based, no final session balance may be indicated or may only be indicated in an encrypted form (e.g., such that a casino attendant or other person with an opportunity to view the cashout ticket or other session result data may not be privy to whether the session has resulted in a relatively large aggregate).

Additional measures may be taken to prevent casino employees or other persons in a position of becoming aware or otherwise gaining access to session result data associated with a session (whether it be a session for a pre-packaged DVD or a session executed on behalf of a particular player). For example, in one embodiment, no session result ticket may be output. In another embodiment, a casino attendant administering a session or otherwise having an opportunity to gain access to session result data may not be allowed to view game play results using a display screen of a GD or otherwise.

In some embodiments, a third party may administer the creation of video presentations. For example, a casino attendant may execute a session using a GD, such that afterwards a cashout ticket (that does not indicate a final session balance, but is printed nonetheless for auditing purposes) and a game video ticket are output. The casino attendant may then provide the game video ticket to the third party. The third party (e.g., the AS 500 of FIG. 5 and/or operator thereof) may then scan a barcode of the game video ticket and produce a pre-packaged DVD based on the information encoded on the game video ticket. In this manner the final session balance associated with the DVD may not be known by a casino at the time it is provided to a player. In some embodiments, at the time a DVD is given to the casino by the third party, a payout code may additionally be provided. For example, in some embodiments, players having purchased sessions or DVDs created based thereon may fail to claim winnings (e.g., redeem the DVD for the redemption value) that they are due. Accordingly, in some embodiments, a casino may be responsible for providing such payouts to players, though to prevent fraud, casinos may not learn of a final session balance associated with a session until after an associated video presentation has been provided to a player. For example, thirty days after a DVD has been sold to a player, a casino may provide the payout code to the third-party, which may inform the casino of a final session balance due to the player.

In some embodiments, multiple players may remotely receive session results generated by a GD (e.g., a GD located within casino premises).

For example, in some embodiments, a GD may be configured to periodically generate batches of outcomes (e.g., fifty (50) spins of a three-reel, three-payline video slot machine). Such batches of outcomes may be thought of as "scheduled sessions," as players may be given an opportunity to purchase in advance the right to receive game play results generated during such sessions. In some embodiments, such scheduled sessions may (i) be scheduled to occur at predetermined intervals (e.g., every five (5) minutes), (ii) comprise a predetermined number of game plays (e.g., fifty (50) game plays), and/or (iii) have a session identifier or session number associated therewith. Accordingly, a player may purchase or wager on a session occurring at a specific time (e.g., the player wagers on session number "S-1905515", which occurs at 5:15 p.m. tomorrow).

For example, players may visit a central location within a casino and indicate a desire to wager on one or more upcoming scheduled sessions (e.g., by indicating one or more of the next available scheduled session, a scheduled session occurring at a specified time/date in the future, etc.). In some embodiments, players prepay a flat-rate price when wagering on an upcoming scheduled session. For example, when wagering on a session, a player may indicate a denomination of credits (e.g., one dollar ($1.00), twenty-five cents (25¢), five cents (5¢), one cent (1¢), etc.). The denomination of credits and number of game plays within the scheduled session may determine a price associated with the session. For example, for a session of fifty (50) slot machine spins at fifty cents (50¢) per spin, a player might pre-pay a twenty-five dollar ($25) price. However, for the same session, a second player may indicate a credit denomination of five cents (5¢), and thereby prepay only two dollars and fifty cents ($2.50). Thus, when a ten-credit (10-credit) win occurs in the session, the first player may receive a payout of five dollars ($5.00), whereas the second player may receive a payout of only fifty cents (50¢). In further embodiments, players may place wagers on several paylines of a slot machine session at once (thereby effectively increasing the number of game play results to be received, and therefore the price). For example, certain players of a scheduled session may benefit from having all three paylines "activated" (though such an activation would serve to increase the price), whereas other players may only wager on one payline (for a lower cost).

Accordingly, once a price is determined in association with the session, players may provide payment before the scheduled session begins. For example, a player may provide a payment to a casino attendant or kiosk. Once payment is received in association with one or more scheduled sessions, a player may watch, from a remote location, as game play results are generated once the scheduled session begins.

In one embodiment, a casino may set aside one or more GDs of a particular theme or game brand for "scheduled sessions." In one example, the GD is a five-reel, nine-payline video slot machine. The device may be configured to automatically initiate fifty (50) spins, each spin lasting about three (3) seconds, once every five (5) minutes.

As such game play results are generated, they may be output such that they may be viewed by players remotely. A variety of methods of outputting such outcomes are contemplated. For example, in one embodiment, a video feed may be taken from the slot machine, such that the feed may be broadcast over the Internet, or over a cable television channel. In another embodiment, session result data may be output to a centrally accessible database, such that a Web site maintained by the casino may be configured to rapidly interpret the data and translate the data into visual presentations of outcomes that may be viewed by players over the Internet. In another embodiment, stored audio and/or video files commonly output by the GD's display screen may be output to a server device, such that players may access the files over the Internet. A variety of such methods of transmitting game play results from a GD such that associated audio and/or video files may be rendered over the Internet are contemplated.

When viewing such game play results, various status information may also be made available to players, such as (i) a number of coins or other indication of value won by the player, (ii) a number of coins or other indication of value won by other players who may have bet on the same scheduled session (e.g., though bet on different paylines), and so on.

In some embodiments, a GD configured to generate such game play results for scheduled sessions (or for sessions as described elsewhere herein) may additionally be configured to generate game play results for local players interfacing with the GD. Several such examples are contemplated.

For example, in one or more embodiments, a GD may appear as a standard GD, and to a local user, may operate in a similar fashion to a GD that is not also generating game play results for use in scheduled sessions. For example, a local user may utilize the GD in a conventional manner, providing wager amounts, executing game plays, viewing results, and so on. However, concomitantly, such a GD may generate game play results for use in a scheduled session. For example, a processor of such a GD may be configured to generate local and session game play results at once. In another example, a program stored within the memory of the GD may instruct the GD to generate session game play results only when local game play results are not being generated (e.g., each time there is a five-second (5-sec) lull between the initiation of game plays by a local user, the GD generates one or more outcomes for a session).

In some embodiments, session game play results may be output (e.g., by a display device) locally much as local results are. For example, in one or more embodiments, a GD may be configured to utilize separate display areas—one for local game play results, and one for session game play results. For example, a GD may possess a "local" display screen as well as a "session" display screen, the latter for depicting game play results that remote players have wagered on.

Of course, it should be understood that in some embodiments, players need not view the execution of one or more game plays in association with such scheduled sessions in real-time. For example, game play associated with a scheduled session may be executed before the session is scheduled to be "broadcast" to players who may have wagered on the session (e.g., game play results are stored in a database).

Further, in some embodiments, a player may utilize computer software (e.g., of a home computer) to interpret and output results from a plurality of scheduled sessions that the player has wagered on. For example, such software may aggregate the results of multiple sessions which the player may not have had a chance to watch, such that the player may learn of wins, losses, a current balance, and so on.

Settlement of such scheduled sessions may occur in a manner similar to those described previously with respect to sessions. For example, a player may return to a casino and present one or more of a receipt, scheduled session identifier or photo identification. A final balance owed to the player may then be determined (e.g., a device such as the POS 320 of FIG. 3 may access session result data associated with the session, and based on the wagers previously placed by the player, determine a redemption value for the session).

In some embodiments, players may be allowed to alter session parameters after a session has been executed (but, e.g., prior to the player viewing the results of the session). For example, in one embodiment, a player may return to a jurisdiction where gambling is legal (e.g., return to a casino) and request that various parameters be altered. For example, a player may have originally purchased a session for one thousand (1,000) spins of a slot machine at a wager amount of twenty-five cents (25¢) per spin. After going home and watching five hundred (500) spins, the player may return to the casino and request that a wager amount per game play be increased to fifty cents (50¢). Accordingly, it may be determined that the price associated with the session may need to be altered as a result of the alteration to the wager amount parameter, such that the player may either need to make an additional payment or be owed a refund. Further, the player may then be provided with a new video presentation (e.g., such that elements of the video presentation effected by the player's changes to the parameters of the session (such as payout indications and changes to a credit balance meter, in the present example) may be reflected). In another example, a player may return to a casino and forfeit a number of game plays associated with an executed session. For example, a player may have purchased a one thousand-spin (1,000-spin) session, and may have viewed only five hundred (500) spins of the video presentation based on the session. The player may then return to the casino and forfeit the final five hundred (500) spins; in doing so, the player may agree to forfeit any payouts associated with such spins, though he may be provided with (i) payouts resulting from the first five hundred (500) spins, and/or (ii) a refund for the second five hundred (500) spins that the player did not receive the benefit of. In some embodiments, players may be charged a fee to forfeit a portion of a previously purchased session in such a manner.

In some embodiments, a first and second casino may be part of the same "session network." Accordingly, a player may enter a first casino and purchases a session and/or a DVD based on the session. The player may then enter a second casino and (i) collect a redemption value associated with the session and/or DVD; and/or (ii) alter one or more parameters associated with the session. Thus, in some embodiments, devices of a first casino and second casino may communicate with one another (e.g., so as to read from and/or write to one or more databases).

Some embodiments may not include an AS (such as the AS 310 of FIG. 3). For example, a server (e.g., the CS 305 of FIG. 3), GD (e.g., the GD 310 of FIG. 3) and/or a CPD (e.g., the CPD 325 of FIG. 3) may be operable to perform steps described herein as primarily performed by the AS 310.

In further embodiments, a Web site maintained by a casino property (or third party) may function to (i) receive requests to view session results (e.g., from remote players), (ii) retrieve session results (e.g., from a session database), and (iii) output a video presentation based on the session results. Accordingly, in one or more embodiments, the creation of a video presentation may ultimately be performed as a Web site interprets stored session result data and outputs animations accordingly. Such embodiments may be advantageous in that session result data may be output in a variety of manners (e.g., an outcome of "Bar-Bar-Orange" may just as easily be shown as any other outcome with a comparable payout amount, such that a variety of different game symbol appearances may be substituted for the "Bar" and "Orange" symbols), so as to accommodate players who request different visual themes associated with game plays executed as part of a session. Such an embodiment may enable, for example, a player purchasing a session at a casino, logging on to a home computer, and choosing several different slot machine "skins" for which to view session results.

It cannot be over-emphasized that the use of DVD as an example media on which session result information may be recorded, to allow remote viewing of outcomes of the session, is intended as an example only and should not be taken in any limiting fashion. Thus, for example, although a sale of a DVD is described in detail with reference to FIG. 22, a similar process may be performed for a sale of a session in another remotely viewable form. For example, a sale of access to session results available online (e.g., wherein a player may be provided with an activation code that allows the player to access a video presentation online) is also contemplated. In another example, a sale of a CD-ROM, VHS tape, floppy disc, flash memory, memory stick, dedicated portable device for viewing video presentations, and paper-based flip-through book that illustrates the outcomes of a session may also be sold in a similar manner. In other words, the format or media via which the video presentation is provided to a player is not limited to a DVD. In another example, the redemption of a DVD as described with reference to FIG. 23 is not intended to limit the redemption of a session result to be via a DVD form. For example, in one embodiment a player may provide a CD-ROM including a video presentation thereon and redeem the CD-ROM for the redemption value associated with the session. In another example, a player having viewed a video presentation online may be provided with a code or other means of collecting a redemption value associated with the session upon which the video presentation is based. Any practicable method of outputting a video presentation to a player such that a player may purchase plurality of outcomes and view them remotely at the player's convenience is contemplated.

Turning now to FIG. 28A, FIG. 28B, FIG. 28C, and FIG. 28D, various examples of session objects 2800*a-d* according to some embodiments are shown. The session objects 2800*a-d* may comprise, for example, session objects as described herein in accordance with the execution of various processes associated with providing a plurality of outcomes of a gaming device to a player via a tangible medium (e.g., via a DVD). Any of the session objects 2800*a-d* may, according to some embodiments, be provided for selection by players, such as by being displayed via the session object display 232 of FIG. 2.

The first example of a session object 2800*a* is depicted in FIG. 28A. The first exemplary session object 2800*a* is an example of a DVD and/or CD packaging medium such as a jewel case (i.e., jewel case 2800*a*). The jewel case 2800*a* may, according to some embodiments, be or include any type or configuration of jewel case and/or other packaging medium that is or becomes available. The jewel case 2800*a* may comprise, for example, a standard jewel case, a slim line jewel case, a clamshell case, a multi-disc storage case, etc. Such a jewel case 2800*a* may be constructed of any suitable medium that is or becomes available such as plastic, polycarbonate, etc.

In some embodiments, the jewel case 2800*a* may comprise a DVD and/or tangible medium storage area 2802 for housing and/or coupling to a DVD and/or other tangible medium (e.g., containing a plurality of outcomes comprising a session). The jewel case 2800*a* may also or alternatively comprise an insert area 2804 for housing and/or coupling to a packaging insert such as the exemplary packaging insert 2900 depicted in FIG. 29. The jewel case 2800*a* also generally comprises an indication 2806*a* of a parameter indicative of a plurality of outcomes of a slot machine game. The indication 2806*a* may be coupled to, printed, stamped, etched, and/or otherwise affixed and/or presented on any practicable portion of the jewel case 2800*a*. As shown, for example, the indication 2806*a* may comprise a label adhered to one or more various portions of the jewel case 2800*a*. The parameter indicated by the indication 2806*a* might be any parameter and/or combination of parameters and/or parameter values as described herein. In some embodiments for example, the indication 2806*a* may comprise a disc identifier that corresponds to one or more pre-recorded DVDs and/or one or more pre-executed sessions. The indication 2806*a* may also or alternatively indicate parameters defining one or more sessions to be executed on-demand.

In FIG. 28B, a second exemplary session object 2800*b* is depicted. As shown, the second session object 2800*b* may comprise a packaging medium such as a DVD sleeve (i.e., DVD sleeve 2800*b*). The DVD sleeve 2800*b* may, for example, comprise any type or configuration of CD and/or DVD storage and/or transportation (e.g., mailing) sleeve that is or becomes known or practicable. The DVD sleeve 2800*b* may, for example, be constructed of various materials such as paper, cardboard, plastic, vinyl, and/or any combination of suitable materials. As shown, the DVD sleeve 2800*b* may (or may not) comprise a sealing flap 2808 configured to secure a DVD 2810 inside of the DVD sleeve 2800*b*. In some embodiments, the sealing flap 2808 may be self-adhesive to allow easy and/or convenient sealing of the DVD sleeve 2800*b* and/or securing of the DVD 2810. The DVD sleeve 2800*b* may also generally comprise an indication 2806*b*, such as the stamped and/or molded alphanumeric indication 2806*b* shown in FIG. 28B.

A third session object 2800*c* is depicted in FIG. 28C. The third session object 2800*c* may comprise, for example, a card, ticket, and/or form (i.e., card 2800*c*) comprising one or more indications 2806*c* of various parameters defining one or more sessions. The card 2800*c* may be constructed of any suitable material such as paper, cardboard, plastic, metal, and/or any combination thereof. The card 2800*c* may also or alternatively be shaped and/or organized in any practicable and/or desirable configuration. According to some embodiments, the card 2800*c* may comprise one or more indications of pre-defined parameters 2806*c*-1, one or more indications of player-selected parameters 2806*c*-2, and/or one or more indications of player-defined parameters 2806*c*-3. The pre-defined parameter indications 2806*c*-1 may comprise, for example, printed and/or other indications of parameters and pre-defined values thereof that are inherent to the card 2800*c* (i.e., not editable by a player). The player may select such parameters simply by selecting the card 2800*c*. In some embodiments, the player-selected parameter indications 2806*c*-2 may comprise indications of pre-defined parameters and values thereof that the player may choose, such as by marking a check or "x" in a box adjacent to each possible pre-defined parameter and value printed and/or otherwise indicated on the card 2800*c*. The player-defined parameter indications 2806*c*-3 may comprise indications of one or more parameters and/or parameter types and may provide areas where the player may indicate and/or mark a desired value or range of acceptable values for one or more of such parameters.

In some embodiments, the card 2800*c* may comprise a mounting device 2812*c* operable to facilitate mounting, coupling, and/or display of the card 2800*c*. The mounting device 2812*c* may simply comprise, according to some embodiments (such as shown in FIG. 28D), a hole operable to accept a hanger and/or dowel or other element for hanging the card 2800*c* from and/or on a display (such as the session object display 232 of FIG. 2).

Figure 28D:
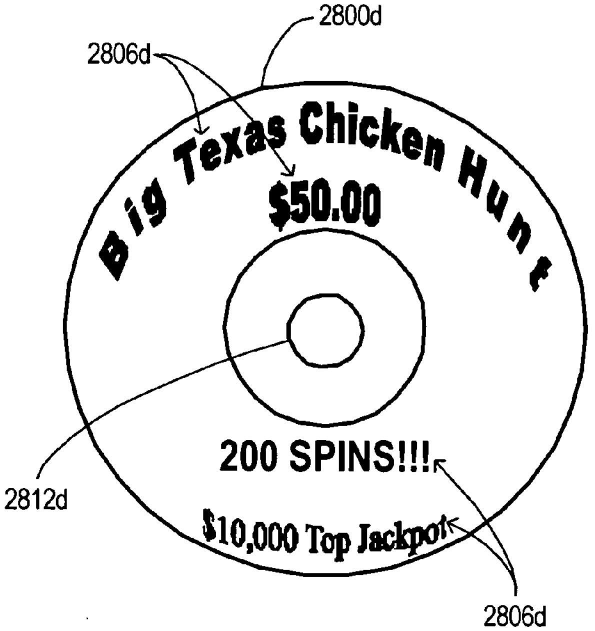
Figure 29:
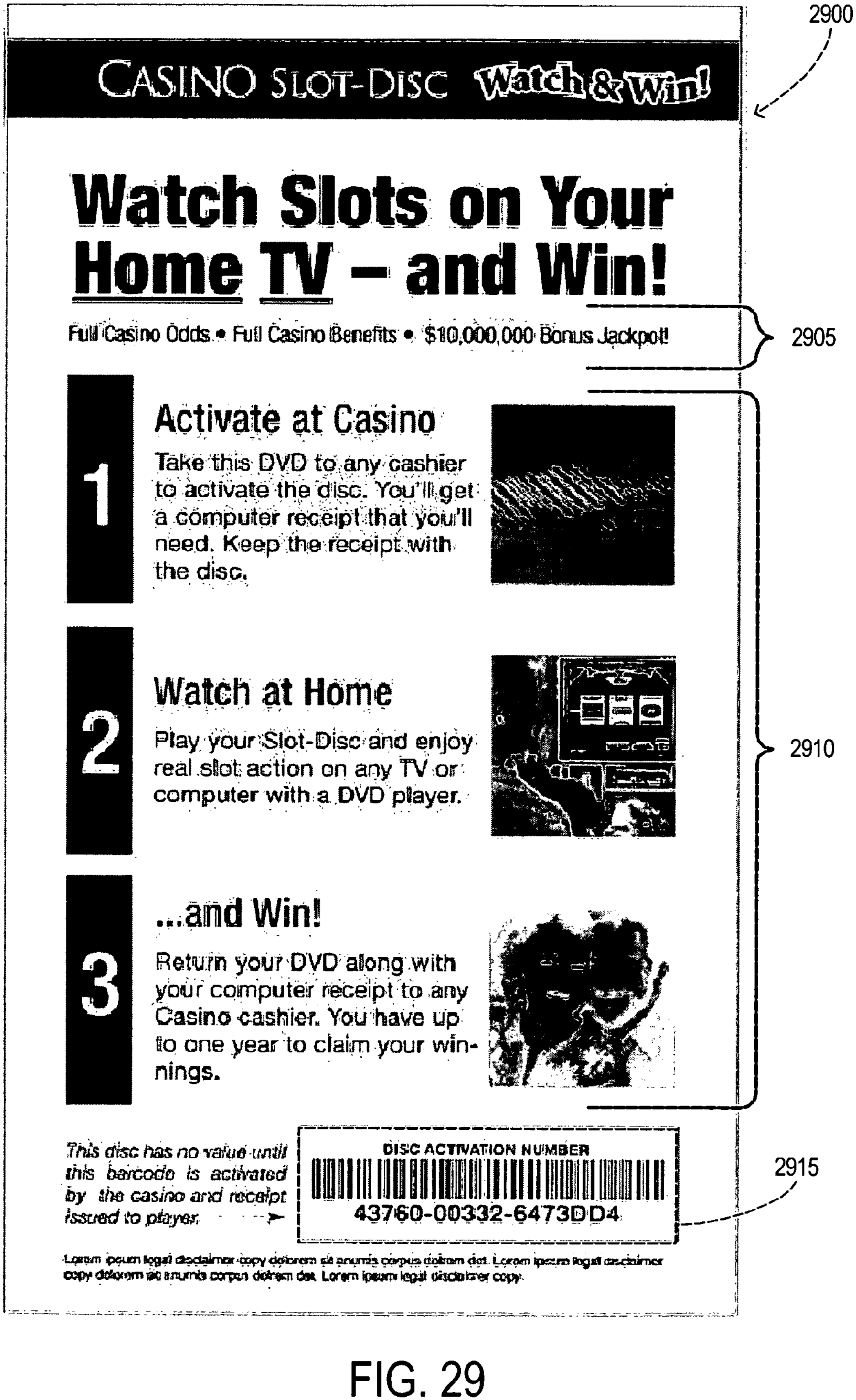
FIG. 29 illustrates an exemplary packaging insert in accordance with some embodiments.

A fourth exemplary session object 2800*d* is depicted in FIG. 28D. The fourth session object 2800*d* may comprise, for example, a card, form, ticket, and/or other object such as the CD-shaped object (i.e., CD-shaped object 2800*d*) shown in FIG. 28D. The CD-shaped object 2800*d* may comprise a cardboard and/or metal or plastic object shaped and/or colored (e.g., via graphics and/or print or stenciling) to resemble a DVD and/or CD. The CD-shaped element 2800*d* may, in some embodiments, comprise an indication 2806*d* similar to the indications 2806*a-c* described herein (e.g., indicative of one or more session parameters and/or values thereof). The CD-shaped object 2800*d* may also comprise a mounting device 2812*d*, which may be similar to the mounting device 2812*c*. The mounting device 2812*d* may, according to some embodiments, also or alternatively comprise a magnet, adhesive, and/or other medium, object, and/or device operable to couple the CD-shaped object 2800*d* to a display and/or storage device.

Referring now to FIG. 29, an exemplary packaging medium insert 2900 according to some embodiments is shown. The packaging medium insert 2900 may, for example, be operable to be inserted into and/or to be coupled to a session object such as the session objects 2800*a-d* of FIG. 28A, FIG. 28B, FIG. 28C, and/or FIG. 28D.

The exemplary packaging medium insert 2900 generally includes, in area 2905, an indication of one or more parameters of the session represented and/or described by the packaging medium insert 2900. As described in area 2905, in one embodiment outcomes determined in accordance with a session may provide a player with the same odds of winning a prize as would be available to the player via playing a gaming device in a conventional manner. Of course, as described herein, in other embodiments different odds may be provided to a player via a session (e.g., more favorable or less favorable odds of winning one or more prizes). As also or alternatively described in area 2905, in one embodiment outcomes determined in accordance with a session may provide a player with the same benefits (e.g., rate of earning comp points) as would be available to the player via playing a gaming device in a conventional manner. Of course, as described herein, in other embodiments different benefits may be provided to a player via a session (e.g., a player may be provided comp points at an increased or decreased rate or not provided comp points at all, a player may be provided with other benefits in an altered manner). As also or alternatively described in area 2905, a player may be informed of one or more prizes available to the player via the session. In the particular example of exemplary package medium insert 2900, a player purchasing a session as described is eligible to win a one hundred thousand dollar ($100,000) "Bonus Jackpot" (which the player may or may not be eligible for via playing a gaming device in a conventional manner).

The exemplary package medium insert 2900 may also or alternatively include, in area 2910, a set of instructions for purchasing or otherwise obtaining or using a session of outcomes that are viewable remotely, and/or illustrations thereof. In some embodiments, area 2910 or another area of the package medium insert 2900 may include additional information, such as offers for products or services, marketing messages, advertisements, and/or other instructions.

The exemplary package medium insert 2900 may also or alternatively include, in area 2915, an indication of a disc activation number (in human and/or machine readable form) and an explanation of a manner of activating a disc corresponding to a session described or otherwise related to exemplary package medium insert 2900. The disc activation number in area 2915 may comprise, for example, an activation number similar to that described with respect to area 2725 of the example receipt 2700 (FIG. 27). As described in area 2915, in one embodiment, a disc must first be activated by bringing the package medium insert 2900 (or at least the disc activation portion of area 2915) to a casino attendant and a receipt issued to the player (in other embodiments, as described, a disc may be activated at a POS, kiosk, or other device and may not necessarily involve a casino attendant). As illustrated in the exemplary package medium insert 2900 may include the disc activation number in a die-cut and/or otherwise easily removable or separable portion of the package medium insert 2900, such that the disc activation number may be relatively easily separable from the remainder of the package medium insert 2900. For example, in some embodiments, the casino may collect the portion of the package medium insert 2900 that has printed thereon the disc activation number upon activating the disc or the player may be required to provide this portion (e.g., along with a receipt for purchasing the disc) upon redeeming the disc.

In some embodiments, when creating a video discs such as a DVD or CD-ROM, various supplemental multimedia material may be added to the disc. Such material may include, but is not limited to (i) commercials advertising casino facilities or products, (ii) promotional codes providing discounts to various products and services available within a casino, (iii) free "sample" videos of various gaming devices (e.g., animations from video-reel slot machines promote game play). In one embodiment, players may be able to win promotional credits from such sample games.

VI. Other Embodiments

While many embodiments described herein have focused on the provision and/or sale of a tangible medium comprising a plurality of outcomes to a player, it should be understood that variations are fully contemplated herein. According to some embodiments, for example, while the plurality of outcomes, representative outcomes, and/or indications thereof are stored on a tangible medium, the outcomes may be provided to a player without providing and/or selling the tangible medium. A player with a portable device such as an Apple® iPod® may, for example, interface with a POS device to receive the outcomes (e.g., the outcomes may be transmitted to a tangible medium already within the iPod® and/or already otherwise associated with the player; such as a memory card). Similarly, not all outcomes and/or indications thereof may be stored and/or transmitted at the same time. A casino and/or other entity may, for example, utilize the outcomes and/or indications thereof (e.g., media files) to create a feed for streaming information to a player (or plurality of players). Some other variations are described in the following sections, while even more variations should be recognizable to those skilled in the art.

A. Variable Duration Gaming Sessions and Session Termination Conditions

Various embodiments contemplate wherein players may purchase sessions comprising variable durations. For example, a player may purchase a session during which game results may be generated continually for a duration of time, though the duration may be unknown at the time of purchase (e.g., the player "gambles" in that the player does not know how much "action" a contract may comprise). Similarly, a player may purchase a session entitling the player to an unknown number of game plays (e.g., the player may receive a minimum of one hundred (100) game plays or a maximum of one thousand (1,000)). In some embodiments, such variable durations and amounts of game play may be determined randomly.

In some embodiments, a session may comprise a variable duration, such that when the session is executed on a player's behalf, game results may be generated until one or more conditions are satisfied, at which point the session is terminated (e.g., no further game results may be generated). For example, in one embodiment, game results may be generated until a player's credit balance reaches a minimum or maximum amount (e.g., zero (0) credits or ten thousand (10,000) credits). In another example, game results may be generated until a player reaches a predetermined number of bonus rounds. Still further, game results may be generated until a player collects a predetermined number of one or more particular types of game indicia (e.g., one hundred (100) "lemon" symbols). Of course, various other types of termination conditions are contemplated (e.g., a player indicates a session is to end after a specified number of consecutive losing outcomes are reached, after a specific outcome is reached, etc.).

In some embodiments, a plurality of criteria may be applicable to determine whether or not to terminate a session. For example, a session may last for five hundred (500) game plays, or until a player's credit balance reaches zero (0), whichever comes first. Thus, a player may purchase (e.g., for twenty dollars ($20)) a session with the following parameters: (i) the player's starting credit balance is eighty (80) credits (e.g., eighty (80) game plays with a wager amount of twenty-five cents (25¢) per game play), (ii) each game play deducts one credit from the player's balance, (iii) the session terminates upon the generation of the five hundredth ($500^{th}$) game result, or when the credit balance reaches zero (0), whichever comes first. In another embodiment, a termination condition may state that game play must terminate when a credit balance exceeds one hundred and sixty (160). Thus, should a player choose a "double or nothing" session, the player will either earn twice what was wagered (e.g., one hundred and sixty (160) credits or forty dollars ($40)), or lose it all.

In some embodiments wherein players purchase sessions with unknown durations (e.g., sessions that terminate upon the occurrence of a termination condition, such as a credit balance reaching a threshold amount), players may be provided with a minimum number of game plays. Continuing the above example, a player having purchased a twenty-dollar ($20) session may have agreed to termination conditions such that game play will terminate once the balance reaches zero (0) or forty-dollars ($40). Accordingly, in one example, the player may be provided with a minimum number of game plays that is greater than the number of game plays that would result should the session be played out without producing a single winning outcome. For example, if the player achieved no winning outcomes (and thus no payouts), the session would normally terminate after twenty (20) spins. However, in some embodiments, the player may be assured a minimum number of spins that is greater than this number, such as thirty (30) spins. Thus, a gaming device may in some embodiments be configured to (i) execute a game play without deducting a wager amount from a credit balance, (ii) execute a game play when a credit balance is zero (0), and/or (ii) execute a game play when a credit balance is negative. In this manner, players may be provided with a minimum amount of game play, and even be provided with one or more "free" game plays during the execution of a session.

B. "Free" Game Plays Applied to Secondary Pay Table

In some embodiments, a player purchasing a session may be entitled to a number of "free" game plays, which in some embodiments may comprise game plays which do not subtract from a player's credit balance or otherwise require additional funds on the player's behalf. For example, as described, a player may purchase a session entitling the player to five hundred (500) game plays with a starting balance of eighty (80) credits, so long as the credit balance stays above zero (0). However, in some embodiments, should the player's credit balance reach zero (0), or, should the player reach five hundred (500) game plays, the player may be entitled to a number (e.g., a predetermined number and/or a variable number) of free game plays.

In one embodiment, game results generated from free game plays may be compared to a standard pay table (e.g., such that should a player achieve a result of "Bar-Bar-Bar," the player wins the same amount of credits regardless of whether the result was generated via a free game play or not).

In another embodiment, a secondary pay table may be applied to free game plays. For example, a player may be entitled to five hundred (500) free game plays. At the end of "regular" game play of the session (e.g., after the five hundred (500) spins expire or the player's credit balance reaches zero), free game play may occur. For example, after a credit balance reaches zero during regular play, five hundred (500) free game plays may then commence. Players may then accumulate a total number of credits via free game play (e.g., since players may receive credits without placing wager amounts, a credit balance associated with free game play may only rise or stay the same as a result of the game play).

In one embodiment, a player may be allowed to keep any credits won during free play. For example, a secondary pay table may be used to determine numbers of credits to be awarded to players should they achieve various gaming results during free play. Credit amounts associated with various game results may be lower for free play than for regular play (e.g., during regular play, a result of "Orange-Orange-Orange" pays twenty (20) credits, but during free play, it only pays two (2)). Thus, in one example, after winning eighty-seven (87) credits as the result of regular play, a player wins an additional fourteen (14) credits from free play, amassing the player a total final credit balance of one hundred and one (101) credits.

In another embodiment, a separate credit meter may be used to keep track of credits won during free play. In such an embodiment, payouts associated with various winning game results may be the same for free play as they are for regular play (e.g., "Orange-Orange-Orange" continues to pay twenty (20) credits), but the winnings from free play are accounted for separately. At the conclusion of free play, this number of credits may then be compared against a separate schedule to determine a payout to be awarded to a player. For example, if a player accumulates three hundred (300) or fewer credits during free play, the player may receive nothing, but if the player accumulates between three hundred (300) and five hundred (500) credits, the player may win ten dollars ($10), and so on. Players achieving large, statistically unlikely totals from free play may be awarded with "jackpot" payouts.

VII. Rules of Interpretation

Numerous embodiments have been described, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase “means for” or the phrase “step for” means that 35 U.S.C. §112, paragraph 6, applies to that limitation.

In a claim, a limitation of the claim which does not include the phrase “means for” or the phrase “step for” means that 35 U.S.C. §112, paragraph 6 does not apply to that limitation, regardless of whether that limitation recites a function without recitation of structure, material or acts for performing that function. For example, in a claim, the mere use of the phrase “step of” or the phrase “steps of” in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

VIII. Conclusion

While various embodiments have been described herein, it should be understood that the scope of the present invention is not limited to the particular embodiments explicitly described. Many other variations and embodiments would be understood by one of ordinary skill in the art upon reading the present description.

What is claimed is:

1. A method of operating a gaming system, said method comprising:

(a) receiving, from a player, a session object including an indication of a pre-defined parameter associated with a plurality of plays of a game;

(b) after receiving, from the player, the session object and before any outcomes of any of the plurality of plays of the game are displayed to any players:

(i) causing at least one processor to execute a plurality of instructions to randomly determine, based on the indication of the pre-defined parameter, a plurality of outcomes for the plurality of plays of the game, wherein a credit balance is increasable based on any awards associated with the plurality of randomly determined outcomes for the plurality of plays of the game, said credit balance being increasable via an acceptor of a physical item associated with a monetary value, and said credit balance being decreasable via a cashout device, (ii) causing the at least one processor to execute the plurality of instructions to determine, for each of the plurality of randomly determined outcomes, at least one image representative of said randomly determined outcome, and (iii) causing the at least one processor to execute the plurality of instructions to operate with at least one memory device to store the determined images; and (c) after a last one of the plurality of outcomes has been randomly determined and after a last one of the images has been determined, causing the plurality of images representative of the plurality of randomly determined outcomes to be available to be displayed to the player.

2. The method of claim 1, further including:

causing the at least one processor to operate with the at least one memory device to store an indication of the plurality of randomly determined outcomes.

3. The method of claim 2, wherein the at least one memory device includes a tangible medium.

4. The method of claim 3, which includes:

providing the tangible medium to the player.

5. The method of claim 3, wherein the tangible medium includes at least one selected from the group consisting of:

a DVD;

a CD-ROM;

a floppy disk;

a VHS tape;

a flash memory; and a portable viewing device.

6. The method of claim 1, wherein the session object includes at least one selected from the group consisting of:

a packaging medium;

a card medium;

a ticket medium; and a token medium.

7. The method of claim 1, which includes causing at least one display device to display a plurality of available session objects and enabling the player to select the session object.

8. The method of claim 1, wherein the session object indicates the pre-defined parameter by at least one of:

a printing of the indication of the parameter on the session object;

a stamping of the indication of the parameter on the session object;

an engraving of the indication of the parameter on the session object;

an etching of the indication of the parameter on the session object; and a coupling of a medium including the indication of the parameter to the session object.

9. The method of claim 1, wherein the pre-defined parameter is indicative of at least one selected from the group consisting of:

an identifier of a tangible medium including the plurality of randomly determined outcomes;

a gaming device at which the plurality of outcomes are randomly determined;

a type of gaming device at which the plurality of outcomes are randomly determined;

a type of game for which the plurality of outcomes are randomly determined;

a particular game for which the plurality of outcomes are randomly determined;

an amount wagered for each outcome of the plurality of outcomes;

a number of paylines activated for at least one of the plurality of outcomes;

a strategy employed in randomly determined at least one of the plurality of outcomes;

a number of outcomes including the plurality of randomly determined outcomes; and an ending condition that defines when the last one of the plurality of outcomes has been randomly determined.

10. The method of claim 9, wherein if the pre-defined parameter is indicative of the ending condition, the ending condition defines at least one selected from the group consisting of:

the credit balance;

a number of game plays; and a duration of time.

11. The method of claim 1, which includes:

causing the at least one processor to execute the plurality of instructions to determine an indication of the plurality of outcomes, wherein the plurality of outcomes are randomly determined by a gaming device.

12. The method of claim 1, which includes:

causing the at least one processor to execute the plurality of instructions to determine a net payout associated with the plurality of randomly determined outcomes.

13. The method of claim 1, which includes:

causing the at least one processor to execute the plurality of instructions to determine a gross payout associated with the plurality of randomly determined outcomes.

14. The method of claim 1, which includes:

causing the at least one processor to execute the plurality of instructions to determine a payout associated with a particular outcome of the plurality of randomly determined outcomes.

15. The method of claim 1, which includes causing the at least one processor to execute the plurality of instructions to determine at least one of the images as it is to be displayed on a gaming device when the at least one outcome which the at least one image is representative of is randomly determined.

16. The method of claim 1, which includes causing the at least one processor to execute the plurality of instructions to determine at least one of the images as it is to be displayed to the player once the player purchases the plurality of randomly determined outcomes.

17. The method of claim 1, which includes:

causing the at least one processor to execute the plurality of instructions to determine an identifier associated with the plurality of randomly determined outcomes.

18. The method of claim 17, further including:

causing the at least one processor to execute the plurality of instructions to determine, based on the identifier, at least one selected from the group consisting of:

a net payout associated with the plurality of randomly determined outcomes;

a gross payout associated with the plurality of randomly determined outcomes; and a payout associated with a particular outcome of the plurality of randomly determined outcomes.

19. The method of claim 1, further including:

causing the at least one processor to execute the plurality of instructions to store an indication of the plurality of outcomes in association with a unique identifier that uniquely identifies the indication of the plurality of randomly determined outcomes.

20. The method of claim 1, wherein for each of the plurality of randomly determined outcomes, the at least one determined image representative of said outcome includes a video representing the game as said outcome is randomly determined.

21. The method of claim 1, wherein causing the plurality of images to be available to be displayed to the player includes making the plurality of randomly determined outcomes available for purchase, prior to a payout corresponding to any outcome of the plurality of randomly determined outcomes being displayed to the player, in exchange for a price.

22. The method of claim 1, which includes causing the at least one processor to execute the plurality of instructions to determine at least one image of the plurality of images based on a payout of a designated outcome of the plurality of randomly determined outcomes.

23. The method of claim 1, which includes causing the at least one processor to execute the plurality of instructions to determine the plurality of images based on a sum of payouts of the plurality of randomly determined outcomes.

24. The method of claim 1, wherein the plurality of outcomes are randomly determined in a first order, and the images are stored in a second order that is different from the first order, such that it appears that the outcomes were randomly determined in the second order rather than the first order.

25. The method of claim 1, which includes:

causing the at least one processor to execute the plurality of instructions to determine, based on the indication of the pre-defined parameter, a storage location associated with the plurality of randomly determined outcomes.

26. The method of claim 25, wherein the storage location includes a tangible medium.

27. The method of claim 26, wherein causing the plurality of images to be available to be displayed to the player includes:

providing the tangible medium to the player.

28. The method of claim 1, further including:

receiving, after causing the plurality of images to be available to be displayed to the player, a request from the player for a payout corresponding to the plurality of randomly determined outcomes.

29. The method of claim 28, further including:

causing the at least one processor to execute the plurality of instructions to:

verify a legitimate purchase of the plurality of randomly determined outcomes by the player; and authorize the payout corresponding to the plurality of randomly determined outcomes to be provided to the player.

30. The method of claim 28, further including:

causing the at least one processor to execute the plurality of instructions to authorize an amount to be provided to the player, wherein the amount includes a difference between the payout corresponding to the plurality of randomly determined outcomes and a fee associated with the player having been provided the plurality of randomly determined outcomes.

31. A method of operating a gaming system, said method comprising:

(a) causing at least one display device to display a plurality of session objects, wherein each session object of the plurality of session objects includes an indication of a pre-defined parameter associated with a plurality of plays of a game;

(b) receiving, from a player, an indication of a selection of one of the session objects from the plurality of displayed session objects;

(c) after receiving, from the player, the indication of the selection of one of the session objects and before any outcomes of any of the plurality of plays of the game are displayed to any players:

causing at least one processor to execute a plurality of instructions to randomly determine, based on the pre-defined parameter indicated by the session object selected by the player, a plurality of outcomes for the plurality of plays of the game, wherein a credit balance is increasable based on any awards associated with the plurality of randomly determined outcomes for the plurality of plays of the game, said credit balance being increasable via an acceptor of a physical item associated with a monetary value, and said credit balance being decreasable via a cashout device, (ii) causing the at least one processor to execute the plurality of instructions to determine, for each of the plurality of randomly determined outcomes, at least one image representative of said randomly determined outcome, and (iii) causing the at least one processor to execute the plurality of instructions to operate with at least one memory device to store the determined images; and (d) after a last one of the plurality of outcomes has been randomly determined and after a last one of the images has been determined, causing the plurality of images representative of the plurality of randomly determined outcomes to be available to be displayed to the player.

32. The method of claim 31, wherein causing the plurality of images to be available to be displayed to the player includes:

making the plurality of randomly determined outcomes available for purchase, prior to a payout corresponding to any outcome of the plurality of randomly determined outcomes being revealed to the player, in exchange for a price.

33. The method of claim 31, further including:

receiving, after causing the plurality of images to be available to be displayed to the player, a request from the player for a payout corresponding to the plurality of randomly determined outcomes.

34. The method of claim 33, further including:

causing the at least one processor to execute the plurality of instructions to:

verify a legitimate purchase of the plurality of randomly determined outcomes by the player; and authorize the payout corresponding to the plurality of randomly determined outcomes to be provided to the player.

35. The method of claim 33, further including:

causing the at least one processor to execute the plurality of instructions to authorize an amount to be provided to the player, wherein the amount includes a difference between the payout corresponding to the plurality of randomly determined outcomes and a fee associated with the player having been provided the plurality of randomly determined outcomes.

36. A method of operating a gaming system, said method comprising:

(a) receiving, from a player, an indication of a parameter associated with a plurality of plays of a game;

(b) after receiving, from the player, the indication of the parameter associated with the plurality of plays of the game and before any outcomes of any of the plurality of plays of the game are displayed to any players:

(i) causing at least one processor to execute a plurality of instructions to randomly determine, based on the parameter, a plurality of outcomes for the plurality of plays of the game, wherein a credit balance is increasable based on any awards associated with the plurality of randomly determined outcomes for the plurality of plays of the game, said credit balance being increasable via an acceptor of a physical item associated with a monetary value, and said credit balance being decreasable via a cashout device, (ii) causing the at least one processor to execute the plurality of instructions to determine, for each of the plurality of randomly determined outcomes, at least one image representative of said randomly determined outcome, and (iii) causing the at least one processor to execute the plurality of instructions to operate with at least one memory device to store the determined images;

(c) after a last one of the plurality of outcomes has been randomly determined and after a last one of the images has been determined, causing the plurality of images representative of the plurality of randomly determined outcomes to be available to be displayed to the player; and (d) providing a benefit to the player, wherein the benefit includes a difference between a payout corresponding to the plurality of randomly determined outcomes and a fee associated with having been provided the plurality of randomly determined outcomes.

37. The method of claim 36, wherein the receiving includes:

receiving, from the player, a session object including the indication of the parameter.

38. The method of claim 37, wherein the session object includes a packaging medium, the packaging medium including at least one selected from the group consisting of:

a jewel case;

a storage sleeve;

a shrink-wrap pouch; and a covering.

39. The method of claim 37, wherein the session object includes a card medium, the card medium including at least one selected from the group consisting of:

a display card;

a pre-printed form;

a form printed from a device operated by the player; and a form including a plurality of input areas, wherein the player marks at least one of the plurality of input areas.

40. The method of claim 37, wherein the session object includes at least one selected from the group consisting of:

a ticket medium; and a token medium.

41. The method of claim 40, wherein the session object is output by a gaming device.

42. The method of claim 36, wherein the receiving includes at least one of:

receiving a verbal indicia that includes the indication of the parameter; and receiving an indicia of a menu selection that includes the indication of the parameter.

43. A method of operating a gaming system, said method comprising:

(a) receiving, from a player, an indication of a parameter associated with a plurality of plays of a game;

(b) after receiving, from the player, the indication of the parameter associated with the plurality of plays of the game and before any outcomes of any of the plurality of plays of the game are displayed to any players:

(i) causing at least one processor to execute a plurality of instructions to randomly determine, based on the parameter, a plurality of outcomes for the plurality of plays of the game, wherein a credit balance is increasable based on any awards associated with the plurality of randomly determined outcomes for the plurality of plays of the game, said credit balance being increasable via an acceptor of a physical item associated with a monetary value, and said credit balance being decreasable via a cashout device, (ii) causing the at least one processor to execute the plurality of instructions to determine, for each of the plurality of randomly determined outcomes, at least one image representative of said randomly determined outcome, and (iii) causing the at least one processor to execute the plurality of instructions to operate with at least one memory device to store the determined images; and (c) after a last one of the plurality of outcomes has been randomly determined and after a last one of the images has been determined, making the plurality of randomly determined outcomes available for purchase in exchange for a monetary amount.

* * * * *